US012454556B2

(12) United States Patent
Kutzner

(10) Patent No.: US 12,454,556 B2

(45) Date of Patent: Oct. 28, 2025

(54) FUSION POLYPEPTIDES FOR TARGET PEPTIDE PRODUCTION

(71) Applicant: Christoph Kutzner, Mannheim (DE)

(72) Inventor: Christoph Kutzner, Mannheim (DE)

( * ) Notice: Subject to any disclaimer, the term of this patent is extended or adjusted under 35 U.S.C. 154(b) by 308 days.

(21) Appl. No.: 17/921,508

(22) PCT Filed: Apr. 27, 2021

(86) PCT No.: PCT/EP2021/060892

§ 371 (c)(1),
(2) Date: Oct. 26, 2022

(87) PCT Pub. No.: WO2021/219585

PCT Pub. Date: Nov. 4, 2021

(65) Prior Publication Data

US 2023/0203109 A1 Jun. 29, 2023

(30) Foreign Application Priority Data

Apr. 27, 2020 (EP) .................................... 20171573

(51) Int. Cl.

*C07K 14/435* (2006.01)
*C12N 15/62* (2006.01)

(52) U.S. Cl.

CPC ...... *C07K 14/43572* (2013.01); *C12N 15/625* (2013.01); *C07K 2319/02* (2013.01); *C07K 2319/50* (2013.01)

(58) Field of Classification Search

CPC .......... C07K 14/43572; C07K 2319/02; C07K 2319/50; C12N 15/625

See application file for complete search history.

(56) References Cited

U.S. PATENT DOCUMENTS

2004/0043109 A1 3/2004 Kragh et al.

FOREIGN PATENT DOCUMENTS

| | | | |
|---|---|---|---|
| AU | 2011253661 | A1 | 12/2011 |
| EP | 2746390 | A1 | 6/2014 |
| WO | 2006/113957 | A2 | 11/2006 |
| WO | 2008/052387 | A1 | 5/2008 |
| WO | 2019/138125 | A1 | 7/2019 |

OTHER PUBLICATIONS

International Searching Authority. International Search Report and Written Opinion issued in Application No. PCT/EP2021/060892 on Oct. 25, 2021. 19 pages.

Yeom, J. et al. "Comprehensive analysis of human protein N-termini enables assessment of various protein forms", Scientific Reports, vol. 7, No. 1, Jul. 26, 2017, 13 pages.

Frey, S. et al. "A new set of highly efficient, tag-cleaving proteases for purifying recombinant proteins", Journal of Chromatography A, Feb. 1, 2014, 11 pages.

Hashim, S.O. et al. "Alkaline active maltohexaose-forming a-amylase from Bacillus halodurans LBK 34", Jan. 6, 2005, vol. 36, No. 1, p. 139-146.

*Primary Examiner* — Li N Komatsu

(74) *Attorney, Agent, or Firm* — Meunier Carlin & Curfman LLC

(57) ABSTRACT

The present invention relates to fusion polypeptides, nucleic acid molecules encoding such fusion polypeptides and genetically modified cells comprising such nucleic acid molecules. Additionally, the present invention relates to a method for preparing a target peptide and target peptide mixtures.

9 Claims, 6 Drawing Sheets

Specification includes a Sequence Listing.

FUSION POLYPEPTIDES FOR TARGET PEPTIDE PRODUCTION

REFERENCE TO AN ELECTRONIC SEQUENCE LISTING

The content of the electronic sequence listing submitted on Oct. 26, 2022, as a text file named "11463-010US1-sequence.txt," created on Oct. 25, 2022, and having a size of 135,391 bytes, is herein incorporated by reference in its entirety pursuant to 37 C.F.R. § 1.52(e)(5).

TECHNICAL FIELD

The present invention relates to fusion polypeptides, nucleic acid molecules encoding such fusion polypeptides and genetically modified cells comprising such nucleic acid molecules. Additionally, the present invention relates to a method for preparing a target peptide and target peptide mixtures. Further aspects of the present invention become apparent when studying the attached patent claims and the specification, including examples.

BACKGROUND OF THE INVENTION

The need for peptides and proteins with a high purity for various industrial and research applications rose continuously over the past years. It is therefore highly desired to produce peptides with a predetermined sequence in an economically efficient way. To date, the industrial peptide production relies on two options: the production via chemical synthesis and the production via biotechnological methods. The chemical synthesis has the drawback that it is a costly and time-consuming process and not all desired peptides can be produced at an industrial scale. For example, peptides with a high content of hydrophobic amino acids are not producible by chemical synthesis and it is especially challenging to produce peptides with an N-terminal proline. Furthermore, the chemical synthesis requires the use of harsh reagents and costly purification steps. On the other hand, these drawbacks can be overcome by biotechnological synthesis. Biotechnological systems such as genetically modified *E. coli* are suitable for producing desired target peptides or proteins at a cost-efficient and highly scalable basis. Nevertheless, purification processes are highly inefficient and costly as cells such as *E. coli* produce a variety of different metabolites, which are also proteins and peptides, and need to be separated specifically from the target peptides or proteins.

WO 2006/113957 discloses a method for recombinant preparation of a heterologous polypeptide comprising the expression of a fusion polypeptide, the fusion polypeptide comprising a mutant of the autoprotease $N^{pro}$ of a pestivirus and a second C-terminally connected polypeptide, wherein the second polypeptide may be cleaved autoproteolytically. Moreover, further fusion domains may be present at the N-terminus required for binding to an affinity chromatography system, e g. poly(amino acids) such as polylysin or epitope tags, i.e. short peptide sequences for which a specific antibody is available. Nevertheless, the method discloses complex purification steps such as affinity chromatography and HPLC. As toxic and costly reagents are used for the affinity chromatography, the disclosed process is not easily scalable and cost-efficient. The resulting peptides also need to be further purified to exclude the toxic compounds from the affinity chromatography.

WO 2008/052387 discloses starch-binding domains and recombinant polypeptides including the same, wherein the starch-binding domains are arranged in N-terminal and/or C-terminal direction of the target polypeptide. The fusion polypeptides may be purified by chromatography on a starch carrier. The disclosed method only offers the use of well-known starch binding sites, whereas the binding domain used for purification cannot be separated easily.

More specific, EP 2746390 and AU 2011253661 disclose fusion polypeptides to be used in an affinity chromatography system with an autoprotease $N^{pro}$ from Pestivirus. Both documents do not disclose methods to overcome the drawback of using an $N^{pro}$ in terms of controlling the autoprotease activity in a very specific pH range and a high dependency on the reaction conditions such as the settled temperature. In addition, minor changes in the reaction environment would lead to the activation or deactivation of the autoproteolytic domain.

WO 2019/138125 discloses also fusion polypeptides with an autoprotease domain from $N^{pro}$. Furthermore, fusion polypeptides with a CBM affinity domain are disclosed. The international application does not disclose specific architectural concepts of designing the CBM or autoproteolytic domain to overcome the drawbacks of the instability and high dependency of the fusion polypeptides to work on fixed reaction conditions. The high dependency to work on fixed reaction conditions can lead to product loss or impurities in the product. Purification processes involving the use of $N^{pro}$ as an autoprotease are limited in their performance. Whenever the autoprotease $N^{pro}$ as such or as part of a fusion polypeptide is expressed in a standard *E. coli* expression system, it is deposited in inclusion bodies. As soon as the autoprotease $N^{pro}$ is recovered from inclusion bodies and is refolded into its native conformation, autoproteolysis will proceed as the conditions needed for inclusion body refolding and the conditions for autoproteolysis of $N^{pro}$ match. Accordingly, the limiting factor of the purification process are the binding kinetics and affinity of the CBM affinity domain for the purification and the yield at the same time. A trade-off decision has to be made between high yield and low purity ($N^{pro}$ is not fully activated, but the polypeptide can be regained from the inclusion bodies) or high purity and low yield of the product ($N^{pro}$ is fully activated, but not all polypeptide can be regained from the inclusion bodies). The primary object of the present invention was therefore to provide improved fusion polypeptides, which can be used in a method to produce target peptides, which can be or can only be inefficiently produced with commonly available chemical or biotechnological methods. Preferably, such polypeptides or methods allow to avoid one or more, preferably, all of the above mentioned drawbacks of previous methods known from the prior art. Further objects of or underlying the present invention can be derived from the specification, including examples, and the advantages mentioned herein.

SUMMARY OF THE INVENTION

This primary object is solved by providing fusion polypeptides comprising or consisting of in direction from the N-terminus to the C-terminus a purification domain, an autoprotease domain, a target peptide domain, optionally a signal sequence, and optionally a linker sequence, wherein the purification domain (i) binds to a carbohydrate matrix and comprises or consists of at least one of the amino acid consensus motive sequence according to SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8 or SEQ ID NO: 9.

Furthermore, nucleic acids encoding such fusion polypeptides and genetically modified cells comprising such fusion polypeptides are provided.

In another aspect of the present invention, a method for producing a target peptide are provided. This method comprises the steps of providing a genetically modified cell according to the present invention, culturing the cell under conditions suitable for expression of a fusion polypeptide according to the invention, obtaining the fusion polypeptide and optionally, unfolding of the obtained fusion polypeptide and directed refolding of said fusion polypeptide, contacting the obtained fusion polypeptide with a carbohydrate matrix, cleaving the fusion polypeptide by activating the autoprotease domain of the fusion polypeptide, thereby obtaining a target peptide and collecting a mixture comprising the target peptide.

In yet another aspect of the present invention, a mixture comprising a target peptide is provided, producible with a method according to the invention.

SHORT DESCRIPTION OF THE SEQUENCES

SEQ ID NOs: 1 to 9 are artificial amino acid sequences encoding consensus motifs of the purification domain.

SEQ ID NOs: 10 to 13 are artificial amino acid sequences encoding the purification domain.

SEQ ID NOs: 14 to 116 are amino acid sequences encoding carbohydrate-binding modules of different microorganisms.

SEQ ID NO: 117 is an artificial amino acid sequence encoding the consensus domain of the autoprotease domain.

SEQ ID NOs: 118 to 120 are artificial amino acid sequences encoding the autoprotease domain.

SEQ ID NOs: 121 and 122 are artificial amino acid sequences encoding preferred linker sequences.

SEQ ID NOs: 123 to 130 are artificial amino acid sequences encoding signal sequences for intracellular targeting of the fusion polypeptide and for recovery of the fusion polypeptide in a preferred environment according to the invention.

SEQ ID NOs: 131, 133, 135, 137, 139, 141 and 143 are artificial amino acid sequences encoding fusion polypeptides according to the invention.

SEQ ID NOs: 132, 134, 136, 138, 140, 142 and 144 are artificial nucleic acid sequences encoding fusion polypeptides according to the invention.

Gel a) shows uninduced (lane 1) and induced (lane 2) BL21 cells carrying a pET vector with a fusion polypeptide according to SEQ ID NO: 131 with GFP as product. In gel a) one asterisk denominates the fusion polypeptide including the product GFP at 70 kDa. Two asterisks show the fusion polypeptide without the product at 43 kDa. Three asterisks show the product GFP at 27 kDa. A small amount of polypeptide has already been activated and autoproteolysed.

Gel b) shows uninduced (lane 2) and induced (lane 3) BL21 cells carrying a pET vector with a fusion polypeptide from WO'125 carrying GFP. One asterisk denominates the fusion polypeptide including the product GFP at 75 kDa. Two asterisks show the fusion polypeptide without the product at 48 kDa. Three asterisks show the product GFP at 27 kDa. In the case of this fusion polypeptide, no intact fusion polypeptide was produced in inclusion bodies under the same conditions that were used for fusion polypeptide according to SEQ ID NO: 131.

The band at 24 kDa is the enzyme that is needed for chloramphenicol resistance.

Figure 4:
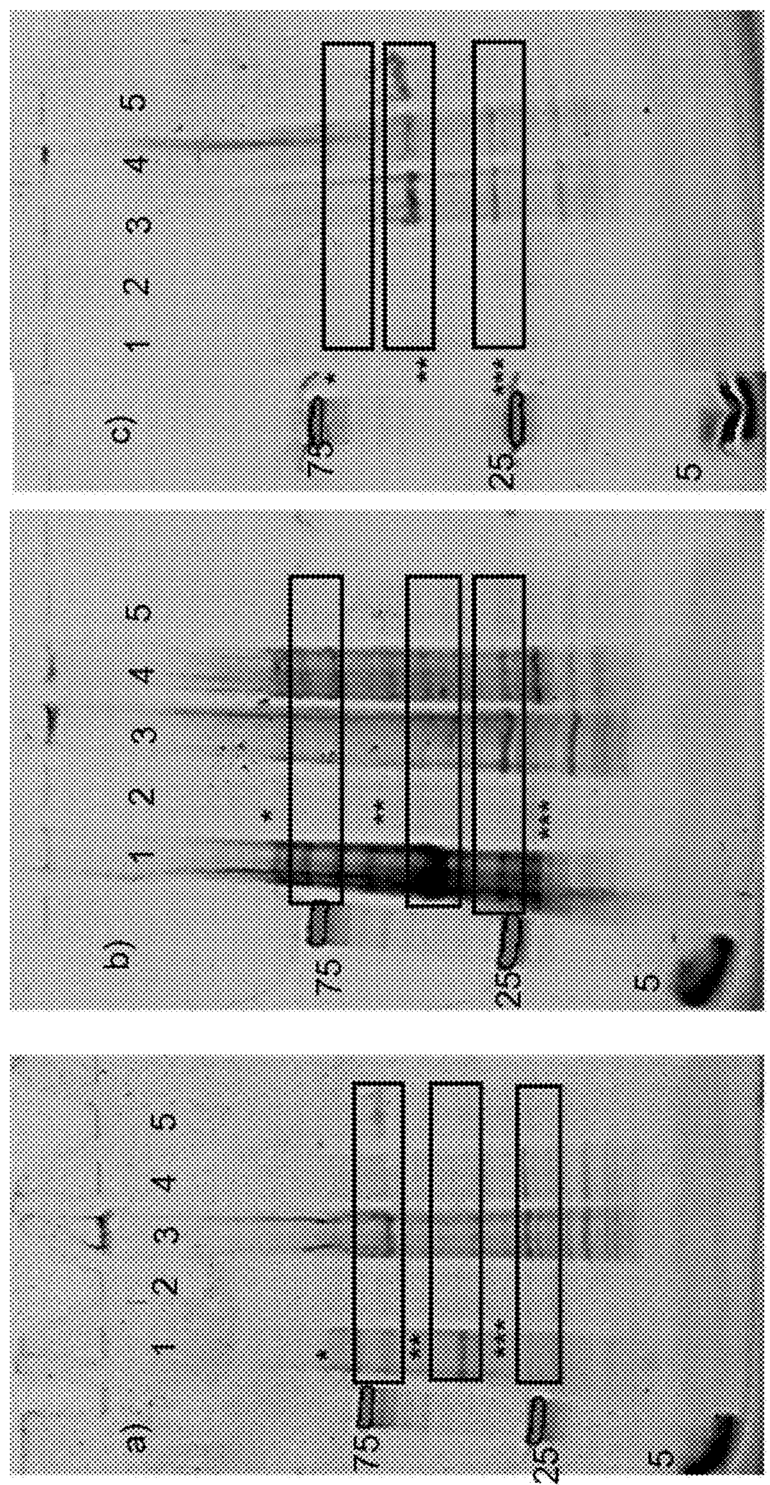

FIG. 4 shows an SDS-PAGE with different fractions from the purification process for obtaining GFP as target polypeptide. The fusion polypeptide with SEQ ID NO: 131 and GFP as target polypeptide is compared to fusion polypeptide constructs according to WO'125. These gels show that it is difficult to keep the fusion polypeptides of WO'125 inactive during downstream processing when compared to fusion polypeptide with SEQ ID NO: 131. The fusion polypeptide needs to be inactive during lysis as any activity of the autoprotease before the planned activation step will result in loss in product yield. Gel a) shows samples of the purification process using the fusion polypeptide according to SEQ ID NO: 131. Gel b) shows a fusion polypeptide construct from WO'125 and gel c) shows another fusion polypeptide construct from WO'125. Lane 1 of each gel shows the first supernatant after cell lysis, lane 2 shows the second supernatant after the second washing step in wash buffer. Lanes 3 and 4 show the wash steps in bidestilled water and lane 5 show the inclusion body pellet fraction. One asterisk denominates the fusion polypeptide including the product GFP at 70 kDa in a), 75 kDa in b) and 85 kDa in c). Two asterisks show the fusion polypeptide without the product at 43 kDa in a) 48 kDa in b) und 58 kDa in c). Three asterisks show the product GFP at 27 kDa. A small amount of polypeptide has already been activated and autoproteolysed in all species from a) to c). However, only the fusion polypeptide according to SEQ ID NO: 131 allows for desirable processing of the inclusion bodies as opposed to the fusion polypeptides of WO'125.

Figure 5:
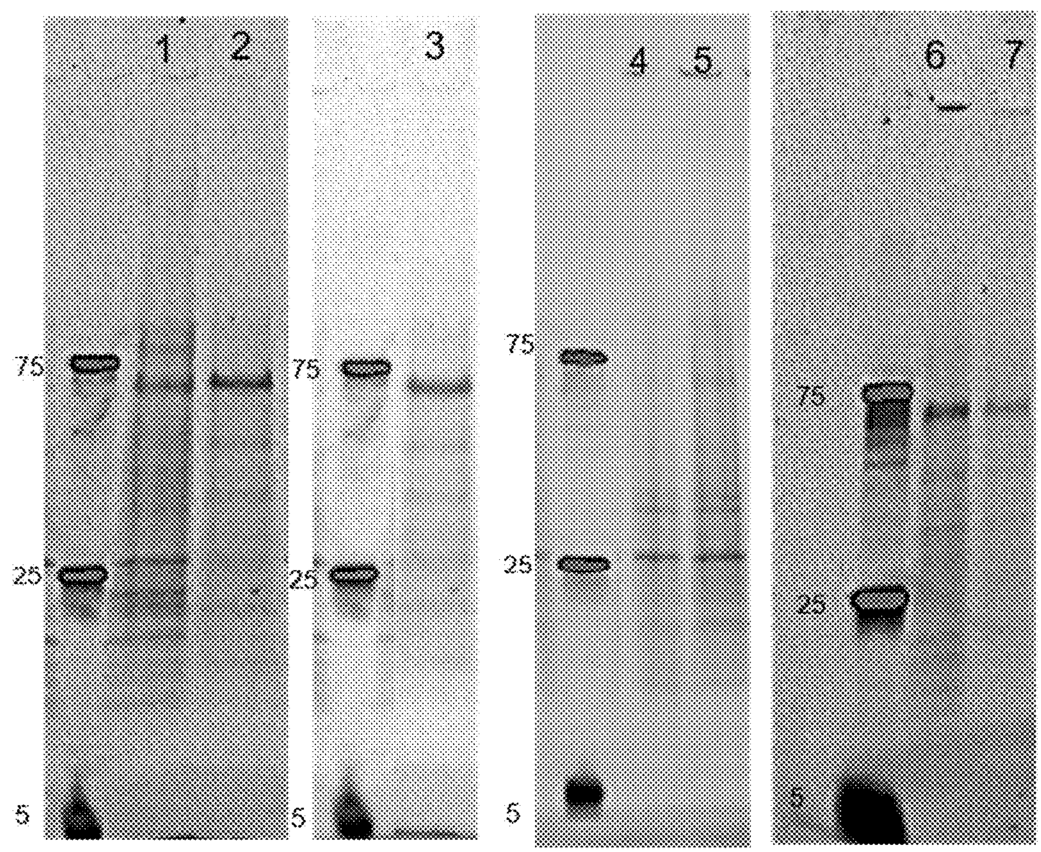

FIG. 5 shows an SDS-PAGE depicting the stability of the fusion polypeptide according to SEQ ID NO: 131 with GFP as target polypeptide in denaturation and activation buffer at different pH values. Lane 1 shows the lysate pellet before washing. Lane 2 shows the washed inclusion bodies that were dissolved in denaturation buffer (III) including 2% sodium dodecyl sulphate (SDS). The sample in lane 2 was taken two weeks after the inclusion bodies were dissolved in denaturation buffer (III) and stored at room temperature. The sample in lane 3 was taken from the same fusion polypeptide sample two weeks after the SDS had been removed and the sample had been stored at 4° C. In lane 2 and 3, the pH value was well above 9.0. Lane 4 and 5 show samples that were derived from the same sample as the one in lane 3. SDS free denaturation buffer was diluted with activation buffer (II) with pH 7.2 with a low concentration of arginine and sucrose in the activation buffer (lane 4) and high concentration of arginine and sucrose (lane 5) with a pH of 7.2. The samples were immersed in the buffer for 60 minutes at room temperature. Lane 6 shows the same sample as lane 3. It was used as a reference sample in the gel at hand. In lane 7, the same sample as in lane 6 was diluted with activating buffer (I) with pH 10.

Figure 6:
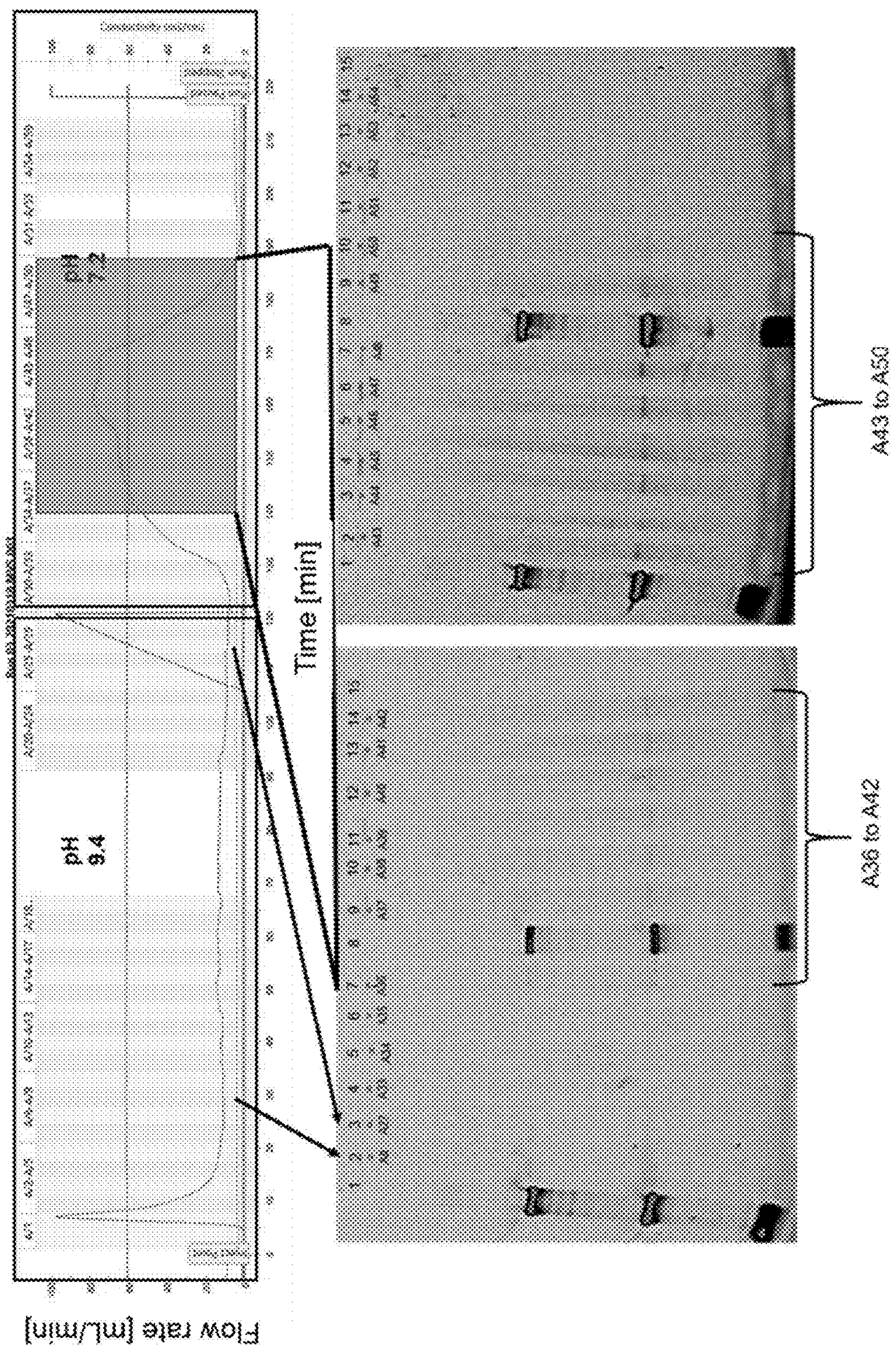

FIG. 6 shows the purification using the fusion polypeptide according to SEQ ID NO: 131 and GFP as target peptide with an elugram detecting the amount of polypeptide and the corresponding SDS-PAGE. The sample is loaded in the buffer at pH 9.4 and GFP is released from the fusion polypeptide and the column with activating buffer at pH 7.2

DETAILED DESCRIPTION

A first aspect of the present invention relates to specific fusion polypeptide comprising or consisting of in direction from the N-terminus to the C-terminus (i) a purification domain,
(ii) an autoprotease domain,
(iii) a target peptide domain,
(iv) optionally: a signal sequence, and
(v) optionally: a linker sequence, wherein the purification domain (i) binds to a carbohydrate matrix and comprises or consists of at least one, i.e. one, two, three, four, five, six, seven, eight or nine, amino acid consensus motive (i.e. a motive common to all purification domains used in connection with the present invention) sequence according to SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8 or SEQ ID NO: 9, as described herein, in particular as described in the claims.

Thus, the present invention primarily relates to a fusion polypeptide comprising or consisting of in direction from the N-terminus to the C-terminus (i) a purification domain,
(ii) an autoprotease domain,
(iii) a target peptide domain,
(iv) optionally: a signal sequence, and
(v) optionally: a linker sequence, wherein the autoprotease domain (ii) comprises or consists of an amino acid sequence according to SEQ ID NO: 117 or an amino acid sequence having a sequence identity of 90%, 91%, 92%, 93%, 94%, 95%, 96%, 97%, 98%, 99% or more to SEQ ID NO: 117, and wherein the purification domain (i) binds to a carbohydrate matrix and comprises or consists of at least one amino acid consensus motive sequence according to SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8 or SEQ ID NO: 9.

One preferred embodiment of the fusion polypeptide according to the invention relates to a fusion polypeptide comprising or consisting of in direction from the N-terminus to the C-terminus (i) a purification domain,
(ii) an autoprotease domain,
(iii) a target peptide domain,
(iv) optionally: a signal sequence, and
(v) optionally: a linker sequence, wherein the purification domain (i) is active in the absence of or at guanidiniumhydrochloride concentrations of up to 2 M or urea concentrations of up to 4 M and at a pH of above 7.9 and binds to a carbohydrate matrix (e.g. corn starch, potato starch and/or wheat starch) and/or comprises or consists of at least one, i.e. one, two, three, four, five, six, seven, eight or nine, amino acid consensus motive (i.e. a motive common to all purification domains used in connection with the present invention) sequences according to SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8 or SEQ ID NO: 9.

Preferably, placing a signal sequence according to SEQ ID NO: 126, SEQ ID NO: 127, SEQ ID NO: 128 and SEQ ID NO: 129 in an N-terminal position to the sequences as described above will enhance the fusion polypeptide ability to be deposited in inclusion bodies and be refolded under basic conditions.

The purification domain confers the binding of the fusion polypeptide to a carbohydrate matrix. It was surprisingly found, that the carbohydrate binding modules (CBM) of naturally occurring amylases can be used as the basis for constructing a set of building blocks having a consensus motive sequence, namely the sequences SEQ ID NO:1 to SEQ ID NO:9, which can be combined with each other to adapt the purification domain to the desired reaction conditions. By combining the single building blocks with each other, the binding strength of the purification domain to the carbohydrate matrix can be enhanced, the binding can be stabilized under specific reaction conditions (e.g. a high ionic strength) and the size of the purification domain can be varied to fit the desired target peptide domain.

Different CBMs fulfil different functions as they bind different polysaccharide bonds or motifs within polysaccharides. The functional purpose of CBMs is the binding of the fusion polypeptide to polysaccharides, in which the monomers are connected via glycosidic bonds between D- or L-glucose or other carbohydrate monomers. Preferably, the purification domain comprises or consist of at least one consensus sequence selected from the group of the CBM classes 26, 53, 41, 35, 48 or 58.

The ability of the purification domain to be deposited in inclusion bodies and to be active in basic environments can be influenced by the choice of the signal sequence and the choice of the domains of the carbohydrate binding moiety. The signal sequences according to SEQ ID NO: 126 to 129 influence the solubility of the N-Terminus during expression as well as during refolding.

The autoprotease domain exhibits the function of an autoproteolytic cleavage site, which separates the target peptide from the purification domain and the autoprotease domain. This domain is activated under certain reaction conditions. The autoprotease domain according to the invention has the advantage that it can be constructed based on different naturally occurring autoproteases, but with a limited window of activation, which can be precisely controlled. Therefore, the autoprotease domain according to the invention has a very low activity outside its reaction conditions for cleaving of the target peptide from the purification domain, and by using such an autoprotease, losses based on an autoproteolytic side-activity can be significantly reduced.

Preferably (and advantageously, in particular in connection with preferred embodiments as described herein), the autoprotease domain is activated at a pH value of 6.8 or above (i.e. is not activated below), more preferably at a pH value of from 6.8 to 7.2. Preferably, when assessing whether the autoprotease domain is activated or not at a specific pH, the skilled person may initiate the binding to starch first. The supernatant of the binding sample that has a pH above 7.2 is removed or eluted and replaced with an equal volume of activating buffer at pH 6.8 to 7.2, preferably at pH 7.2. The change in pH will in turn start the autoproteolysis. This is observable by protein analysis of the eluent or supernatant fraction by analytics well known by the skilled person. Temperature does not play a role in activation of the autoprotease.

The autoprotease $N^{pro}$ can be modified such that the pH of its environment is the activating trigger rather than the chaotrope concentration. Consequently, no trade-off between purity and product yield has to be taken into account.

The target peptide domain comprises or consists of an amino acid sequence of a target peptide or polypeptide to be produced. The domain can consist of any amino acid sequence having between 2 and more than 1000 amino acids. Preferably, the target peptide consists of an amino acid sequence of 2 to 1000 amino acids, preferably 2 to 500 amino acids, more preferably of 2 to 100 amino acids, especially preferably of 2 to 50 amino acids. In one embodiment of the present invention, the target peptide may have an amount of hydrophobic amino acids of ≥10%, based on the total number of amino acids, more preferably of ≥20%, especially preferably of ≥30% and even more preferably of ≥40%. In another embodiment, the target peptide may have an amount of hydrophilic amino acids of ≥10%, preferably of ≥20%, especially preferably of ≥30% and even more preferably of ≥40%, again based on the total number of amino acids. In yet another embodiment, the target peptide may have an amount of hydrophobic and hydrophilic amino acids of ≥10%, more preferably of ≥20%, especially preferably of ≥30% and even more preferably of ≥40%, based on the total number of amino acids.

One embodiment of the present invention relates to a fusion polypeptide according to the invention, wherein the purification domain (i) comprises or consists of an amino acid sequence selected from the group consisting of sequences according to SEQ ID NO: 10 to SEQ ID NO:116 and sequences having a sequence identity of 90%, 91%, 92%, 93%, 94%, 95%, 96%, 97%, 98%, 99% or more to any one of said sequences.

Whenever the present disclosure relates to the percentage of identity of nucleic acid or amino acid sequences to each other these values define those values as obtained by using the EMBOSS Water Pairwise Sequence Alignments (nucleotide) program or the EMBOSS Water Pairwise Sequence Alignments (protein) program for amino acid sequences. Alignments or sequence comparisons as used herein refer to an alignment over the whole length of two sequences compared to each other. Those tools provided by the European Molecular Biology Laboratory (EMBL) European Bioinformatics Institute (EBI) for local sequence alignments use a modified Smith-Waterman algorithm (see Smith, T. F. & Waterman, M. S. "Identification of common molecular subsequences" *Journal of Molecular Biology,* 1981 147 (1): 195-197). When conducting an alignment, the default parameters defined by the EMBL-EBI are used. Those parameters are (i) for amino acid sequences: Matrix=BLOSUM62, gap open penalty=10 and gap extend penalty=0.5 or (ii) for nucleic acid sequences: Matrix=DNAfull, gap open penalty=10 and gap extend penalty=0.5. The skilled person is well aware of the fact that, for example, a sequence encoding a polypeptide can be "codon-optimized" if the respective sequence is to be used in another organism in comparison to the original organism a molecule originates from.

The purification domain comprises or consists of a combination of at least one functional sequence of CBMs as stated above. This design of the purification domain was surprisingly found to offer several advantages, which are not exhibited in the naturally occurring form of carbohydrate binding enzymes. It was shown that a purification domain with the claimed sequences shows a higher binding activity over a broad temperature range, whereas naturally occurring carbohydrate-binding polypeptides, such as the human amylase, are only active in a tight temperature range. In combination to this, when operating bioprocesses, another important factor is the pH-value. It was also shown that the purification domain according to the invention offers a high binding activity also in a broad pH range and, even more surprisingly, in a combination of harsh temperatures of 0 to 80° C. and harsh pH values of down to pH 3.5 in the acidic regime and up to pH 12.0 in the basis regime.

In general, enzymes or especially the active sites of enzymes, such as the CBM of the human amylase are highly sensitive to chaotrope or detergent concentrations. It was shown in connection with the present invention, that the purification domain according to the invention is stable over a broad chaotrope and detergent concentration range.

As described above, the autoprotease domain (ii) of a fusion polypeptide according to the invention comprises or consists of an amino acid sequence according to SEQ ID NO: 117 or an amino acid sequence having a sequence identity of 90%, 91%, 92%, 93%, 94%, 95%, 96%, 97%, 98%, 99% or more to SEQ ID NO: 117.

The autoproteolytic activity of the autoproteolytic domain is based on the catalytic diade of histidine and cysteine in the active site of autoprotease enzymes. These enzymes are the basis for an autoproteolytic domain according to the invention. The basis for such an autoproteolytic domain can be the autoprotease $N^{pro}$ from the pestivirus or an autoprotease from a potyvirus, picornavirus or any other viral autoprotease. Through targeted recombination or re-design of these sequences, autoprotease domain building blocks can be designed, which exhibit alone or in combination several advantages over their natural counterpart. On the one hand, the pH sensitivity of the autoprotease can be adjusted precisely. This exhibits the advantage, that the activity of the autoprotease can be controlled to fit the desired reaction conditions. Either with a very tight pH value range to precisely activate the autoprotease at the desired pH and avoid the early release of the target peptide or also at harsh pH values, where naturally occurring autoproteases are not stable anymore.

In a further embodiment, the present invention relates to a fusion polypeptide according to the invention, wherein the autoprotease domain (ii) comprises or consists of an amino acid sequence selected from the group consisting of sequences according to SEQ ID NO: 118, SEQ ID NO: 119 or SEQ ID NO: 120 and sequences having a sequence identity of 90%, 91%, 92%, 93%, 94%, 95%, 96%, 97%, 98%, 99% or more to any one of said sequences. Through combination of the autoprotease building blocks, several preferred autoprotease domain sequences are obtained, which exhibit a high pH and temperature stability and the ability to be precisely activated over the adjusted pH-value. In a preferred embodiment, the autoprotease may be active at a pH value between 7.5 and 6 and/or in a temperature range between 4° C. and 40° C.

Another embodiment of the present invention relates to a fusion polypeptide according to the invention, comprising a signal sequence (iv), wherein the signal sequence (iv) is an inclusion body promoting sequence or a secretion sequence, preferably of secretion type IV or type II of gram-negative bacteria. Preferably, signal sequences with recurring arginine motifs in the N-terminal signal peptide that were flanked by threonine, lysine and leucine are used in the context of the present invention.

A signal sequence in context of the present invention describes a functional sequence, which guides the fusion polypeptides to specific cell compartments. Several signal sequences are known in the art. Preferably, a signal sequence selected from the group consisting of SEQ ID NO: 123, SEQ ID NO: 124, SEQ ID NO: 125, SEQ ID NO: 126, SEQ ID NO: 127, SEQ ID NO: 128, SEQ ID NO: 129 or SEQ ID NO: 130 is used. Surprisingly it was found, that these sequences do not only control inclusion body promotion but also direct the refolding process in strongly basic environments.

Signal sequences are always selected based on their influence on the reprocessing of the target peptide. In one embodiment, an inclusion body signal sequence is used, guiding the target polypeptide to inclusion bodies. It is well known in the art that polypeptides that are produced in inclusion bodies need to be refolded before further downstream processing. For example, the signal sequence Cry4AaCter (SEQ ID NO: 126) may be used, which enhances the alkaline processing of inclusion bodies. In one embodiment of the present invention, an N-terminal Tat signal may be used, which is a secretion signal of the bacterial secretion system. Using this signal sequence, the target polypeptide is secreted.

Yet another embodiment of the present invention relates to a fusion polypeptide according to the invention, comprising a linker sequence (v), wherein the linker sequence comprises an N-terminal alpha helix and/or a C-terminal sequence of a random coil structure.

A linker sequence in the context of the present invention means a sequence between the functional domains and also between the autoprotease and the target peptide. The length of the linker is preferably 1 to 50 or more than 50 amino acids. In another embodiment, the purification domain and the autoprotease domain are directly fused, i.e. without a linker. In one embodiment of the present invention, a linker sequence selected from SEQ ID NO: 121 or SEQ ID NO: 122 may be used.

One aspect of the present invention relates to a recombinant nucleic acid molecule encoding a fusion polypeptide according to the invention.

One embodiment of the present invention relates to a recombinant nucleic acid molecule selected from the group consisting of SEQ ID NO: 132, SEQ ID NO: 134, SEQ ID NO: 136, SEQ ID NO: 138, SEQ ID NO: 140, SEQ ID NO: 142 and SEQ ID NO: 144.

Yet another embodiment of the present invention relates to a recombinant amino acid molecule selected from the group consisting of SEQ ID NO: 131, SEQ ID NO: 133, SEQ ID NO: 135, SEQ ID NO: 137, SEQ ID NO: 139, SEQ ID NO: 141 and SEQ ID NO: 143.

Another aspect relates to a genetically modified cell, including a recombinant nucleic acid molecule according to the invention, wherein the cell is capable of expressing a fusion polypeptide according to the invention.

One embodiment of the invention relates to a genetically modified cell according to the invention, wherein the cell is selected from the group consisting of *Escherichia coli, Vibrio natrigens, Saccheromyces cerevisiae, Aspergillus niger*, green algae, microalgae, HEK T293 and Chinese hamster ovary cells (CHO).

Another aspect of the present invention relates to a method of preparing a target peptide comprising the steps of:

(a) providing a genetically modified cell according to the invention,
(b) culturing the cell under conditions suitable for expression of a fusion polypeptide according to the invention,
(c) obtaining the fusion polypeptide and optionally, unfolding of the obtained fusion polypeptide and directed refolding of said fusion polypeptide,
(d) contacting the fusion polypeptide obtained in step (c) with a carbohydrate matrix,
(e) cleaving the fusion polypeptide by activating the autoprotease domain of the fusion polypeptide, thereby obtaining a target peptide,
(f) collecting a mixture comprising the target peptide.

Step (a) comprises providing a genetically modified cell expressing a fusion polypeptide. Such cell is obtainable by introducing a nucleic acid molecule including a sequence encoding a fusion polypeptide, preferably in the form of a vector, into the cell by known methods such as for example by transfection or transformation. In step (b), the cell is cultured under conditions suitable for expressing a fusion polypeptide according to the invention, preferably in a high-density culture. Culture conditions and especially conditions to achieve a high-density culture and corresponding media are well known to the person skilled in the art. In one embodiment of the present invention, the expression of the fusion polypeptide is achieved with a subsequent transport to inclusion bodies using a suitable signal sequence. Step (c) comprises obtaining the fusion polypeptide from the culture broth and optionally unfolding of the obtained fusion polypeptide and directed refolding of said fusion polypeptide, if the fusion polypeptide is present in inclusion bodies. Solubilization conditions for the processing of inclusion bodies and conditions for the directed refolding are well known in the art. Preferably, inclusion bodies are solubilized by using 6 M guanidinium chloride, 8 M urea or 2% sodium dodecyl sulfate and are refolded under neutral or mildly basic conditions.

In step (d), the solubilized fusion polypeptide is contacted with a carbohydrate-based matrix such that the fusion polypeptide binds to the matrix by its purification domain. This step is performed under conditions, wherein the autoprotease domain (ii) is inactive, preferably by controlling the pH value rather than the chaotrope or denaturant concentration in order to avoid premature cleavage of the target peptide domain (iii) on the one hand and induce activity of the purification domain (i) on the other hand. Under these conditions, the amount of cleaved fusion polypeptide is preferably <10%, more preferably <5%, especially preferably <3% or even more preferably <1%, based on the total amount of fusion polypeptide. The underlying mechanism of the inactivity of the autoproteolytic domain can be described with two cases:

(1) conditions, wherein the autoprotease domain is constitutionally inactive and is only activated by a change of the environmental conditions, such as by an adaption of the temperature, the pH and/or the ionic strength, preferably by adapting the pH; or
(2) conditions wherein the autoprotease domain is constitutionally active, however, having insufficient activity to achieve a premature cleavage of the target peptide domain during the period of time necessary for performing the method step (d), i.e. is kinetically inactive, preferably for up to 10 min, more preferably for up to 20 min and especially preferably up to 30 min.

In one embodiment, step (d) is performed under native conditions, i.e. under conditions wherein the autoprotease is constitutionally active. Surprisingly, it was found that even if the fusion polypeptide is present in its native state, the autoprotease domain remains sufficiently inactive during step (d). This effect was especially present when using the hybrid $N^{pro}$ autoprotease according to SEQ ID NO: 120. Preferably, an insoluble carbohydrate matrix is used in step (d), which facilitates the separation of impurities.

In step (e), the fusion polypeptide is cleaved by the autoprotease domain and the target peptide (iii) is released. Cleavage of the fusion polypeptide may result from addition of an autoproteolysis buffer, i.e. a buffer providing conditions under which the autoprotease is active, e.g. acidic or alkaline conditions.

Step (f) results in obtaining a mixture by eluting the cleaved target peptide from the column. Preferably, the elution is done by using a buffer selected from the group consisting of HEPES, PBS, and TrisHCl at concentrations between 1 and 100 mM and 30 mM KCl, at a pH of 6.5 to 7.5. Furthermore, the preferred buffer may be supplemented by arginine at a concentration of 10 to 100 mM or by sucrose at a concentration of 2 to 20 mM.

One embodiment of the method according to the invention relates to a method, wherein the carbohydrate matrix in step (d) consists of or comprises a substance selected from the group consisting of starch, lignin carbohydrate polymers, copolymers with alpha-1,4- and alpha-1,6 glycosidic bonds of glucose or other sugars and mixtures thereof and is preferably present in a packed column, as a packed substrate or as starch grains consisting of amylose and amylopectin.

Starch is a complex mixture of carbohydrates from different sugar polymers. Plant cells collect the sugars they produce in a storage organelle called a vacuole. When the cells and organelles are mechanically destroyed, the starch granules are released. Depending on the plant species, there are differences in the raw starch. Starches can have different grain sizes ranging from less than 25 μm to more than 100 μm in diameter. The higher the proportion with diameters of over 75 μm, the higher the probability of non-specific adsorption and thus the retention of impurities in the products after starch purification. In addition, there are starch granules, such as wheat, which are porous and can absorb amylases in internal channels. Starch consists of the components amylose and amylopectin. In contrast to amylopectin, amylose is water-soluble. The swelling behavior of the respective starch in water also depends on the proportions of the two species. Thus, unpurified cornstarch in water acquires a cement-like consistency, whereas table potato starch remains water-permeable. All carbohydrate-binding enzymes have a high affinity to their substrate, which is also present under harsh conditions. Preferably, the starch grains are insoluble in water. It is furthermore preferred, if the soluble amylose parts and polypeptides have been removed from the starch.

Another embodiment of the method according to the invention relates to a method, wherein the activation of the autoprotease domain in step (e) is performed at pH 6 to pH 8, preferably at pH 6.5 to 7.5, especially preferably at pH 6.8 to pH 7.2 and even more preferably at pH 7 to pH 7.4.

One aspect of the present invention relates to a recombinant nucleic acid molecule, encoding a fusion polypeptide according to the invention and a cloning site for incorporation of a recombinant nucleic acid molecule according to the invention, optionally operatively linked to an expression control sequence. Preferably, an expression control site selected from the group consisting of IPTG controlled promotors, preferably T5 or T7, and rhamnose controlled promotors as well as an ensemble of extra tRNAs is used.

Yet another aspect of the present invention relates to a mixture comprising or consisting of a target peptide, preferably of a synthetic target peptide and a total amount of 0.001 to 1 wt.-% sodium and/or potassium, based on the total weight of the sum of sodium (if present), potassium (if present) and target peptide, wherein the mixture is obtained or obtainable by a method according to the present invention. The mixture obtained in step (f) of the method according to the invention, comprises besides the produced target peptide also specific amounts of sodium and/or potassium.

In another aspect, the present invention relates to a synthetic target peptide, wherein the peptide comprises an N-terminal proline, obtained or obtainable by a method according to the invention or to a mixture according to the invention, wherein the target peptide is a peptide comprising an N-terminal proline. It was surprisingly found, that it was able to produce synthetic target peptides with an N-terminal proline with the method according to the invention. In general, it is an exceptional challenge to produce synthetic peptides with an N-terminal proline as the proline sterically hinders the production processes of peptides of methods known in the art.

In the following, the invention is further characterized by non-limiting examples.

EXAMPLES

Example 1: Production of the Target Peptide Mellitin

A. Cloning of a Plasmid Comprising the Target Polypeptide Nucleic Acid Sequence

The fusion polypeptide according to any one of the sequences SEQ ID NO: 132, SEQ ID NO: 138, SEQ ID NO: 140 or SEQ ID NO: 142 is cloned into the expression vector pET28a together with a sequence for the target peptide mellitin and an inclusion body promoting sequence. The genetic information of the fusion polypeptide is constructed in such a way, that every building block (e.g. the purification domain or the autoprotease domain) can be interchanged easily. The restriction sites and corresponding enzymes are listed in Table 1. A standard cloning protocol using the restriction sites NcoI or NdeI and EcoRI of the pET28a vector to insert the fusion polypeptide gene is used. The obtained plasmid solution is stored for further processing.

TABLE 1

Restriction sites for the building blocks of the fusion polypeptide

| Restriction site | Position within the fusion polypeptide gene | Sequence | Restriction enzyme to be used |
|---|---|---|---|
| 1 | Vector/Signal sequence | catatg | NdeI, NcoI |
| 2 | Signal sequence/Purification tag | catatg | NdeI |
| 3 | Purification tag/Linker (N-terminal) | aaggag | CstMI |
| 4 | Linker (C-terminal)/autoprotease | ggcgcc | Eco78I, EgeI |
| 5 | Autoprotease/Target peptide | ggtnacc | AspAI, AcrII, Bse64I, BstPI, Eco91I, EcoO65I, BstEII, PspEI |
| 6 | Target peptide/vector | gaattc | EcoRI |

B. Peptide Production of Mellitin

Step 1) 5 μl of plasmid solution obtained in Example 1 comprising a DNA concentration of 100 ng/μl are transferred into a 2 ml reaction vessel containing 50 μl of pre thawed *E. coli* BL21 pLys. The mixture of plasmid and cells is incubated on ice for 30 minutes. After the incubation, the mixture of plasmid and cells is exposed to a one minute heat shock at 42° C. in a water bath. After the heat shock, the cells are relaxed on ice for 2 minutes and then treated with 950 μl of warm SOC medium. The cells including SOC medium are then incubated with continuous mild agitation at 37° C. for one hour. The cells are then spun down at 5000 rpm for two minutes at room temperature and 950 μl of the supernatant are removed. The cells are resuspended in the remaining liquid and transferred to a solid LB-agar plate on a petri dish with 25 ml of LB agar and 34 μg/ml Chloramphenicol and 38 μg/ml Kanamycin. The agar plate is then incubated over night at 37° C.

Step 2) After 24 hours, a colony is picked and transferred to 10 ml of LB medium with 34 μg/ml Chloramphenicol and 38 μg/ml Kanamycin and incubated for eight hours at 37° C. and mild agitation. 8 ml of the culture are transferred to 500 ml of LB medium with 34 μg/ml Chloramphenicol and 38 μg/ml Kanamycin in a shaking bottle and incubated with mild agitation overnight. 2 ml of the culture are held back for plasmid preparation and verification of the plasmid and insert.

Step 3) The overnight incubated culture is suspended 1:5 (v/v) in a suitable minimal medium in a 2 l shaking bottle. The culture is grown to an $OD_{600}$ of 5 and then induced with IPTG of a final concentration of 1 mM. The expression culture is run for six hours and discretely supplemented with glucose or glycerol (both 20 g/l), thiamine, citric acid and a suitable trace element solution. The solutions are added at a rate of 0.1 ml/min for 3.5 hour and an additional hour at 0.2 ml/min. The culture is harvested by centrifugation at 4° C. and 3000 rpm for 20 minutes and the cells are either promptly used for further downstream processing or shock frozen in dried ice and then stored at −80° C.

Step 4) The cells are resuspended in a lysis buffer. This buffer may contain between 0 mM and 75 mM sodium acetate, 0 mM to 20 mM HEPES, 2 mM Magnesium chloride and 1% Triton X-100. The cells are weighed in a tared reaction vessel after harvesting them by centrifugation. Ultrasonic lysis requires a fourfold excess of lysis buffer to cell mass. The lysis is carried out with sonication and a 12" cup horn tip. The protocol is performed on ice at 80 W with 15 seconds of pulsing and 20 seconds pause for 8 minutes. The soluble parts of the lysate mixture are separated from the inclusion body carrying solid phase by centrifugation at 4° C. and 5000 rpm for 25 minutes. The supernatant and the pellet are checked for their inclusion body containment via polyacrylamide gels. When the majority of the fusion polypeptide as identified by the polyacrylamide gel is found in the pellet, the gel is also checked for contaminations of the pellet. If these contaminations are significant, the pellet needs to be washed. It is resuspended in the same lysis buffer again and kept on ice for 10 minutes. The suspension is homogenized by vortexing every two minutes. After the incubation, the procedure is repeated once more. After the third centrifugation step, the pellet is resuspended in water and incubated for ten minutes on ice including regular vortexing as described above. The suspension is centrifuged for 25 minutes at 4° C. and 5000 rpm. The pellet is now weighed a second time and prepared for the next steps.

Step 5) The washed inclusion bodies of step 4 are unfolded. The ratio of the inclusion bodies to the used buffer (w/v) is not lower than 1:10. The chaotropic buffers contain at least either 6 M guanidinium chloride or 8 M urea. The detergent based buffer contains 5% (w/v) Natriumlaurylsulfat (SDS) and optionally up to 20 mM HEPES. The pH-value is controlled with sodium acetate, sodium hydroxide and/or potassium hydroxide. When resuspended, the mixture is incubated at room temperature for 40 to 60 minutes while being vortexed for 30 seconds every 10 minutes.

Step 6) A column is packed with starch as column material (which is the substrate of fusion polypeptide binding). The starch may be unaltered or sieve filtered such that the starch grains have a grain size of between 25 and 50 μm. The starch is washed several times with water and/or buffer for protein stabilization in order to remove protein and soluble amylose from the starch. The starch is preferably wheat or potato starch. The latter can be used as a column material easily. The washed and sieved starch grains are packed in a column in the case of wheat and potato starch together with liquid. The fusion polypeptide still immersed in the unfolding buffer is now diluted with an activating buffer. The dilution is performed such that only the binding moiety will refold and allow for binding to the column material. For guanidinium chloride, the final concentration of the chaotrope should be between 4.5 M and 5 M. For urea, the dilution concentration should be between 5 M and 6 M for any of the fusion polypeptides. SDS is not necessarily to be removed from the mixture of unfolded fusion polypeptide and denaturation buffer. SDS is removed from the solution and precipitated by either titrating 30 mM potassium chloride solution to the mixture, cooling the mixture to 0 to 4° C. or taking both SDS removal measures at the same time. One can decrease the SDS concentration to 0.5% SDS in the mixture without activating the autoprotease. Then, the mixture is brought into contact with the column material and excess SDS can be removed using potassium chloride or cooling or using both methods without clogging the column material.

Step 7) The diluted buffer is released and eluted. The wash elution is discarded. The column is washed with one column volume of water. The fusion polypeptide is bound to the column material and can be left on the column while the autoproteolytic domain becomes activated. As soon as the residues of the denaturing buffer are removed, the bound fusion polypeptides are active. The column material is immersed in a little more than one volume of activating buffer (Table 2), which amounts to 5 ml of buffer to 500 mg of column material. The column is then incubated at temperatures of between 2° C. and 37° C. The autoprotease is now active in the starch matrix of both methods. The incubation period can last from 80 minutes at between 2° C. to 8° C. to four hours from 9° C. to 22° C. and 12 hours from 23° C. to 37° C. During this period, the target peptide is released from the fusion polypeptide that is bound to the starch material.

Step 8) The target peptide, which has been released in the previous step, is collected. 50% column volume of the activating buffer or water are added to wash the total amount of target peptide from the column. The eluate or supernatant that contains the target peptide is precipitated in 1:3 (v/v) ethanol. The mixture of product and ethanol is centrifuged at 5000 rpm and 4° C. for ten minutes. The supernatant is discarded and the precipitate is freeze-dried overnight. The freeze-dried sample is then dissolved in a suitable solvent (e.g. 60% to 80% methanol, DMF, deionized water) and sonicated at 40 W in an ultrasonic bath for one hour at room temperature. The sample is then centrifuged for 10 minutes at 5000 rpm and 25° C. The supernatant contains the pure target peptide. Table 3 shows different target yields of mellitin used together with different fusion polypeptides in comparison with the achieved cell masses.

TABLE 2

| Composition of the activating/autoproteolytic buffer | |
|---|---|
| Ingredients | Concentration [mM] |
| Arginine | 10 to 100 |
| HEPES | 20 |
| Tris HCl | 0 to 100 |
| Sucrose | 2 to 20 |

TABLE 3

Yields of fusion polypeptides

| SEQ ID No.: | Cell mass LB medium [g/liter culture] | Corresponding inclusion body weight [g/liter culture] | Cell mass high cell density [g/liter culture] | Target peptide yield [mg/liter culture] |
|---|---|---|---|---|
| 131 | 8 to 12 | 3 to 4 | 30 to 40 | 10 to 12 |
| 137 | 14 to 16 | 3 to 4 | 80 to 93 | 21 to 28 |
| 139 | 25 to 35 | 8 to 12 | 75 to 90 | 25 to 32 |
| 141 | 28 to 36 | 14 to 22 | 115 to 135 | 56 to 70 |

Example 2: Production of the Target Peptide GFP

A. Cloning of a Plasmid Comprising the Target Polypeptide Nucleic Acid Sequence

The fusion polypeptide according to any one of the sequences SEQ ID NO: 132, SEQ ID NO: 138, SEQ ID NO: 140 or SEQ ID NO: 142 is cloned into the expression vector pET28a together with a sequence for the target peptide green fluorescent polypeptide (GFP) and an inclusion body promoting sequence. The fusion polypeptide gene consists of three major and two optional building blocks that are organized in a certain order from N-terminus to C-terminus. All building blocks are separated by restriction sites on a genetic level. The restriction sites and corresponding enzymes are listed in Table 4.

A standard cloning protocol using the restriction sites NcoI or NdeI and EcoRI of any vector of the pET family to insert the fusion polypeptide gene is used. The obtained plasmid solution is stored for further processing.

TABLE 4

Restriction sites for the building blocks of the fusion polypeptide

| Restriction site | Position within the fusion polypeptide gene | Sequence | Restriction enzyme to be used |
|---|---|---|---|
| 1 | Vector/Signal sequence | catatg | NdeI, NcoI |
| 2 | Signal sequence/Purification tag | catatg | NdeI |
| 3 | Purification tag/Linker (N-terminal) | aaggag | CstMI |
| 4 | Linker (C-terminal)/autoprotease | ggcgcc | Eco78I, EgeI |
| 5 | Autoprotease/Target peptide | ggtnacc | AspAI, AcrII, Bse64I, BstPI, Eco91I, EcoO65I, BstEII, PspEI |
| 6 | Target peptide/vector | gaattc | EcoRI |

B. Polypeptide Production of GFP

The following production protocol was executed for fusion polypeptides with SEQ ID NOs: 131 and 137 having an amino acid sequence for GFP as target polypeptide. In comparison to the fusion polypeptides according to the invention, fusion polypeptides according to WO2019138125 (WO'125) were constructed. These fusion polypeptides have the following domain architecture:

ssTorrA (inclusion body promoting sequence, SEQ ID NO: 2 of WO'125)—3x-CBM *Aspergillus niger* (Binding domain, SEQ ID NO:10 of WO'125)—$N^{pro}$ (autoproteolytic domain, SEQ ID NO: 12 of WO'125).

ssTorrA (inclusion body promoting sequence, SEQ ID NO: 2 of WO'125)-Amylase-homo-*sapiens* (Binding domain, SEQ ID NO: 5 of WO'125)—$N^{pro}$ (autoproteolytic domain, SEQ ID No. 12 of WO'125)

Step 1) Transformation:

5 μl of plasmid solution obtained in Example 2 A comprising a DNA concentration of 100 ng/μl are transferred into a 2 ml reaction vessel containing 50 μl of pre thawed *E. coli* BL21 pLys or any other BL21 derivative. The mixture of plasmid and cells is incubated on ice for 30 minutes. After the incubation, the mixture of plasmid and cells is exposed to a one minute heat shock at 42° C. in a water bath. After the heat shock, the cells are relaxed on ice for 2 minutes and then treated with 950 μl of warm SOC medium. The cells including SOC medium are then incubated with continuous mild agitation at 37° C. for one hour. The cells are then spun down at 5000 rpm for two minutes at room temperature and 950 μl of the supernatant are removed. The cells are resuspended in the remaining liquid and transferred to a solid LB-agar plate on a petri dish with 25 ml of LB agar and 30 μg/ml Chloramphenicol and 30 μg/ml Kanamycin. The agar plate is then incubated over night at 37° C.

Step 2) Colony Picking and Inoculation Culture Preparation:

After 24 hours, a colony is picked and transferred to 10 ml of LB medium with 30 μg/ml Chloramphenicol and 30 μg/ml Kanamycin and incubated for eight hours at 37° C. and mild agitation. 8 ml of the culture are transferred to 500 ml of LB medium with 30 μg/ml Chloramphenicol and 30 μg/ml Kanamycin in a shaking bottle or used as an inoculation culture immediately and incubated with mild agitation over a suitable amount of time, ranging from three hours of expression to overnight 20 expression. 2 ml of the culture are held back for plasmid preparation and verification of the plasmid and insert.

Step 3) Fusion Polypeptide Expression:

The expression culture is grown in a 2 l shaking bottle and induced with a suitable amount of a chemical inducer, including lactose, rhamnose and Isopropyl-β-D-thiogalactopyranosid (IPTG). The culture is grown at a temperature of 37° C., agitated at shaking between 150 and 250 rpm to the exponential growth phase, and induced. The expression culture is run for six hours and discretely supplemented with glucose or glycerol (both 20 g/l), thiamine, citric acid and a suitable trace element solution. The solutions are added at a rate of 0.1 ml/min for 3.5 hour and an additional hour at 0.2 ml/min. The culture is harvested by centrifugation at 4° C. and 3000 rpm for 20 minutes and the cells are either promptly used for further downstream processing or shock frozen in dried ice and then stored at −80° C.

Step 4) Cell Lysis and Inclusion Body Preparation:

The cells are resuspended in a lysis buffer. This buffer may contain between 0 mM and 75 mM sodium acetate, 0 mM to 20 mM 2-[4-(2-hydroxyethyl) piperazin-1-yl]ethane sulfonic acid (HEPES), 2 mM Magnesium chloride and 1%

Triton X-100. The pH of the lysis and washing buffer is set to a pH above 9.0. The cells are weighed in a tared reaction vessel after harvesting them by centrifugation. Lysis can be performed using sonication, dispersion or French press. The soluble parts of the lysate mixture are separated from the inclusion body carrying solid phase by centrifugation at 4° C. and 8000 rpm for 10 minutes. The last washing step is performed in water to eliminate Triton X-100 traces and to remove DNA and cytoplasmic polypeptide residues. The supernatant and the pellet are checked for inclusion bodies and active fusion polypeptide via polyacrylamide gels to test for contaminations. If these contaminations are significant, the pellet needs to be washed. The pellet is resuspended in the same lysis buffer again and kept at 4° C. to 0° C. for 10 minutes. The suspension is homogenized by vortexing (e.g. for 30 seconds every 5 minutes). The incubation and centrifugation of the pellet is repeated once. Finally, the pellet is resuspended in water and incubated for ten minutes on ice including vortexing (e.g. as described above). The suspension is centrifuged for 25 minutes at 4° C. and between 6000 and 7000 rpm. The contaminations including DNA and undesired polypeptide are less dense than the inclusion body fraction and can be discarded as part of the supernatant. The pellet is now weighed a second time and prepared for the following step.

Step 5) Inclusion Body Denaturation:

The washed inclusion bodies of step 4 are denatured by unfolding them. The ratio of the inclusion bodies to the denaturation buffer (w/v) is not lower than 1:10 if urea (II) and guanidinium chloride (III) containing chaotropic buffers are used. The chaotropic buffers contain at least either 6 M guanidinium chloride or 8 M urea. The detergent based buffer contains up to 2% (w/v) sodium dodecyl sulphate (SDS) and optionally up to 20 mM HEPES. The pH-value is controlled with sodium acetate, acetate, sodium hydroxide and/or potassium hydroxide. The denaturation buffer (III) is set to pH 9.0 or higher. The ratio of inclusion bodies to SDS buffer is 1:8 (g/ml). When resuspended, the mixture is incubated at room temperature for 40 to 60 minutes while being vortexed for 30 seconds every 10 minutes. The fusion polypeptide is denatured by SDS that is present in the denaturation buffer (III). The fusion polypeptide can be stored at room temperature dissolved in the denaturation buffer (III) for at least two weeks (FIG. 5). The SDS in the buffer is removed from the buffer that contains the fusion polypeptide by cooling the solution down to 4° C. for at least one hour. The SDS is precipitated removing a small percentage of the polypeptide that is bound to SDS. SDS crystals are removed by centrifugation at 4° C., 2000 rpm to 5000 rpm and 4 minutes to 8 minutes. The supernatant is collected and stored at 4° C. If further SDS precipitates, the suspension is centrifuged once more as described above. The pH value of the SDS free buffer is checked. The observed pH range was between 9.0 and 11.0 for the SDS deprived buffer containing fusion polypeptide. According to FIG. 5, the fusion polypeptide did not decay when stored in the SDS free buffer at 4° C. for at least two weeks.

Denaturation buffer (I) and (II) can also be used. However, the denaturation buffer (III) exhibits several advantages, i.e. easy removal of the detergent SDS, low costs of SDS (SDS can be recycled after precipitation) and immediate, detergent-free use or storage. In opposite to the denaturation buffer (I) and (II), no loss in product is observed.

TABLE 5

Composition of denaturating buffers

| Buffer name of the denaturation buffer | Buffer composition |
|---|---|
| Denaturation buffer (I) | HEPES (20 mM), urea (8M) |
| Denaturation buffer (II) | HEPES (20 mM), Guanidinium hydrochloride (6M) |
| Denaturation buffer (III) | HEPES (20 mM), SDS (2% = 2 g SDS/100 ml); pH 9.5 |

Step 6) Preparation and Packing of Binding Material:

Potato starch and corn starch, both comprising a grain diameter smaller than 32 μm are used to pack a column. The starches are washed with a polypeptide collection buffer that removes soluble starch associated polypeptides. The starch to buffer ratio is 1:2 w/v. The buffer consists of 50 mM 2-Amino-2-(hydroxymethyl) propane-1,3-diol (Tris) and 50 mM sodium chloride (NaCl), pH 7.2. The starches are constantly agitated at 37° C. for one hour to prevent sedimentation. The incubation is followed by centrifugation at 20° C. and 6000 rpm for 12 minutes. The supernatants are removed and the starches are dried at 45° C. for eight hours. The dried prepared starches are stored at room temperature. Columns are packed using a mixture of the prepared corn starch and potato starch. Suitable mixtures of corn starch to potato starch include 1:1, 2:3 and 1:4. The dried starches are mixed in the desired ratio by vortexing. A starch slurry for column packing is prepared by suspending the starch mixture in an activation buffer. The activation buffer that is used for column packing is also used for loading the fusion polypeptide sample. The activation buffer that is used to prepare the starch slurry is called activation buffer (I) (Table 7). Activation buffer (I) allows for the binding domain of the fusion polypeptide to bind the starch material without the autoprotease of the fusion polypeptide being activated.

The starch slurry that is described above can be brought into contact with the fusion polypeptide in different ways. A gravity flow column may be packed, an FPLC column may be packed or the contact between the fusion polypeptide and the starch slurry is made in a centrifugation beaker and activation buffer (I) is removed via centrifugation.

TABLE 6

Composition of the starch washing buffer (pH 7.2)

| Ingredient | Concentration [mM] |
|---|---|
| Sodium chloride | 50 |
| Tris | 50 |

TABLE 7

Composition of the activation buffer (I) (pH 9.4)

| Ingredient | Concentration [mM] |
|---|---|
| HEPES | 20 |
| Arginine | 100 |
| Sucrose | 20 |

TABLE 8

| Composition of the activation buffer (II) (pH 7.2) | |
|---|---|
| Ingredient | Concentration [mM] |
| HEPES | 20 |
| Arginine | 10 |
| sucrose | 2 |

Step 7) Purification:

The fusion polypeptide is dissolved in detergent free denaturating buffer (III) (Table 5). The column material that is used in one of the ways described in step 6 is equilibrated. Fusion polypeptide bearing detergent free solution is mixed with activating buffer (I) at a ratio of 1 ml fusion polypeptide solution to between 4 and 6 ml of activating buffer (I). This mixture is loaded on the starch material.

The bound fusion polypeptide will be activated in the presence of activating buffer (II) (Table 8) that is used for elution. This is not possible when using the method and fusion polypeptide described in WO2019138125. When working with the approach of WO2019138125, the chaotropic substances have to be removed completely, to activate the carbohydrate-binding moiety. In the meantime, the autoprotease is already active, which accounts for a significant loss of product. In the current invention, a way has been found, to get an active purification domain (i) allowing for easy removal of any contaminant before the autoprotease is activated. A further observation refers to the temperature dependence of native $N^{pro}$ and the EDDI mutant. Both have been found to be most active between 2° C. and 8° C. This is not the case for the new purely pH-sensitive autoprotease of SEQ ID NO: 131. The pH range of the autoprotease of the fusion polypeptide according to the SEQ ID NO: 131 is very narrow (pH 6.8 to 7.2). In a purification performed at 23° C., the product GFP is released 15 minutes after the first contact with pH 7.2. The complete GFP that has been loaded on the column as part of the fusion polypeptide is released within thirty minutes. For the previously known $N^{pro}$ the incubation period can last from 80 minutes at between 2° C. to 8° C. to four hours from 9° C. to 22° C. and 12 hours from 23° C. to 37° C.

Step 8) GFP Collection

The target peptide, which has been released in the previous step, is collected. 50% column volume of the activating buffer (II) or water are added to wash the total amount of target peptide from the column. The eluate or supernatant that contains the target peptide is precipitated in 1:1 (v/v) ethanol. The mixture of product and ethanol is centrifuged at 5000 rpm and 4° C. for ten minutes. The supernatant is discarded and the precipitate is freeze-dried overnight. The freeze-dried sample is then dissolved in a suitable solvent and sonicated at 40 W in an ultrasonic bath for one hour at room temperature. The sample is then centrifuged for 10 minutes at 5000 rpm and 25° C. The supernatant contains the pure target peptide.

For GFP, 500 mg per liter culture were a typical yield. Table 9 shows the yields of fusion polypeptide according to the invention (SEQ ID NOs: 131 and 137) in comparison to fusion polypeptide constructs according to WO'125. An SDS gel depicting the results from the downstream processing of a fusion polypeptide according to SEQ ID NO: 131 with GFP as target protein in comparison to the fusion polypeptide construct ssTorrA-3x-CBM *Aspergillus niger*-$N^{pro}$ from WO'125 is depicted in FIG. 4.

TABLE 9

Yields of different fractions in the purification process of different target polypeptides

| SEQ ID No.: | Cell mass LB medium [g/liter culture] | Corresponding inclusion body weight [g/liter culture] | Cell mass high cell density [g/liter culture] | Target peptide yield [mg/liter culture] |
|---|---|---|---|---|
| 131 | 8 | 2.1 | 32 | 810 |
| 137 | 6 | 0.86 | 19 | 200 |
| ssTorrA-3x-CBM Aspergillus niger-$N^{pro}$ (WO'125) | 5 | 0.53 | 12 | 120 |
| ssTorrA-amylase-homo-sapiens-$N^{pro}$ (WO'125) | 7 | 0.48 | 11 | 90 |

Example 3: Binding Kinetics of Fusion Polypeptides According to the Invention The following Table 10 shows a comparison of five different fusion polypeptides in terms of their purification using different binding materials. The inclusion bodies are denatured with 2% SDS or secreted fusion polypeptide was used. One volume of 30 mM KCl is used for elution. The same fusion polypeptide is investigated under the same conditions and brought in contact with either maize starch, wheat starch and centrifugation, wheat starch in a column and potato starch in a column. The table shows the target peptide yield (mellitin peptide) in mg/l culture for each construct.

TABLE 10

Comparison of five fusion polypeptides

| SEQ ID No.: | Maize with centrifugation [mg/l culture] | Wheat with centrifugation | Wheat in column | Potato in column |
|---|---|---|---|---|
| 131 | 26 to 33 | 46 to 52 | 48 to 53 | 49 to 51 |
| 137 | 44 to 58 | 61 to 63 | 50 to 54 | 46 to 53 |
| 139 | 51 to 56 | 55 to 59 | 62 to 65 | 54 to 58 |
| 141 | 56 to 59 | 61 to 63 | 68 to 71 | 67 to 74 |
| 143 | 21 to 29 | 28 to 31 | 33 to 35 | 31 to 38 |

Example 4: Assessing Different Production Process Steps Using GFP

The efficiency of inclusion body production is assessed using GFP. As the absorption and fluorescence characteristics of GFP is known under various conditions, GFP absorption and fluorescence are used to investigate production steps. Super folder GFP is used as a target polypeptide. A pre culture of bacteria carrying the expression plasmid with the GFP carrying fusion polypeptide as an insert is grown overnight. This pre-culture is used to inoculate the expression culture. Prior to induction the culture is split and only one of the cultures is induced with IPTG. The non-induced culture is used as a blank for the induction culture. 1 ml of both cultures is collected to measure the $OD_{600}$ at each time point. For both cultures, a dilution series is created in TNG buffer, which consists of 100 mM Tris HCl, 50 mM sodium chloride and 10% glycerol (w/v). The non-induced cells of the dilution series are used as a blank for the induced cells of the same dilution. The same samples are used for measurements of the absorption at 600 nm and the fluorescence in the range of GFP. Each sample is treated with the same amount of rhodamine as an internal standard. The cell aliquots, where the fluorescence has been measured, are centrifuged in tared vessels and the supernatant is removed. The weight of the cell mass is used to relate the cell mass to absorption and fluorescence. The remaining aliquots of the 1 ml samples are diluted in the same way as the samples for optical measurements. This new dilution series is subjected to cell lysis. The supernatant and pellet are separated by centrifugation. The supernatants are treated with rhodamine as before. After the measurement, the samples are precipitated in ethanol and the mass is determined. In this way, the GFP in the pellet and the supernatant can be compared to each other. Super folder GFP can be also determined in inclusion bodies. The fluorescence measurement is performed at 491 nm as an excitation wavelength and 512 nm as emission wavelength.

Figure 1:
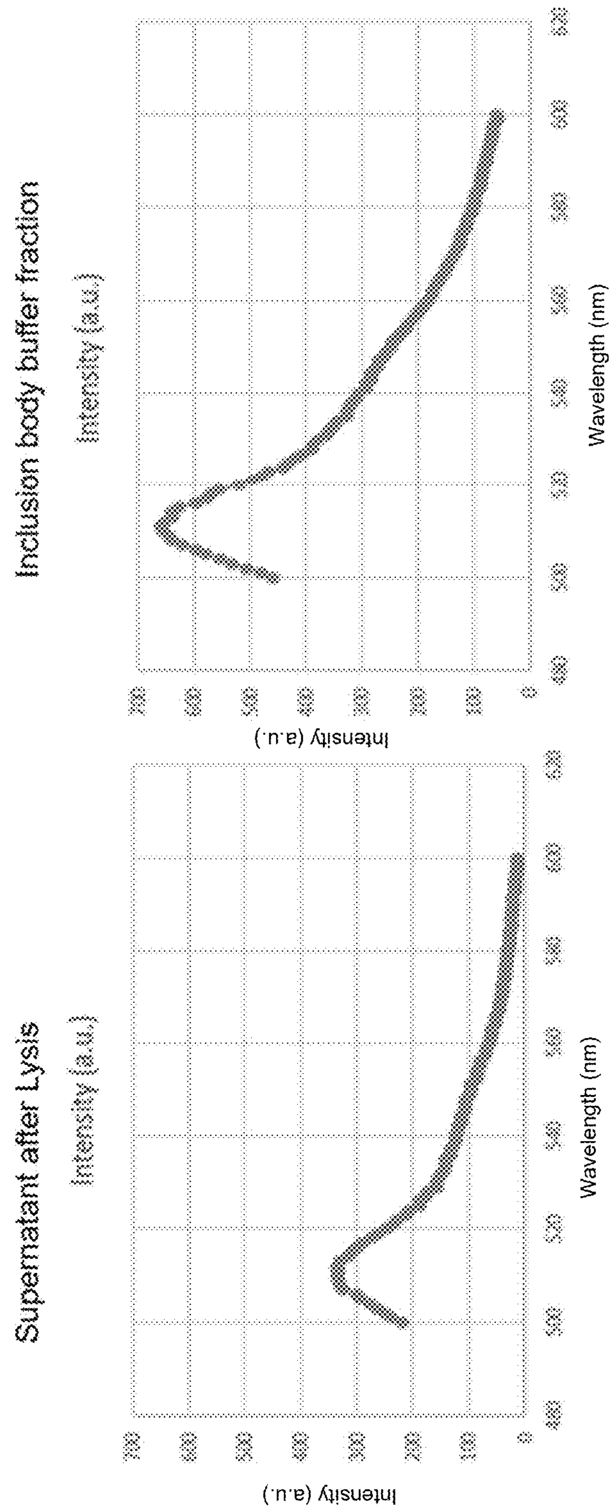
FIG. 1 illustrates the results of a GFP measurement in the inclusion body fraction.

In FIG. 1 GFP fluorescence of two different samples is shown. To the left hand side, the fluorescence in the lysate sample is shown, where no or little fluorescence is expected. In the figure to the right hand side, a clear fluorescence is accounted for GFP production is shown. This figure shows that GFP has been produced.

Example 5: Testing of Fusion Polypeptide Binding

Testing of binding of the fusion polypeptide to the starch matrix is tested. Therefore, an aliquot of the column or centrifuge beaker pellet material (100 mg) is transferred to a 2 ml reaction vessel and treated with 500 μl of a solution of 1% SDS and 10 mM mercaptoethanol in water. The mixture is agitated at 800 rpm and 37° C. for ten minutes. The sample is then centrifuged for five minutes at 10000 rpm and room temperature. 15 μl of the supernatant are used for SDS polyacrylamide gel sample preparation and successive polyacrylamide gel analysis. As the mass of the fusion polypeptide is known, it is possible to identify the right mass in the gel.

Figure 2:
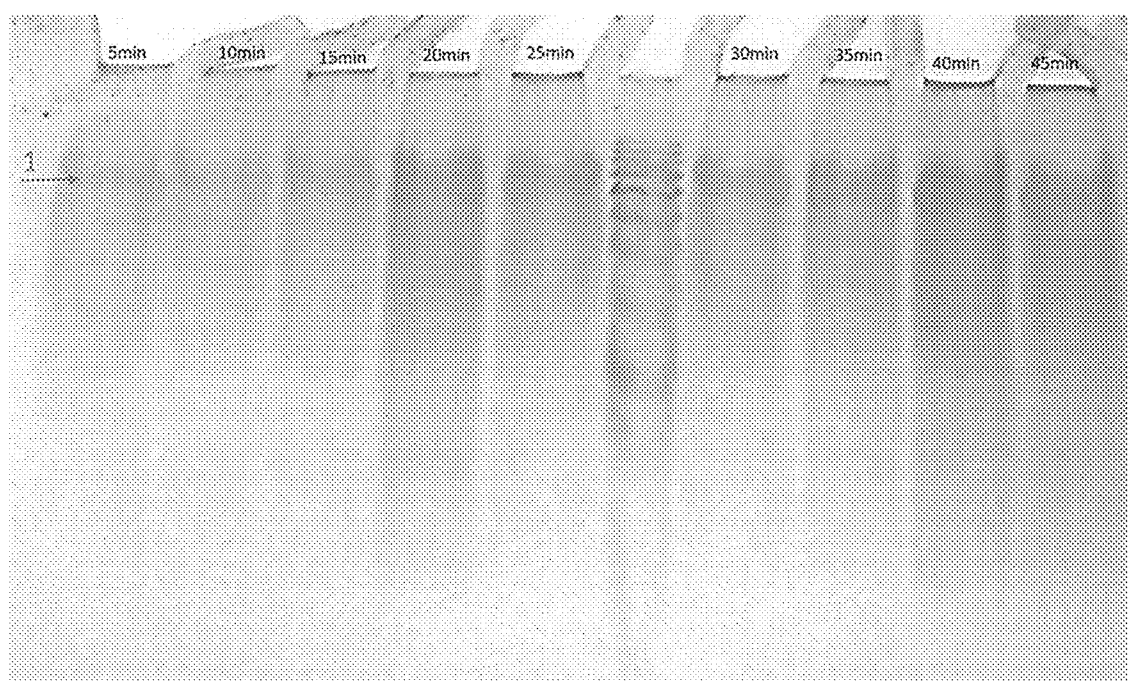
FIG. 2 shows the binding of the fusion polypeptide according to the invention to different starch samples.
Figure 3:
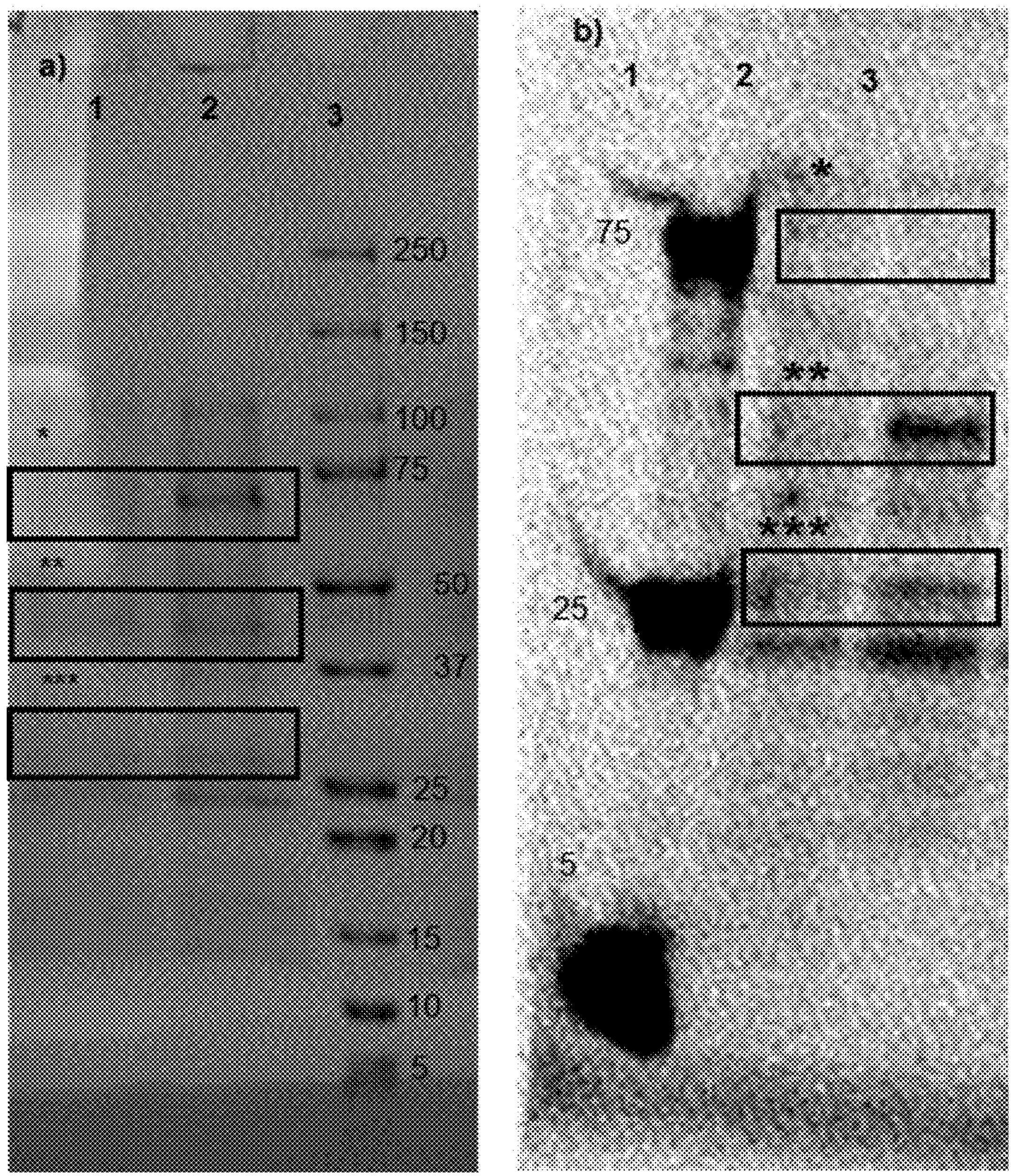
FIG. 3 shows an SDS-PAGE with the expression of fusion polypeptides with SEQ ID NO: 131 and GFP as target polypeptide in comparison to a fusion polypeptide constructed according to WO'125 with GFP as target polypeptide.

FIG. 2 shows a 12% polyacrylamide gel depicting the kinetical observation of the binding of fusion polypeptide to a wheat column. Nine wheat starch samples are loaded with activated fusion polypeptide and the supernatant is eluted. The sample starches are extracted after a certain time point and the resulting samples are loaded on a 12% polyacrylamide gel. FIG. 2 therefore shows that the fusion polypeptide binds to the starch.

The invention claimed is:

1. A fusion polypeptide comprising in direction from the N-terminus to the C-terminus: (i) a first domain comprising the amino acid sequence selected from the group consisting of SEQ ID NOs: 1-9; (ii) a second domain comprising the amino acid sequence that is at least 90% identical to the amino acid sequence of SEQ ID NO: 117; and (iii) a target peptide domain.

2. The fusion polypeptide as in claim 1, further comprising a signal sequence, wherein the signal sequence comprises the amino acid sequence selected from the group consisting of SEQ ID NOs: 123-130.

3. The fusion polypeptide as in claim 1, further comprising a linker.

4. The fusion polypeptide as in claim 3, wherein the linker comprises the amino acid sequence selected from the group consisting of SEQ ID NOs: 121 and 122.

5. A fusion polypeptide comprising in direction from the N-terminus to the C-terminus: (i) a purification domain comprising the amino acid sequence selected from the group consisting of SEQ ID NOs: 10-116, wherein the purification domain binds to a carbohydrate matrix; (ii) an autoprotease domain comprising the amino acid sequence selected from the group consisting of SEQ ID NOs: 118-120; and (iii) a target peptide domain.

6. The fusion polypeptide as in claim 5, wherein the purification domain comprises the amino acid sequence selected from the group consisting of SEQ ID NOs: 10-13.

7. The fusion polypeptide as in claim 5, further comprising a signal sequence, wherein the signal sequence comprises the amino acid sequence selected from the group consisting of SEQ ID NOs: 123-130.

8. The fusion polypeptide as in claim 5, further comprising a linker.

9. The fusion polypeptide as in claim 8, wherein the linker comprises the amino acid sequence selected from the group consisting of SEQ ID NOs: 121 and 122.

* * * * *

SEQUENCE LISTING

```
<160> NUMBER OF SEQ ID NOS: 144

<210> SEQ ID NO 1
<211> LENGTH: 9
<212> TYPE: PRT
<213> ORGANISM: Artificial Sequence
<220> FEATURE:
<223> OTHER INFORMATION: Synthetic Construct
<220> FEATURE:
<221> NAME/KEY: misc_feature
<222> LOCATION: (7)..(8)
<223> OTHER INFORMATION: Xaa can be any naturally occurring amino acid

<400> SEQUENCE: 1

Val Tyr Phe Lys Lys Pro Xaa Xaa Trp
1               5


<210> SEQ ID NO 2
<211> LENGTH: 7
<212> TYPE: PRT
<213> ORGANISM: Artificial Sequence
<220> FEATURE:
<223> OTHER INFORMATION: Synthetic Construct
<220> FEATURE:
<221> NAME/KEY: misc_feature
<222> LOCATION: (5)..(5)
<223> OTHER INFORMATION: Xaa can be any naturally occurring amino acid

<400> SEQUENCE: 2

Trp Pro Gly Val Xaa Met Thr
1               5


<210> SEQ ID NO 3
<211> LENGTH: 7
<212> TYPE: PRT
<213> ORGANISM: Artificial Sequence
<220> FEATURE:
<223> OTHER INFORMATION: Synthetic Construct
<220> FEATURE:
<221> NAME/KEY: misc_feature
<222> LOCATION: (3)..(3)
```

```
<223> OTHER INFORMATION: Xaa can be any naturally occurring amino acid
<220> FEATURE:
<221> NAME/KEY: misc_feature
<222> LOCATION: (5)..(5)
<223> OTHER INFORMATION: Xaa can be any naturally occurring amino acid

<400> SEQUENCE: 3

His Tyr Xaa Arg Xaa Asp Gly
1               5


<210> SEQ ID NO 4
<211> LENGTH: 7
<212> TYPE: PRT
<213> ORGANISM: Artificial Sequence
<220> FEATURE:
<223> OTHER INFORMATION: Synthetic Construct
<220> FEATURE:
<221> NAME/KEY: misc_feature
<222> LOCATION: (5)..(5)
<223> OTHER INFORMATION: Xaa can be any naturally occurring amino acid

<400> SEQUENCE: 4

Glu Val Trp Ile Xaa Gln Glu
1               5


<210> SEQ ID NO 5
<211> LENGTH: 9
<212> TYPE: PRT
<213> ORGANISM: Artificial Sequence
<220> FEATURE:
<223> OTHER INFORMATION: Synthetic Construct
<220> FEATURE:
<221> NAME/KEY: misc_feature
<222> LOCATION: (6)..(6)
<223> OTHER INFORMATION: Xaa can be any naturally occurring amino acid

<400> SEQUENCE: 5

Leu Arg Ile His Tyr Xaa Arg Glu Asp
1               5


<210> SEQ ID NO 6
<211> LENGTH: 13
<212> TYPE: PRT
<213> ORGANISM: Artificial Sequence
<220> FEATURE:
<223> OTHER INFORMATION: Synthetic Construct
<220> FEATURE:
<221> NAME/KEY: misc_feature
<222> LOCATION: (4)..(4)
<223> OTHER INFORMATION: Xaa can be any naturally occurring amino acid

<400> SEQUENCE: 6

Ser Glu His Xaa Gly Tyr Thr Gly Tyr Val Gly Gly Phe
1               5                   10


<210> SEQ ID NO 7
<211> LENGTH: 18
<212> TYPE: PRT
<213> ORGANISM: Artificial Sequence
<220> FEATURE:
<223> OTHER INFORMATION: Synthetic Construct
<220> FEATURE:
<221> NAME/KEY: misc_feature
<222> LOCATION: (10)..(10)
<223> OTHER INFORMATION: Xaa can be any naturally occurring amino acid
<220> FEATURE:
<221> NAME/KEY: misc_feature
<222> LOCATION: (12)..(12)
<223> OTHER INFORMATION: Xaa can be any naturally occurring amino acid

<400> SEQUENCE: 7
```

```
Tyr Lys Phe Val Leu Asp Trp Ser Asn Xaa Ser Xaa Pro Thr Val Thr
1               5                   10                  15

Val Ser


<210> SEQ ID NO 8
<211> LENGTH: 14
<212> TYPE: PRT
<213> ORGANISM: Artificial Sequence
<220> FEATURE:
<223> OTHER INFORMATION: Synthetic Construct
<220> FEATURE:
<221> NAME/KEY: misc_feature
<222> LOCATION: (8)..(8)
<223> OTHER INFORMATION: Xaa can be any naturally occurring amino acid

<400> SEQUENCE: 8

Lys Tyr Leu Tyr Tyr Gly Asp Xaa Ile Cys Lys Lys Phe Tyr
1               5                   10


<210> SEQ ID NO 9
<211> LENGTH: 18
<212> TYPE: PRT
<213> ORGANISM: Artificial Sequence
<220> FEATURE:
<223> OTHER INFORMATION: Synthetic Construct
<220> FEATURE:
<221> NAME/KEY: misc_feature
<222> LOCATION: (7)..(7)
<223> OTHER INFORMATION: Xaa can be any naturally occurring amino acid
<220> FEATURE:
<221> NAME/KEY: misc_feature
<222> LOCATION: (9)..(9)
<223> OTHER INFORMATION: Xaa can be any naturally occurring amino acid

<400> SEQUENCE: 9

Glu Leu Thr Val Asp Phe Xaa Ser Xaa Trp Gly Phe Leu Ile Arg Thr
1               5                   10                  15

Ser Asn


<210> SEQ ID NO 10
<211> LENGTH: 89
<212> TYPE: PRT
<213> ORGANISM: Artificial Sequence
<220> FEATURE:
<223> OTHER INFORMATION: Synthetic Construct

<400> SEQUENCE: 10

Phe Thr Asn Trp Tyr Lys Phe Val Leu Asp Trp Ser Asn Phe Gly Arg
1               5                   10                  15

Pro Thr Val Thr Val Ser Trp Phe Asn Asn Asp Asp Trp Thr Phe Ser
            20                  25                  30

Leu Thr Leu Gln Thr Gly Leu Lys Tyr Leu Tyr Tyr Gly Asp Val Ile
        35                  40                  45

Cys Lys Lys Phe Tyr Asn Gly Asn Cys Thr Gly Ile Glu Leu Thr Val
    50                  55                  60

Asp Phe Gly Lys Ala His Trp Gly Phe Leu Ile Arg Thr Ser Asn Pro
65                  70                  75                  80

Phe Ile Ala Ile His Lys Tyr Gly Ala
                85


<210> SEQ ID NO 11
<211> LENGTH: 59
<212> TYPE: PRT
<213> ORGANISM: Artificial Sequence
```

<220> FEATURE:
<223> OTHER INFORMATION: Synthetic Construct

<400> SEQUENCE: 11

Val Tyr Phe Lys Lys Pro Val Ala Trp Glu Phe Ile Lys Leu Val Tyr
1               5                   10                  15

Tyr Trp Thr Ser Gly His Tyr Asp Asn Gly Val Ser Trp Pro Gly Val
            20                  25                  30

Ser Met Thr Gly Asn Ser Thr His Trp Tyr Ser Tyr Thr Gln Ile Ala
        35                  40                  45

Val Asn Asp Glu Phe Leu Val Ala Phe Asn Asp
    50                  55

<210> SEQ ID NO 12
<211> LENGTH: 88
<212> TYPE: PRT
<213> ORGANISM: Artificial Sequence
<220> FEATURE:
<223> OTHER INFORMATION: Synthetic Construct

<400> SEQUENCE: 12

Phe Thr Asn Val Tyr Lys Lys Pro Asn Gln Trp Ala Phe Gly Arg Gly
1               5                   10                  15

Asn Arg Val Tyr Tyr Trp Phe Asn Asn Asp Asp Trp Thr Phe Ser Leu
            20                  25                  30

Trp Pro Gly Val Gly Met Thr Pro Gly Thr Tyr Cys Trp Tyr Ile Tyr
        35                  40                  45

Thr Asp Lys Ile Asn Gly Asn Cys Thr Gly Val Lys Ile Tyr Phe Asn
    50                  55                  60

Asp Gly Lys Ala His Phe Ser Ile Ser Asn Ser Ala Glu Asp Pro Phe
65                  70                  75                  80

Ile Ala Ile His Ala Glu Ser Lys
                85

<210> SEQ ID NO 13
<211> LENGTH: 59
<212> TYPE: PRT
<213> ORGANISM: Artificial Sequence
<220> FEATURE:
<223> OTHER INFORMATION: Synthetic Construct

<400> SEQUENCE: 13

Val Tyr Phe Lys Lys Pro Val Ala Trp Glu Phe Ile Lys Leu Val Tyr
1               5                   10                  15

Tyr Trp Thr Ser Gly His Tyr Asp Asn Gly Val Ser Trp Pro Gly Val
            20                  25                  30

Ser Met Thr Gly Asn Ser Thr His Trp Tyr Ser Tyr Thr Gln Ile Ala
        35                  40                  45

Val Asn Asp Glu Phe Leu Val Ala Phe Asn Asp
    50                  55

<210> SEQ ID NO 14
<211> LENGTH: 56
<212> TYPE: PRT
<213> ORGANISM: Clostridium chrmoiireducens

<400> SEQUENCE: 14

Phe Phe Lys Lys Pro Ala Asp Trp Thr Val Pro Tyr Val Tyr Ile Asn
1               5                   10                  15

Asn Asp Tyr Asn Glu Asn Asn Ala Ser Phe Pro Gly Val Lys Met Thr

```
            20                  25                  30

Lys Val Gly Asn Gly Phe Tyr Lys Tyr Glu Leu Lys Gly Trp Ala Asp
        35                  40                  45

Ala Lys Val Gln Phe Asn Asp Asn
    50                  55


<210> SEQ ID NO 15
<211> LENGTH: 56
<212> TYPE: PRT
<213> ORGANISM: Clostridium neonatale

<400> SEQUENCE: 15

Val Tyr Phe Arg Lys Pro Asp Gly Trp Met Ala Pro Tyr Val Tyr Ile
1               5                   10                  15

Tyr Asn Glu Leu Asp Glu Glu Asp Cys Ala Trp Pro Gly Asn Lys Met
            20                  25                  30

Thr Lys Ile Asp Asp Asp Leu Tyr Lys Tyr Glu Leu Lys Gly Phe Thr
        35                  40                  45

Asp Ser Lys Val Met Phe Asn Asp
    50                  55


<210> SEQ ID NO 16
<211> LENGTH: 59
<212> TYPE: PRT
<213> ORGANISM: Flavobacterium sp. RB1R5

<400> SEQUENCE: 16

Val Tyr Phe Lys Lys Pro Ser Asn Trp Asn Ala Glu Val Lys Ile Tyr
1               5                   10                  15

Tyr Trp Ser Pro Thr Gly Thr Ala Pro Val Ile Ala Trp Pro Gly Ala
            20                  25                  30

Ala Met Thr Leu Asp Cys Gly Asp Trp Tyr Lys Tyr Thr Phe Pro Ser
        35                  40                  45

Thr Val Ser Ala Ser Asn Leu Leu Phe Asn Asp
    50                  55


<210> SEQ ID NO 17
<211> LENGTH: 59
<212> TYPE: PRT
<213> ORGANISM: Flavobacterium sp. RB1R5

<400> SEQUENCE: 17

Val Tyr Phe Lys Lys Pro Ser Asn Trp Asn Ala Ala Val Lys Val Leu
1               5                   10                  15

Tyr Trp Ser Pro Thr Gly Thr Ala Pro Ala Val Ala Trp Pro Gly Val
            20                  25                  30

Ala Met Thr Leu Asp Cys Gly Asp Trp Tyr Lys Tyr Thr Phe Pro Ser
        35                  40                  45

Thr Val Ser Ala Ser Ser Leu Leu Phe Asn Asp
    50                  55


<210> SEQ ID NO 18
<211> LENGTH: 60
<212> TYPE: PRT
<213> ORGANISM: Clostridium chrmoiireducens

<400> SEQUENCE: 18

Val Tyr Phe Lys Asn Thr Lys Gly Trp Lys Ser Val Lys Ile His Tyr
1               5                   10                  15
```

```
Trp Gln Asp Gly Gly Ser Gly Thr Asp Trp Pro Gly Val Ser Met Val
            20                  25                  30

Asp Glu Gly Asp Asn Leu Tyr Ser Tyr Thr Met Pro Asp Gly Phe Glu
        35                  40                  45

Asn Ala Asn Val Ile Phe Asn Ser Gly Lys Gly Glu
    50                  55                  60


<210> SEQ ID NO 19
<211> LENGTH: 60
<212> TYPE: PRT
<213> ORGANISM: Clostridium chrmoiireducens

<400> SEQUENCE: 19

Val Tyr Val Lys Val Pro Asp Thr Trp Thr Gly Ile Pro Asn Ile His
1               5                   10                  15

Tyr Trp Asn Thr Thr Gly Gly Thr Thr Thr Trp Pro Gly Lys Gln Met
            20                  25                  30

Lys Glu Glu Gly Asn Glu Ile Tyr Ser Ile Ile Ile Pro Lys Ser Phe
        35                  40                  45

Gly Asp Val Ser Ile Ile Ile Asn Asp Gly Asn Asn
    50                  55                  60


<210> SEQ ID NO 20
<211> LENGTH: 60
<212> TYPE: PRT
<213> ORGANISM: Bifidobacterium thermophilum

<400> SEQUENCE: 20

Phe His Lys Pro Ser Gly Trp Gly Ser Pro Arg Ile Tyr Tyr Tyr Thr
1               5                   10                  15

Ser Asp Ala Asp Thr Gly Pro Ala Trp Pro Gly Asn Ala Met Lys His
            20                  25                  30

Met Ala Asp Gly Trp Tyr Ser Tyr Thr Ile Thr Lys Tyr Ala Lys Ala
        35                  40                  45

Arg Val Leu Phe Asn Asp Gly Gly His Gln Val Pro
    50                  55                  60


<210> SEQ ID NO 21
<211> LENGTH: 62
<212> TYPE: PRT
<213> ORGANISM: Clostridium neonatale

<400> SEQUENCE: 21

Val Tyr Phe Arg Lys Pro Ala Glu Trp Gly Glu Pro Asn Val Tyr Ala
1               5                   10                  15

Tyr Lys Ser Ser Gly Gly Glu Asn Glu Lys Trp Pro Gly Ala Lys Met
            20                  25                  30

Glu Lys Val Ser Ala Thr Glu Thr Leu Tyr Ser Tyr Thr Leu Pro Glu
        35                  40                  45

Asn Phe Gly Asp Cys Asn Val Ile Phe Asn Asp Gly Ser Asn
    50                  55                  60


<210> SEQ ID NO 22
<211> LENGTH: 62
<212> TYPE: PRT
<213> ORGANISM: Clostridium neonatale

<400> SEQUENCE: 22

Val Tyr Val Lys Leu Pro Glu Gly Trp Ser Gly Ile Pro Asn Met His
1               5                   10                  15
```

```
Tyr Trp Asn Val Val Gly Gly Gln Thr Glu Trp Pro Gly Lys Ala Met
            20                  25                  30

Lys Asp Glu Gly Asn Gly Ile Tyr Ser Cys Glu Ile Pro Glu Ser Phe
        35                  40                  45

Gly Asp Val Ser Ile Ile Ile Asn Asp Gly Lys Asn Lys Leu
    50                  55                  60


<210> SEQ ID NO 23
<211> LENGTH: 63
<212> TYPE: PRT
<213> ORGANISM: Clostridium sp. LS

<400> SEQUENCE: 23

Val Tyr Phe Lys Asn Thr Ser Gly Trp Ser Ser Val Lys Ile Tyr Tyr
1               5                   10                  15

Trp Val Asp Ala Asn Asn Asn Gly Trp Pro Gly Ser Ser Met Val Asp
            20                  25                  30

Glu Gly Asp Asn Leu Tyr Ser Phe Val Met Pro Asp Gly Phe Glu Asn
        35                  40                  45

Ala Asn Val Ile Phe Asn Asn Asn Gly Lys Gly Lys Gln Ser Pro
    50                  55                  60


<210> SEQ ID NO 24
<211> LENGTH: 63
<212> TYPE: PRT
<213> ORGANISM: Corallincola luteus

<400> SEQUENCE: 24

Lys Lys Pro Thr Asp Trp Val Gly Ala Asn Val Tyr Trp Trp Ser Ala
1               5                   10                  15

Asp Pro Gln Pro Ala Val Asp Trp Pro Gly Ala Ala Met Glu His Met
            20                  25                  30

Gly Asp Asp Trp Tyr Lys Phe Glu Phe Glu Asn Gly Val Thr Ala Ala
        35                  40                  45

Asn Ile Ile Phe Asn Asp Gly Gln Gly Leu Gln Thr Gln Asn Leu
    50                  55                  60


<210> SEQ ID NO 25
<211> LENGTH: 63
<212> TYPE: PRT
<213> ORGANISM: Corallincola luteus

<400> SEQUENCE: 25

Phe Val Pro Pro Ala Gly Trp Gly Ser Asp Val Asn Ile Tyr Tyr Trp
1               5                   10                  15

Asp Ala Ala Asn Ala Pro Ala Val Asp Trp Pro Gly Val Pro Met Thr
            20                  25                  30

Ala Glu Ala Asp Gly Ser Tyr Ser Phe Ser Phe Pro Leu Asn Ala Thr
        35                  40                  45

Ser Ala Asn Ile Ile Phe Asn Asp Gly Ala Ser Gln Thr Glu Asn
    50                  55                  60


<210> SEQ ID NO 26
<211> LENGTH: 60
<212> TYPE: PRT
<213> ORGANISM: Clostridium sp. LS

<400> SEQUENCE: 26

Val Tyr Val Lys Val Pro Ser Gly Trp Asn Gly Ile Pro Asn Ile His
```

```
1               5                   10                  15

Tyr Trp Asn Thr Ala Gly Gly Thr Thr Thr Trp Pro Gly Val Ala Met
            20                  25                  30

Lys Asp Glu Gly Asn Gly Ile Tyr Ser Ala Ala Ile Pro Lys Ser Phe
        35                  40                  45

Gly Asp Val Ser Ile Ile Ile Asn Asp Gly Ser Asn
    50                  55                  60


<210> SEQ ID NO 27
<211> LENGTH: 60
<212> TYPE: PRT
<213> ORGANISM: Flammeovirga sp. OC4

<400> SEQUENCE: 27

Val Tyr Tyr Trp Glu Val Ser Gln Asn Gly Thr Val Val Glu Glu Asn
1               5                   10                  15

Pro Val Ser Trp Pro Gly Val Ala Met Val Ser Ala Pro Glu Ile Gly
            20                  25                  30

Ser Gly Trp Met Lys Tyr Glu Val Thr Gly Gly Thr Cys Ala Asn Val
        35                  40                  45

Ile Phe Ser Asn Gly Gly Ala Gly Gln Thr Asp Asp
    50                  55                  60


<210> SEQ ID NO 28
<211> LENGTH: 61
<212> TYPE: PRT
<213> ORGANISM: Flammeovirga sp. OC4

<400> SEQUENCE: 28

Asp Asn Pro Phe Ile His Tyr Trp Asn Ala Ser Pro Ile Gly Ser Ile
1               5                   10                  15

Ala Ser Thr Thr Trp Pro Gly Val Thr Leu Thr Glu Gly Thr Asp Gly
            20                  25                  30

Trp Trp Phe Phe Glu Phe Pro Ser Ser Val Ser Ser Ile Asn Leu Leu
        35                  40                  45

Phe His Asn Asn Thr Gly Tyr Gln Ser Pro Asp Leu Ser
    50                  55                  60


<210> SEQ ID NO 29
<211> LENGTH: 64
<212> TYPE: PRT
<213> ORGANISM: Flavobacterium sp. RB1R5

<400> SEQUENCE: 29

Val Tyr Phe Lys Lys Pro Ser Asn Trp Asn Ala Ala Val Lys Ile Leu
1               5                   10                  15

Tyr Trp Ser Thr Ile Gly Thr Ala Pro Val Val Gly Val Ala Met Ser
            20                  25                  30

Leu Asp Cys Gly Asp Trp Tyr Lys Tyr Thr Phe Gln Ser Thr Gly Ser
        35                  40                  45

Thr Ser Asn Leu Ser Phe Asn Asp Gly Thr Leu Lys Thr Ala Asp Leu
    50                  55                  60


<210> SEQ ID NO 30
<211> LENGTH: 62
<212> TYPE: PRT
<213> ORGANISM: Ruminococcus bromii

<400> SEQUENCE: 30
```

```
Val Tyr Val Lys Ala Asn Asn Gly Trp Thr Thr Leu Tyr Cys Tyr Met
1               5                   10                  15

Trp Thr Gly Asn Ser Ser Asn Thr Ser Trp Pro Gly Val Lys Met Thr
            20                  25                  30

Ser Glu Gly Asn Ser Val Tyr Ser Tyr Lys Leu Asp Gly Asn Tyr Glu
        35                  40                  45

Asn Val Ile Phe Asn Asn Gly Ser Ser Gln Thr Lys Asp Leu
    50                  55                  60


<210> SEQ ID NO 31
<211> LENGTH: 64
<212> TYPE: PRT
<213> ORGANISM: Ruminococcus bromii

<400> SEQUENCE: 31

Val Tyr Leu Lys Asn Ser Ala Gly Trp Ser Asn Pro Ser Cys Tyr Met
1               5                   10                  15

Trp Asn Gly Thr Ser Asp Thr Asn Gly Ser Trp Pro Gly Val Ala Met
            20                  25                  30

Thr Lys Val Ser Ser Asp Val Tyr Lys Tyr Thr Ala Pro Lys Thr Phe
        35                  40                  45

Ser Asn Cys Ile Phe Ser Asn Asn Gly Gly Ser Gln Thr Lys Asp Leu
    50                  55                  60


<210> SEQ ID NO 32
<211> LENGTH: 64
<212> TYPE: PRT
<213> ORGANISM: Ruminococcus bromii

<400> SEQUENCE: 32

Val Tyr Leu Lys Asn Ser Ala Gly Trp Ser Asn Pro Ser Cys Tyr Met
1               5                   10                  15

Trp Asn Gly Thr Ser Asp Thr Asn Gly Ser Trp Pro Gly Val Ala Met
            20                  25                  30

Thr Lys Val Ser Ser Asp Val Tyr Lys Tyr Thr Ala Pro Lys Thr Phe
        35                  40                  45

Ser Asn Cys Ile Phe Ser Asn Asn Gly Gly Ser Gln Thr Lys Asp Leu
    50                  55                  60


<210> SEQ ID NO 33
<211> LENGTH: 63
<212> TYPE: PRT
<213> ORGANISM: Bifidobacterium thermophilum

<400> SEQUENCE: 33

Tyr Tyr Asp Ser Ala Gly Trp Ala Lys Pro Phe Ala Tyr Met Tyr Gly
1               5                   10                  15

Asp Gly Val Arg Ser Ala Ser Trp Pro Gly Glu Arg Met Thr Asp Asp
            20                  25                  30

Gly Asp Gly Trp Tyr Ser Val Thr Val Asp Ala Pro His Gly Leu Arg
        35                  40                  45

Val Leu Phe Ser Asp Asn Gly Lys Ser Gln His Pro Gly Ala Asn
    50                  55                  60


<210> SEQ ID NO 34
<211> LENGTH: 63
<212> TYPE: PRT
<213> ORGANISM: Bifidobacterium thermophilum

<400> SEQUENCE: 34
```

```
Phe Tyr Asp Tyr Ala Asn Trp Gly Lys Val Arg Leu Tyr Tyr Tyr Ser
1               5                   10                  15

Glu Ala Ala Arg Gly Pro Thr Trp Pro Gly Glu Ala Met His Ala Asp
            20                  25                  30

Gly Asp Gly Trp Tyr Thr Ala Thr Ile Phe Gly Thr Gln Pro Ala Arg
        35                  40                  45

Val Leu Phe Asn Asp Gly Gly Ser Arg Gln Thr Pro Ala Ser Gly
    50                  55                  60


<210> SEQ ID NO 35
<211> LENGTH: 65
<212> TYPE: PRT
<213> ORGANISM: Crocosphaera watsonii

<400> SEQUENCE: 35

Val Tyr Phe Lys Arg Pro Asn Phe Trp Arg Glu Ser Val Asn Ile Tyr
1               5                   10                  15

Tyr Trp Asn Thr Gln Pro Lys Ser Ser Ser Val Glu Trp Pro Gly Val
            20                  25                  30

Ala Met Thr Glu Glu Gly Asp Asn Trp Tyr Ser Tyr Arg Phe Ser Gly
        35                  40                  45

Ile Glu Glu Ala Ser Phe Leu Phe Asn Asp Gly Asn Arg Arg Gln Thr
    50                  55                  60

Gly
65


<210> SEQ ID NO 36
<211> LENGTH: 71
<212> TYPE: PRT
<213> ORGANISM: Clostridium chrmoiireducens

<400> SEQUENCE: 36

Val Tyr Phe Lys Asn Thr Gln Gly Trp Ser Asp Val Asn Val Tyr Phe
1               5                   10                  15

Tyr Thr Asn Ser Gly Gly Phe Lys Glu Val Asn Gly Gly Trp Pro Gly
            20                  25                  30

Val Ala Met Thr Asn Glu Gly Asn Gly Leu Phe Ser Tyr Thr Leu Pro
        35                  40                  45

Lys Ala Phe Glu Gly Ala Gln Ile Leu Phe Asn Thr Ser Ser Gly Lys
    50                  55                  60

Gln Ile Pro Ala Ser Gly Gly
65                  70


<210> SEQ ID NO 37
<211> LENGTH: 71
<212> TYPE: PRT
<213> ORGANISM: Clostridium chrmoiireducens

<400> SEQUENCE: 37

Ile Tyr Phe Arg Lys Pro Ser Asp Trp Val Glu Pro Asn Val Tyr Ala
1               5                   10                  15

Tyr Lys Ile Asp Gly Asn Ser Asp Ser Lys Val Thr Thr Asp Leu Ser
            20                  25                  30

Thr Trp Pro Gly Thr Lys Met Thr Lys Val Asp Gly Thr Glu Thr Leu
        35                  40                  45

Tyr Thr Tyr Thr Phe Ser Ser Asn Cys Gln Asn Ile Asn Val Ile Phe
    50                  55                  60
```

```
Asn Asp Gly Asn Asn Lys Phe
65                  70


<210> SEQ ID NO 38
<211> LENGTH: 68
<212> TYPE: PRT
<213> ORGANISM: Clostridium neonatale

<400> SEQUENCE: 38

Val Tyr Leu Lys Lys Pro Ala Asp Trp Glu Lys Asp Asp Ile Tyr Ile
1               5                   10                  15

Tyr Phe Tyr Lys Asn Gly Ala Ser Gly Pro Ala Trp Pro Gly Ile Pro
            20                  25                  30

Met Glu Lys Val Glu Gly Lys Asp Asp Leu Tyr Thr Tyr Thr Leu Pro
        35                  40                  45

Lys Gly Leu Glu Gly Ala Met Val Leu Phe Asn Cys Asp Gly Gly Ser
    50                  55                  60

Val Gln Val Pro
65


<210> SEQ ID NO 39
<211> LENGTH: 72
<212> TYPE: PRT
<213> ORGANISM: Clostridium neonatale

<400> SEQUENCE: 39

Val Tyr Phe Glu Asn Thr Phe Gly Trp Asp Lys Val Lys Val Tyr Ala
1               5                   10                  15

Tyr Asn Asp Gly Thr Ser Asp Glu Val Lys Ala Trp Pro Gly Val Asn
            20                  25                  30

Ala Lys Asp Glu Gly Asp Asn Leu Tyr Ser Tyr Thr Leu Pro Lys Gly
        35                  40                  45

Phe Glu Ala Ala Thr Val Ile Phe Asn Asn Gly Ser Gly Gly Glu Gly
    50                  55                  60

Asn Gln Thr Glu Asn Leu Lys Thr
65                  70


<210> SEQ ID NO 40
<211> LENGTH: 69
<212> TYPE: PRT
<213> ORGANISM: Clostridium sp. LS

<400> SEQUENCE: 40

Val Tyr Phe Gln Lys Pro Ser Thr Ala Glu Trp Ala Tyr Asn Asp Val
1               5                   10                  15

Asn Ile Tyr Phe Tyr Gly Lys Gly Gly Pro Ser Trp Pro Gly Val Pro
            20                  25                  30

Met Thr Lys Val Ser Asp Asn Leu Tyr Thr Tyr Thr Leu Pro Ala Gly
        35                  40                  45

Leu Glu Gly Ser Asn Val Ile Phe Asn Ala Asn Ala Gly Lys Ile Gln
    50                  55                  60

Val Pro Gly Ser Gly
65


<210> SEQ ID NO 41
<211> LENGTH: 67
<212> TYPE: PRT
<213> ORGANISM: Clostridium sp. LS

<400> SEQUENCE: 41
```

Val Tyr Phe Lys Asn Thr Phe Gly Trp Glu Lys Val Asn Val Tyr Ala
1 5 10 15

Tyr Asn Asp Gly Ser Ser Asp Lys Val Lys Asp Trp Pro Gly Ala Ser
20 25 30

Ala Val Asp Glu Gly Asn Gly Leu Tyr Ser Tyr Thr Leu Pro Lys Gly
35 40 45

Phe Glu Ser Ala Thr Val Ile Phe Asn Asn Gly Gly Lys Gly Lys Gln
50 55 60

Thr Asn Asn
65

<210> SEQ ID NO 42
<211> LENGTH: 66
<212> TYPE: PRT
<213> ORGANISM: Corallincola luteus

<400> SEQUENCE: 42

His Phe Lys Lys Pro Ala Glu Trp Gly Asp Asp Ile His Val His Tyr
1 5 10 15

Trp Asn Ala Ala Pro Ala Asp Asn Ser Ala Trp Pro Gly Val Gln Ala
20 25 30

Glu Leu Val Gly Asp Gly Trp Tyr Thr Phe Gln Phe Pro Val Asn Val
35 40 45

Gly Ala Ala Asp Met Ile Phe Asn Asp Asn Ser Gly Asn Gln Thr Ala
50 55 60

Asn Leu
65

<210> SEQ ID NO 43
<211> LENGTH: 66
<212> TYPE: PRT
<213> ORGANISM: Corallincola luteus

<400> SEQUENCE: 43

Val Tyr Tyr Lys Ala Pro Glu Thr Trp Thr Glu Ala Tyr Val His Tyr
1 5 10 15

Trp Ala Ser Ala Gly Val Ser Ser Ser Thr Asp Trp Pro Gly Leu Leu
20 25 30

Met Ser Ser Leu Gly Gly Gly Phe Phe Ser Tyr Gln Phe Glu Asp Gly
35 40 45

Val Thr Gly Ser Asn Met Leu Phe His Asn Gly Ala Gly Glu Gln Thr
50 55 60

Thr Asp
65

<210> SEQ ID NO 44
<211> LENGTH: 67
<212> TYPE: PRT
<213> ORGANISM: Flavobacterium sp. RB1R5

<400> SEQUENCE: 44

Val Tyr Phe Lys Lys Pro Ser Asn Trp Asn Ala Ala Val Lys Ile Leu
1 5 10 15

Tyr Trp Ser Thr Thr Gly Ser Ala Pro Val Val Thr Trp Pro Gly Val
20 25 30

Ala Met Thr Leu Asp Cys Ser Asp Trp Tyr Lys Tyr Thr Phe Pro Ser
35 40 45

```
Thr Val Ser Ala Ser Asn Leu Ser Phe Asn Asp Gly Thr Leu Lys Thr
    50                  55                  60

Ala Asp Leu
65


<210> SEQ ID NO 45
<211> LENGTH: 70
<212> TYPE: PRT
<213> ORGANISM: Lactobacillus amylovorus

<400> SEQUENCE: 45

Val Tyr Phe Glu Lys Pro Ser Ser Trp Gly Ser Arg Val Tyr Ala Tyr
1               5                   10                  15

Val Tyr Asn Lys Asn Thr Asn Lys Ala Ile Thr Ser Ala Trp Pro Gly
            20                  25                  30

Lys Lys Met Thr Ala Leu Gly Asn Asp Glu Tyr Glu Leu Asp Leu Asp
        35                  40                  45

Thr Asp Glu Asp Asp Ser Asp Leu Ala Val Ile Phe Thr Asp Gly Thr
    50                  55                  60

Lys Gln Thr Pro Ala Ala
65                  70


<210> SEQ ID NO 46
<211> LENGTH: 70
<212> TYPE: PRT
<213> ORGANISM: Lactobacillus amylovorus

<400> SEQUENCE: 46

Val Tyr Phe Glu Lys Pro Ser Ser Trp Gly Ser Arg Val Tyr Ala Tyr
1               5                   10                  15

Val Tyr Asn Lys Asn Thr Asn Lys Ala Ile Thr Ser Ala Trp Pro Gly
            20                  25                  30

Lys Lys Met Thr Ala Leu Gly Asn Asp Glu Tyr Glu Leu Asp Leu Asp
        35                  40                  45

Thr Asp Glu Asp Asp Ser Asp Leu Ala Val Ile Phe Thr Asp Gly Thr
    50                  55                  60

Lys Gln Thr Pro Ala Ala
65                  70


<210> SEQ ID NO 47
<211> LENGTH: 66
<212> TYPE: PRT
<213> ORGANISM: Spiromyces sp. E2

<400> SEQUENCE: 47

Ile Tyr Phe Lys Lys Pro Asn Ser Trp Asn Asn Leu Ile Tyr Ser Tyr
1               5                   10                  15

Ile Tyr Ser Met Asp Asn Asn Gly Val Asn Glu Ile Thr Arg Trp Pro
            20                  25                  30

Gly Asn Lys Met Thr Lys Val Glu Asn Asn Ile Tyr Glu Phe Thr Phe
        35                  40                  45

Asp Ser Lys Tyr Glu Asn Ala Tyr Ile Ile Phe Asn Asp Asn Asn Gln
    50                  55                  60

Gln Ser
65


<210> SEQ ID NO 48
<211> LENGTH: 68
<212> TYPE: PRT
```

<213> ORGANISM: Spiromyces sp. E2

<400> SEQUENCE: 48

```
Ile Tyr Phe Glu Lys Pro Asn Ser Trp Asn Glu Asn Ile Tyr Ala Tyr
1               5                   10                  15

Ile Tyr Ser Ile Asn Leu Lys Ile Val Ser Glu Ile Thr Lys Trp Pro
            20                  25                  30

Gly Ile Gln Met Asn Lys Ile Asn Asp Thr Val Tyr Ser Ile Ile Leu
        35                  40                  45

Asp Ser Phe Tyr Glu Asn Gly Tyr Ile Ile Phe Thr Asp Leu Asn Gln
    50                  55                  60

Gln Ile Pro Glu
65
```

<210> SEQ ID NO 49
<211> LENGTH: 66
<212> TYPE: PRT
<213> ORGANISM: Streptococcus sp. KCJ4950

<400> SEQUENCE: 49

```
Ile Tyr Phe Gln Asn Pro Asp Asn Trp Ser Glu Val Tyr Ala Tyr Met
1               5                   10                  15

Tyr Ser Ala Lys Asp Thr Lys Leu Leu Gly Ala Trp Pro Gly Thr Lys
            20                  25                  30

Met Thr Lys Asp Ser Thr Gly Arg Tyr Thr Ile Ser Val Pro Ala Ser
        35                  40                  45

Tyr Ala Glu Glu Gly Val Lys Val Ile Phe Thr Asn Asn Gln Gly Ser
    50                  55                  60

Gln Phe
65
```

<210> SEQ ID NO 50
<211> LENGTH: 70
<212> TYPE: PRT
<213> ORGANISM: Aquimarina amphilecti

<400> SEQUENCE: 50

```
Val Tyr Phe Lys Lys Pro Ser Ser Trp Ser Ser Ala Asn Val Tyr Leu
1               5                   10                  15

Phe Asn Gln Asn Thr Gly Asp Ala Leu Pro Gly Phe Pro Ala Trp Pro
            20                  25                  30

Gly Glu Glu Met Asp Ser Val Leu Gly Thr Pro Trp Phe Thr Tyr Asn
        35                  40                  45

Ile Asp Gln Asp Val Gln Val Gly Ile Val Phe Asn Asp Asn Gly Gly
    50                  55                  60

Asp Gln Thr Asp Asp Leu
65                  70
```

<210> SEQ ID NO 51
<211> LENGTH: 68
<212> TYPE: PRT
<213> ORGANISM: Aquimarina amphilecti

<400> SEQUENCE: 51

```
Val Asn Phe Arg Lys Pro Asp Ser Trp Ser Ala Ala Tyr Ile Tyr Leu
1               5                   10                  15

Tyr Asp Lys Asn Ala Asn Thr Thr Ile Pro Phe Pro Ala Trp Pro Gly
            20                  25                  30
```

```
Ile Gln Met Thr Gln Leu Asn Asp Ser Pro Trp Tyr Ser Tyr Thr Ile
        35                  40                  45

Glu Glu Ser Val Glu Val Gly Ile Val Phe Asn Asp Asn Gly Gly Ser
    50                  55                  60

Gln Thr Asp Asp
65


<210> SEQ ID NO 52
<211> LENGTH: 68
<212> TYPE: PRT
<213> ORGANISM: Aquimarina amphilecti

<400> SEQUENCE: 52

Val Tyr Phe Lys Lys Pro Ser Ser Trp Asn Thr Ala Phe Ile Tyr Val
1               5                   10                  15

Tyr Asp Lys Asn Ala Asn Thr Ser Ile Pro Gly Ala Pro Thr Trp Pro
            20                  25                  30

Gly Ile Glu Met Asn Glu Ile Val Gly Ser Pro Trp Tyr Ser Tyr Val
        35                  40                  45

Ile Asp Glu Ser Val Glu Val Gly Ile Val Phe Asn Asp Asn Gly Glu
    50                  55                  60

Ser Gln Ser Asp
65


<210> SEQ ID NO 53
<211> LENGTH: 66
<212> TYPE: PRT
<213> ORGANISM: Crocosphaera watsonii

<400> SEQUENCE: 53

Phe Lys Arg Pro Ala Ser Trp Glu Lys Asn Ile Asn Ile Tyr Tyr Trp
1               5                   10                  15

Glu Thr Arg Pro Ser Ser Gln Ser Val Ser Trp Pro Gly Val Ala Met
            20                  25                  30

Thr Ala Glu Gly Asn Asp Trp Tyr Arg Tyr Glu Phe Ala Glu Ala Glu
        35                  40                  45

Thr Ala Lys Phe Leu Ile Asn Asp Gly Ser Trp Arg Gln Thr Lys Asp
    50                  55                  60

Leu Thr
65


<210> SEQ ID NO 54
<211> LENGTH: 71
<212> TYPE: PRT
<213> ORGANISM: Clostridium sp. LS

<400> SEQUENCE: 54

Phe Arg Lys Pro Ser Asp Trp Ala Glu Pro Asn Ile Tyr Val Phe Asn
1               5                   10                  15

Asp Gln Gly Val Lys Val Ser Glu Trp Pro Gly Val Lys Met Asp Lys
            20                  25                  30

Val Ala Gly Thr Glu Thr Leu Tyr Ser Tyr Thr Leu Pro Glu Asn Phe
        35                  40                  45

Gly Asp Ala Lys Ile Ile Phe Asn Asp Lys Ile Ala Gly Asn Asp Ser
    50                  55                  60

Gly Asn Gln Thr Ala Asp Leu
65                  70
```

```
<210> SEQ ID NO 55
<211> LENGTH: 71
<212> TYPE: PRT
<213> ORGANISM: Flavobacterium sp. RB1R5

<400> SEQUENCE: 55

Val Tyr Phe Lys Pro Pro Thr Thr Trp Thr Thr Ile Pro Lys Val Asn
1               5                   10                  15

Tyr Trp Asn Ala Leu Pro Thr Gly Ser Val Ala Ser Thr Thr Trp Pro
            20                  25                  30

Gly Ile Ser Met Ile Ala Asp Lys Asp Gly Phe Tyr Lys Tyr Thr Ile
        35                  40                  45

Val Gly Pro Thr Ser Ile Asn Val Ile Phe Asn Asn Gly Ser Ser Gly
    50                  55                  60

Thr Gly Asn Gln Ser Pro Asp
65                  70


<210> SEQ ID NO 56
<211> LENGTH: 75
<212> TYPE: PRT
<213> ORGANISM: Saccherophagus degradans

<400> SEQUENCE: 56

Phe Asp Asn Ile Gln Asn Phe Ala Gln Pro Thr Ile Tyr Phe Trp Asn
1               5                   10                  15

Ala Thr Pro Ala Gly Ser Leu Asn Ala Leu Pro Asn Trp Pro Gly His
            20                  25                  30

Ala Met Ala Val Val Gly Asn Tyr Val Cys Tyr Asp Phe Thr Asp Ile
        35                  40                  45

Ile Val Ser Gly Ala Ala Met Pro Ser Ala Leu Asn Val Ile Phe Ser
    50                  55                  60

Asn Ser Gly Asn Asn Gln Thr Glu Asp Leu Leu
65                  70                  75


<210> SEQ ID NO 57
<211> LENGTH: 89
<212> TYPE: PRT
<213> ORGANISM: Fontibacillus phaesoli

<400> SEQUENCE: 57

Ser Gly Lys Val Glu Val Ser Asn Ser Ser Pro Gln Lys Asn Val Thr
1               5                   10                  15

Ile His Tyr Thr Pro Gly Asn Gly Gln Trp Tyr Asp Thr Asn Ala Ser
            20                  25                  30

Tyr Glu Gly Pro Thr Asp Ala Gly His Glu Ala Trp Asn Phe Ala Ile
        35                  40                  45

Ser Thr Asn Ser Ile Glu Asn Thr His Pro Glu Leu Val Asn Ala Gln
    50                  55                  60

Thr Ile Gln Phe Ala Ile Lys Tyr Glu Phe Asn Gly Gln Thr Tyr Trp
65                  70                  75                  80

Asp Asn Asn Asn Gly Arg Asn Tyr Ser
                85


<210> SEQ ID NO 58
<211> LENGTH: 84
<212> TYPE: PRT
<213> ORGANISM: Fontibacillus phaesoli

<400> SEQUENCE: 58
```

```
Arg Gly Ala Val Tyr Val Lys Asn Ala Gly Tyr Ser Lys Gln Val Lys
1               5                   10                  15

Ile Lys Tyr Thr Thr Asp Asn Trp Ala Thr Thr Lys Glu Gly Asp Ala
            20                  25                  30

Thr Tyr Ser Met Pro Ala Asn Ser Asp Asp Ser Val Glu Ala Trp His
        35                  40                  45

Phe Thr Phe His Asn Ile Ala Pro Ser Val Ser Gln Ile Lys Tyr Ala
    50                  55                  60

Ile Ser Tyr Thr Val Asn Gly Gln Thr Tyr Trp Asp Asn Asn Tyr Gly
65                  70                  75                  80

His Asn Tyr Thr


<210> SEQ ID NO 59
<211> LENGTH: 85
<212> TYPE: PRT
<213> ORGANISM: Nitrospira sp. NS44

<400> SEQUENCE: 59

Leu Ile Leu Val Lys Asn Ile Gln Phe Ala Lys Thr Val Gly Ile Val
1               5                   10                  15

Tyr Thr Thr Asp Asn Trp Gly Thr Phe His Thr Ala Pro Ala Gly Tyr
            20                  25                  30

Gln Lys Asn Tyr Pro Pro Pro Lys Gln Pro Gln Gln Ala Asp Ala Glu
        35                  40                  45

Leu Trp Glu Val Asn Val Pro Leu Gly Thr Gly Ala Asn Gly Trp Phe
    50                  55                  60

Ala Ala Phe Tyr Ala Val Asp Gly Ala Thr Tyr Trp Asp Asn Asn Phe
65                  70                  75                  80

Thr Leu Asn Tyr Ser
                85


<210> SEQ ID NO 60
<211> LENGTH: 87
<212> TYPE: PRT
<213> ORGANISM: Orenia marismortui

<400> SEQUENCE: 60

Ser Gly Tyr Ile Gly Val Lys Asn Asn Ser Phe Pro Thr Lys Val Thr
1               5                   10                  15

Ile His Tyr Thr Tyr Asp Ile Tyr Ser Asn Ser Asn Trp Lys Asp Val
            20                  25                  30

Asp Ala Lys Tyr Met Gly Val Ala Pro Asp Gly Asn His Ile Trp His
        35                  40                  45

Phe Glu Thr Pro Lys Ile Thr Arg Asp Tyr Tyr Pro Tyr Phe Asn Tyr
    50                  55                  60

Asp Cys Gln Phe Ala Ile Lys Tyr Glu Ser Asn Gly Gln Val Tyr Trp
65                  70                  75                  80

Asp Asn Asn His Gln Gln Asn
                85


<210> SEQ ID NO 61
<211> LENGTH: 90
<212> TYPE: PRT
<213> ORGANISM: Pseudobacteriovorax antillogorgiicola

<400> SEQUENCE: 61

Ile Leu Val Lys Asp Ile Ala Tyr Asp Lys Ala Val Gly Val Arg Leu
1               5                   10                  15
```

```
Lys Asp Cys Glu Gly Gln Trp Arg Asp Val Pro Ala Ala Tyr Asp Arg
            20                  25                  30

Ser Val Gly Asn Gln Met Glu Ile Trp Arg Ile Asn Gly Leu Thr Ala
        35                  40                  45

Asp Phe Pro Ile Asp Glu Gln Ala Ala Asn Asp His Gln Lys Gln Ile
    50                  55                  60

Cys Asp Leu Glu Phe Ala Leu Tyr Tyr Arg Val Asn Glu Leu Ala Phe
65                  70                  75                  80

Trp Asp Asn Asn Arg Gly Gln Asn Tyr Thr
                85                  90


<210> SEQ ID NO 62
<211> LENGTH: 88
<212> TYPE: PRT
<213> ORGANISM: Reinekea forsetii

<400> SEQUENCE: 62

Val Ile Lys Val Asp Asn Leu Ala Pro Asn Lys Thr Val Asn Leu Tyr
1               5                   10                  15

Tyr Gln Ala His Asp Gly Gln Trp Arg Asp Leu Leu Ala Asn Tyr Leu
            20                  25                  30

Gly Val Ala Gly Asp Gly Arg Glu Val Trp Gln Ala Ser Met Thr Leu
        35                  40                  45

Cys Thr Val Val Asp Ser Trp Arg Cys Asp Glu Ile Thr Ala Thr Asp
    50                  55                  60

Leu Asn Phe Ala Val Arg Val Glu Ala Asn Asp Gln Ile Phe Trp Asp
65                  70                  75                  80

Asn Asn Gln Gln Gln Asn Phe His
                85


<210> SEQ ID NO 63
<211> LENGTH: 81
<212> TYPE: PRT
<213> ORGANISM: Reinekea forsetii

<400> SEQUENCE: 63

Val Met Leu Gln Asn Tyr Ala Met Tyr Lys Asp Val Glu Ile His Tyr
1               5                   10                  15

Ser Tyr Asp Asn Trp Gln Thr Thr His Ile Gly Asn Ala Ser Phe Val
            20                  25                  30

Ser Gly Arg Tyr Lys Gly Tyr Ser Trp Val Ser Tyr Pro Asn Ala Asn
        35                  40                  45

Asp Val Glu Val Trp Asn Phe Tyr Ser Ala Gly Pro Glu Ala Gln Ser
    50                  55                  60

Asp Ala Glu Ser Leu Gln Phe Ala Val Lys Tyr Ser Val Asp Gly Gln
65                  70                  75                  80

Val


<210> SEQ ID NO 64
<211> LENGTH: 119
<212> TYPE: PRT
<213> ORGANISM: Bifidobacterium adolescens

<400> SEQUENCE: 64

Ile Lys Leu His Tyr Tyr Arg Pro Asp Gly Asn Tyr Gln Glu Tyr Ser
1               5                   10                  15

Met Glu Ser Asp Ala Trp Lys Gly Trp Asp Leu Trp Ser Trp Tyr Ala
```

```
            20                  25                  30

Glu Ser Thr Ser Gly Glu Ser Gln Glu Phe Thr Ser His Asp Glu Phe
        35                  40                  45

Gly Glu Val Ala Glu Tyr Thr Leu Ser Gln Thr Ala Lys Gly Val Arg
    50                  55                  60

Asn Pro Trp Phe Ile Ile Arg Asn Gly Gly Ser Ser Trp Thr Gly Lys
65                  70                  75                  80

Asp Cys Asp Asp Asn Asp Arg Glu Ile Pro Glu Ser Val Ile Ser Met
                85                  90                  95

Thr Ala Gly Asn Val Glu Asn Gly Val Ala Glu Phe Trp Ile Val Ser
            100                 105                 110

Gly Asp Pro Thr Val Tyr Thr
        115


<210> SEQ ID NO 65
<211> LENGTH: 105
<212> TYPE: PRT
<213> ORGANISM: Clostridium sp. CAG:411

<400> SEQUENCE: 65

Arg Tyr Val Val Val Glu Tyr Asp Arg Pro Asn Lys Asp Tyr Gln Gly
1               5                   10                  15

Trp Asn Leu Tyr Thr Trp Asn Ala Ser Lys Ala Tyr Asn Glu Ile Ser
            20                  25                  30

Asn Phe Phe Thr Glu Val Asn Gly Lys Tyr Gln Thr Thr Phe Thr Ile
        35                  40                  45

Asp Glu Leu Thr Ser Asn Val Gly Tyr Leu Leu Arg Ser Gly Thr Pro
    50                  55                  60

Thr Asp Ser Ser Trp Ser Gly Ile Glu Lys Asp Met Glu Gly Asp Arg
65                  70                  75                  80

Ser Ile Gln Thr Pro Val Asp Gln Lys Val Ile Lys Val Lys Leu Lys
                85                  90                  95

Gln Gly Ser Leu Glu Ala Glu Tyr Leu
            100                 105


<210> SEQ ID NO 66
<211> LENGTH: 98
<212> TYPE: PRT
<213> ORGANISM: Exiguobacterium sp. AT1b

<400> SEQUENCE: 66

Arg Tyr Ile Glu Met Lys Tyr Val Arg Ala Asp Gly Asp Tyr Thr Asp
1               5                   10                  15

Trp Asn Leu Trp Thr Trp Ser Thr Gly Lys Lys Asp Gly Gln Val Asp
            20                  25                  30

Pro Tyr Arg Ile Thr Glu Glu Gly Ala Ile Phe Arg Ile Pro Val Gly
        35                  40                  45

Gln Asp Ala Thr Lys Val Gly Phe Val Ile Arg Lys Gly Thr Asp Trp
    50                  55                  60

Ala Val Lys Asp Ala Tyr Gly Glu Asp Arg Tyr Val Thr Leu Gly Glu
65                  70                  75                  80

Asp Arg Val Thr Lys Val Arg Val Glu Ser Gly Lys Gly Thr Phe His
                85                  90                  95

Gln Val


<210> SEQ ID NO 67
```

<211> LENGTH: 101
<212> TYPE: PRT
<213> ORGANISM: Geobacter pelophilus

<400> SEQUENCE: 67

```
Thr His Val Ser Ile His Tyr Asp Asn Ser Ala Gly Phe Thr Asp Pro
1               5                   10                  15

Tyr Leu Trp Val Trp Tyr Thr Gly Ala Ala Val Thr Asp Asp Leu Lys
            20                  25                  30

Ala Thr Gly Thr Asp Gly Phe Gly Pro Val Phe Glu Val Asp Leu Lys
        35                  40                  45

Arg Ser Asp Phe Ser Phe Lys Phe Lys Asn Gly Pro Gly Thr Ser Gly
    50                  55                  60

Ala Trp Glu Gly Ala Gly Leu Asp Arg Arg Phe Arg Pro Leu Lys Gly
65                  70                  75                  80

Ala Pro Asp Ala Gln Val Met Thr Glu Ile Trp Cys Arg Ala Asp Lys
                85                  90                  95

Ala Phe Val Tyr Pro
            100
```

<210> SEQ ID NO 68
<211> LENGTH: 103
<212> TYPE: PRT
<213> ORGANISM: Micrococcus sp.

<400> SEQUENCE: 68

```
Asn Asn Ile Arg Ile His Tyr Lys Arg Glu Asp Asn Val Tyr Lys Asn
1               5                   10                  15

Tyr Gly Ala Trp Leu Trp Asn Asp Val Ala Ser Pro Ser Ala Asn Trp
            20                  25                  30

Pro Val Gly Ala Thr Met Phe Glu Lys Thr Asp Ser Tyr Gly Ala Tyr
        35                  40                  45

Ile Asp Val Pro Leu Ala Asp Gly Ala Lys Asn Ile Gly Phe Leu Val
    50                  55                  60

Met Asp Ile Thr Ala Gly Asp Ala Gly Lys Asp Gly Gly Asp Lys Gly
65                  70                  75                  80

Phe Thr Ile Ser Ser Pro Gln Ala Asn Glu Ile Trp Ile Lys Gln Gly
                85                  90                  95

Ser Asp Lys Val Tyr Thr Tyr
            100
```

<210> SEQ ID NO 69
<211> LENGTH: 99
<212> TYPE: PRT
<213> ORGANISM: Streptomyces coelicolor

<400> SEQUENCE: 69

```
Asp Tyr Ala Val Val His Tyr Lys Arg Ala Asp Gly Asn Tyr Asp Asp
1               5                   10                  15

Trp Gly Leu Tyr Ala Trp Gly Asp Leu Ala Asp Gly Glu Ala Thr Thr
            20                  25                  30

Trp Pro Gly Thr His Pro Phe Thr Gly Arg Asp Ala Tyr Gly Ala Phe
        35                  40                  45

Ala Tyr Val Lys Leu Lys Pro Gly Ala Ser Thr Val Gly Phe Leu Val
    50                  55                  60

Ile Asp Lys Asp Gly Asn Lys Asp Val Ala Ala Asp Arg Thr Ile Asp
65                  70                  75                  80
```

Val Thr Glu Thr Gly Glu Val Trp Ile Glu Gln Gly Glu Glu Gln Leu
85 90 95

Val Thr Glu

<210> SEQ ID NO 70
<211> LENGTH: 97
<212> TYPE: PRT
<213> ORGANISM: Streptomyces turgidicabies

<400> SEQUENCE: 70

Asp Tyr Ala Val Val His Tyr Lys Arg Ser Asp Gly Asp Tyr Thr Asp
1 5 10 15

Trp Arg Leu Tyr Ala Trp Gly Asp Leu Ala Asp Gly Glu Ser Thr Thr
20 25 30

Trp Pro Glu Gly His Asp Phe Val Gly Arg Asp Ala Tyr Gly Ala Phe
35 40 45

Ala Tyr Val Arg Leu Lys Pro Gly Ala Ser Asp Val Ser Tyr Leu Val
50 55 60

Ile Asp Lys Asp Gly Asn Lys Asp Val Ser Ala Asp Arg Ser Ile Asp
65 70 75 80

Val Thr Lys Thr Gly Glu Ile Trp Val Glu Gln Gly Lys Glu Ala Val
85 90 95

Leu

<210> SEQ ID NO 71
<211> LENGTH: 100
<212> TYPE: PRT
<213> ORGANISM: Bacillus akibai

<400> SEQUENCE: 71

Asn Thr Leu Arg Val His Tyr Gln Arg Glu Asp Asn Gln Phe Ala Asn
1 5 10 15

Leu Gly Leu Trp Leu Trp His Asp Val Ala Ala Pro Ser Glu Asn Trp
20 25 30

Pro Ser Gly Gly Ala Pro Phe Val Ala Glu Gln Gln Thr Asp Tyr Gly
35 40 45

Ala Tyr Val Asp Ile Pro Leu Asn Lys Asp Ala Gln Lys Val Gly Phe
50 55 60

Leu Val Leu Asn Arg Leu Thr Gly Asp Lys Asp Gly Asp Asp Lys Leu
65 70 75 80

Val Glu Leu Phe Ser Ser Glu Leu Lys Glu Val Trp Ile Lys Gln Gly
85 90 95

Ser Asp Gln Val
100

<210> SEQ ID NO 72
<211> LENGTH: 97
<212> TYPE: PRT
<213> ORGANISM: Bacillus akibai

<400> SEQUENCE: 72

Asn Thr Ile Arg Val His Tyr Glu Arg Ala Asp Asn Asn Tyr Glu Gly
1 5 10 15

Trp Ser Ala Trp Ile Trp Gly Asp Val Val Ser Pro Ser Thr Asp Trp
20 25 30

Pro Asn Gly Gln Asp Ala Ser Gly Val Gly Lys Tyr Gly Ala Tyr Tyr
35 40 45

Asp Ile Gln Leu Thr Asp Glu Ala Asp Glu Ile Gly Phe Leu Phe Val
50 55 60

Asn Lys Ile Thr Gly Glu Gln Thr Gly Asp Tyr Ser Phe Ser Leu Leu
65 70 75 80

Glu His Asp Gln Ile Phe Ile Lys Asp Gly Asp Glu Gln Val Tyr Thr
85 90 95

Asn

<210> SEQ ID NO 73
<211> LENGTH: 105
<212> TYPE: PRT
<213> ORGANISM: Bacillus selenitireducens

<400> SEQUENCE: 73

Asp His Leu Arg Ile His Tyr Asp Tyr Gly Asp Ala Asp Val Ser Glu
1 5 10 15

Leu Gly Ile Trp Tyr Trp Gly Gly Phe Ser His Thr Ser Asp Asp Leu
20 25 30

Gly Val Asp Trp Pro Gly Asp Val Arg Phe Asp Glu Asp Asn Thr Thr
35 40 45

Asp Phe Gly Ala Tyr Ile Asp Met Glu Leu Ala Glu Gly Ser Asn Ala
50 55 60

Val Gln Phe Leu Ile Asn Asn Asp Glu Gly Asp Asn Leu Thr Gly Asp
65 70 75 80

Leu Ser Val Asp Leu Leu Ser Asp Glu Met Asn Glu Val Trp Ile Thr
85 90 95

Glu Asp Ala Glu Ile Tyr Tyr Tyr Glu
100 105

<210> SEQ ID NO 74
<211> LENGTH: 99
<212> TYPE: PRT
<213> ORGANISM: Bacillus selenitireducens

<400> SEQUENCE: 74

Leu Arg Val His Phe Gln Thr Glu Asp Glu Gln Tyr Glu Pro Trp Gly
1 5 10 15

Leu Trp Thr Trp Gly Asp Val Ala Ala Ala Thr Glu Asp Trp Pro Thr
20 25 30

Gly Ala His Ala Phe Met Asn Asp Gln Thr Gly Pro Tyr Gly Ala Tyr
35 40 45

Tyr Asp Leu Asp Leu Ala Glu Asp Pro Ser Ser Val Ser Phe Leu Leu
50 55 60

Val Asn Arg Glu Asn Glu Glu Gln Thr Gly Asp Val Thr Phe Gly Asp
65 70 75 80

Leu Asp Asn His Arg Gln Val Phe Val His Leu Asp Lys Glu Gly Val
85 90 95

Phe Thr Asn

<210> SEQ ID NO 75
<211> LENGTH: 96
<212> TYPE: PRT
<213> ORGANISM: Bacillus selenitireducens

<400> SEQUENCE: 75

Asn His Met Arg Ile His Tyr Asp Asn Gly Asp Thr Pro Pro Gly Asn
1 5 10 15

```
Leu Gly Ile Trp Tyr Trp Asp Gly Ala Ala Val Ala Ser Glu Glu Phe
            20                  25                  30

Ser Ser Trp Pro Gly Glu Glu Arg Phe Ser Glu Asp Arg Met Thr Asp
        35                  40                  45

Phe Gly Pro Tyr Phe Asp Val Glu Leu Glu Glu Gly Ala Asp Arg Leu
    50                  55                  60

Asp Met Leu Val Asn Asp Ala Gly Gly Ala Asn Leu Thr Gly Asp Val
65                  70                  75                  80

Ala Ile Asn Ile Leu Ala Pro Glu Met Asn Glu Val Trp Leu Tyr Glu
                85                  90                  95


<210> SEQ ID NO 76
<211> LENGTH: 99
<212> TYPE: PRT
<213> ORGANISM: Bacillus selenitireducens

<400> SEQUENCE: 76

Asp Gln Val Arg Ile His Tyr Asp Arg Glu Asp Gly Asp Tyr Glu Asn
1               5                   10                  15

Trp Ala Val Trp Tyr Trp Asp Gln Gly Leu Asn Pro Pro Ser Glu Trp
            20                  25                  30

Pro Asp Glu Ala Val Asp Phe Asp Asn Glu Gly Arg Tyr Gly Ala Tyr
        35                  40                  45

Val Asp Ile Asp Leu Glu Glu Asp Ala Glu Glu Ile Gly Phe Leu Phe
    50                  55                  60

Leu Asn Lys Glu Ser Gly Glu Gln Thr Gly Asp Leu Gln Phe Asn Glu
65                  70                  75                  80

Leu Ala Asn Gln Asn Gln Ile Phe Val Ser Asp Ala Glu Asp Val Ala
                85                  90                  95

Tyr Asn Asn


<210> SEQ ID NO 77
<211> LENGTH: 105
<212> TYPE: PRT
<213> ORGANISM: Streptococcus henryi

<400> SEQUENCE: 77

Asp Thr Ile Arg Val His Phe Glu Asp Ile Ile Ser Asp Glu Val Asp
1               5                   10                  15

Gln Tyr Gly Leu Trp Thr Trp Gly Glu Val Ala Glu Pro Ser Asp Gly
            20                  25                  30

Asn Gln Trp Pro Ser Ala Ala Ala Pro Phe Ser Ala Glu Asn Lys Asp
        35                  40                  45

Asp Tyr Gly His Phe Ile Asp Val Lys Gln Ala Glu Ser His Gly Asp
    50                  55                  60

Ile Gly Tyr Leu Leu Leu Lys Asp Gly Glu Lys Val Ala Glu Gly Asp
65                  70                  75                  80

Gln Lys Ile Gln Pro Leu Thr Ser Glu Met Asn Glu Val Trp Val Thr
                85                  90                  95

Lys Asp Phe Ala Thr Tyr Ala Tyr Gln
            100                 105


<210> SEQ ID NO 78
<211> LENGTH: 102
<212> TYPE: PRT
<213> ORGANISM: Streptococcus henryi

<400> SEQUENCE: 78
```

```
Arg Ile Asn Tyr Lys Arg Asp Asp Asp Gln Tyr Asp Gly Trp Gly Val
1               5                   10                  15

Trp Leu Trp Gly Asp Val Ala Gln Ser Ser Ser Thr Trp Pro Thr Asp
            20                  25                  30

Ala Leu Asn Phe Ser Asn Val Gly Ala Tyr Gly Arg Tyr Val Asp Val
        35                  40                  45

Pro Leu Ser Asn Leu Leu Asp Ser Lys Ile Gly Phe Leu Leu Val Asn
    50                  55                  60

Gln Leu Asp Pro Glu Ala Pro Gly Asn Lys Thr Leu Asp Met Asn Phe
65                  70                  75                  80

Ser Asn Arg Val Thr His Ser Gln Ile Phe Leu Arg Asn Asp Asp Asp
                85                  90                  95

Thr Val Tyr Thr Asn Pro
            100


<210> SEQ ID NO 79
<211> LENGTH: 102
<212> TYPE: PRT
<213> ORGANISM: Streptococcus porci

<400> SEQUENCE: 79

Leu Arg Leu His Tyr Lys Arg Glu Asp Asn Gln Tyr Glu Gly Trp Gly
1               5                   10                  15

Val Trp Val Trp Gly Asp Thr Ser Ala Ser Phe Glu Lys Trp Pro Ser
            20                  25                  30

Asp Ala Leu Asp Phe Thr Gly Lys Asp Asp Lys Gly Ala Tyr Leu Asp
        35                  40                  45

Ile Ser Leu Ser Lys Gly Leu Ala Ser Asn Ile Gly Phe Leu Leu Val
    50                  55                  60

Asn Gln Asn Asp Asp Gln Ala Pro Gly Asn Lys Thr Lys Asp Leu Ala
65                  70                  75                  80

Phe Ser Asp Arg Glu Thr His Ser His Ile Phe Ile Lys Ala Gly Asp
                85                  90                  95

Asp Thr Val Tyr Thr Asn
            100


<210> SEQ ID NO 80
<211> LENGTH: 103
<212> TYPE: PRT
<213> ORGANISM: Paucisalibacillus globulus

<400> SEQUENCE: 80

Asp Thr Leu Arg Ile His Tyr Gln Arg Asp Asp Ala Asn Tyr Asn Gly
1               5                   10                  15

Leu Gly Val Trp Leu Trp Glu Asp Val Glu Ala Pro Ser Glu Asn Trp
            20                  25                  30

Pro Thr Gly Ala Thr Pro Phe Val Asp Gly Gln Gln Thr Ser Tyr Gly
        35                  40                  45

Ala Tyr Val Asp Val Pro Leu Lys Gly Asp Ala Gln Lys Val Gly Phe
    50                  55                  60

Leu Val Leu Asn Thr Thr Thr Gly Asp Lys Asp Gly Gly Asp Lys Phe
65                  70                  75                  80

Val Glu Leu Phe Ser Pro Glu Met Asn Glu Val Trp Ile Glu Gln Gly
                85                  90                  95

Ser Asp Glu Val Ser Leu Val
            100
```

<210> SEQ ID NO 81
<211> LENGTH: 97
<212> TYPE: PRT
<213> ORGANISM: Paucisalibacillus globulus

<400> SEQUENCE: 81

```
Asn Thr Ile Arg Ile His Tyr Asp Arg Glu Asp Gln Asn Tyr Asp Gly
1               5                   10                  15

Trp Ser Leu Trp Thr Trp Gly Asp Val Ala Ala Pro Thr Glu Asn Trp
            20                  25                  30

Pro Asn Gly Glu Asp Ser Ser Gly Val Gly Lys Tyr Gly Ala Tyr Tyr
        35                  40                  45

Asp Leu Lys Leu Ala Glu Asp Ala Ser Glu Ile Gly Phe Leu Phe Val
    50                  55                  60

Asn Lys Gln Ser Glu Glu Gln Thr Val Asp Tyr Ser Phe Asn Met Leu
65                  70                  75                  80

Asp His Asn Gln Ile Phe Val Thr Asp Gly Asp Asp Gln Val Tyr Thr
                85                  90                  95

Asn
```

<210> SEQ ID NO 82
<211> LENGTH: 103
<212> TYPE: PRT
<213> ORGANISM: Streptococcus suis

<400> SEQUENCE: 82

```
Ile Arg Leu His Phe Glu Asn Val Asp Glu Thr Ala Pro Glu Ser Gln
1               5                   10                  15

Gly Leu Trp Thr Trp Gly Gly Val Ala Glu Pro Ser Asp Gly Asn Gln
            20                  25                  30

Trp Pro Thr Asp Thr Ala Asn Phe Ser Ser Ser Gln Val Asp Asp Tyr
        35                  40                  45

Gly His Tyr Val Asp Ile Lys Lys Ser Glu Thr Pro Gly Thr Ile Gly
    50                  55                  60

Tyr Leu Val Leu Lys Asn Gly Glu Lys Ile Thr Glu Ser Asp Gln Lys
65                  70                  75                  80

Val Glu Leu Leu Val Pro Glu Gln Asn Glu Ala Trp Ile Ala Ser Asp
                85                  90                  95

Tyr Ser Val Ser Ser Tyr Glu
            100
```

<210> SEQ ID NO 83
<211> LENGTH: 103
<212> TYPE: PRT
<213> ORGANISM: Streptococcus suis

<400> SEQUENCE: 83

```
Asn Val Leu Arg Ile Asn Tyr Thr Arg Glu Asp Asn Asn Tyr Glu Gly
1               5                   10                  15

Trp Gly Val Trp Thr Trp Gly Asp Thr Thr Glu Ala Ser Ser Gly Trp
            20                  25                  30

Pro Ala Gly Ala Val Asp Phe Lys Leu Gly Lys Tyr Gly Ala Tyr Val
        35                  40                  45

Asp Ile Pro Leu Ser Asn Gly Leu Asp Ser Lys Leu Gly Phe Leu Leu
    50                  55                  60

Ile Asn Gln Asn Asn Pro Asp Leu Ala Gly Asn Lys Thr Ile Asp Leu
```

```
65                  70                  75                  80

Ala Phe Ala Asp Arg Lys Arg His Ser Gln Ile Phe Leu Arg Asn Asp
                85                  90                  95

Asp Asp Lys Val Tyr Thr Asn
            100


<210> SEQ ID NO 84
<211> LENGTH: 104
<212> TYPE: PRT
<213> ORGANISM: Streptococcus suis

<400> SEQUENCE: 84

Gly Tyr Ile Arg Ile Asn Tyr Phe Arg Thr Asp Gly Asn Tyr Asp Gln
1               5                   10                  15

Lys Gly Leu Trp Ile Trp Gly Asp Val Thr Asp Leu Thr Leu Gly Asp
            20                  25                  30

Trp Pro Asn Gly Ile Asp Phe Glu Asn Gln Gly Lys Tyr Gly Ala Tyr
        35                  40                  45

Ile Asp Val Lys Leu Thr Asp Leu Pro Ser Ser Ile Gly Phe Leu Leu
    50                  55                  60

Leu Asp Glu Ser Lys Ser Gly Asp Asp Val Lys Ile Gln Gln Lys Asp
65                  70                  75                  80

Tyr Ser Phe Lys Asp Leu Lys Asn Gln Thr Gln Ile Phe Leu Lys Asp
                85                  90                  95

Asp Asp Ala Thr Ile Tyr Thr Asn
            100


<210> SEQ ID NO 85
<211> LENGTH: 95
<212> TYPE: PRT
<213> ORGANISM: Microprunia glycogenica

<400> SEQUENCE: 85

Leu Lys Leu Thr Gly Ser Thr Lys Ser Pro Thr Arg Thr Ile Thr Phe
1               5                   10                  15

Ala Leu Pro Ser Asp His Pro Ala Gly Lys Val Ser Val Val Gly Asn
            20                  25                  30

Phe Asn Asp Trp Thr Pro Gly Ala Ala Pro Leu Lys Lys Arg Ser Asn
        35                  40                  45

Gly Thr Met Ser Thr Thr Val Lys Val Pro Ala Asp Tyr Ile Val Ala
    50                  55                  60

Phe Arg Tyr Leu Gly Glu Asn Asp Ala Trp Phe Asp Glu Pro Glu Ala
65                  70                  75                  80

Asp Phe Ile Asp Ala Gly Ala Ser Val Ile Leu Ala Arg Ala Ser
                85                  90                  95


<210> SEQ ID NO 86
<211> LENGTH: 97
<212> TYPE: PRT
<213> ORGANISM: Polaribacter sp. Hel1_33-34

<400> SEQUENCE: 86

Ser Ile Lys Lys Gln Phe Leu Lys Ser Lys Pro Val Cys Lys Val Thr
1               5                   10                  15

Phe Thr Val Pro Ala Glu Glu Ala Asn Asn Val Ala Val Val Gly Ser
            20                  25                  30

Phe Asn Glu Trp Asn Gly Lys Ala Thr Pro Leu Lys Lys Leu Lys Asn
        35                  40                  45
```

```
Gly Ser Phe Lys Gly Thr Val Asp Leu Asp Cys Gly Thr Ala Tyr Glu
    50                  55                  60

Phe Arg Tyr Leu Val Asp Gly Glu Tyr Ile Asn Glu Gln Glu Ala Asp
65                  70                  75                  80

Gly Ser Val Trp Ser Asp Phe Ala Gly Ala Asn Asn Cys Val Leu Ser
                85                  90                  95

Leu


<210> SEQ ID NO 87
<211> LENGTH: 97
<212> TYPE: PRT
<213> ORGANISM: Polaribacter sp. Hel1_85

<400> SEQUENCE: 87

Ala Ile Lys Lys Gln Phe Leu Lys Ser Lys Pro Val Cys Lys Val Thr
1               5                   10                  15

Phe Thr Val Pro Ala Glu Glu Ala Lys Lys Val Ala Val Val Gly Ser
            20                  25                  30

Phe Asn Glu Trp Asn Glu Lys Ala Thr Pro Leu Lys Lys Leu Lys Asn
        35                  40                  45

Gly Ser Phe Lys Gly Thr Val Asp Leu Glu Ser Gly Ser Ser Tyr Glu
    50                  55                  60

Phe Arg Tyr Leu Val Asp Gly Thr Tyr Val Asn Glu Gln Glu Ala Asp
65                  70                  75                  80

Ser Phe Ala Trp Ser Asp Tyr Ala Gly Ala Glu Asn Ser Val Leu Asn
                85                  90                  95

Ile


<210> SEQ ID NO 88
<211> LENGTH: 99
<212> TYPE: PRT
<213> ORGANISM: Pseudoalteromonas carrageenovora-IAM-12662

<400> SEQUENCE: 88

Leu Asn Lys Arg Phe Phe Lys Thr Lys Asp Glu Ala Glu Val Thr Phe
1               5                   10                  15

Glu Phe Ser His Pro Glu Ala Glu Gln Val Cys Leu Leu Gly Glu Phe
            20                  25                  30

Thr Asp Trp Gln Pro Val Pro Met Lys Leu Asn Lys Lys Gln Gly Val
        35                  40                  45

Phe Lys Phe Lys Gln Arg Leu Pro Val Asp Gln Gln Phe His Phe Arg
    50                  55                  60

Tyr Leu Val Asn Gly Asp Ile Trp Asp Asn Asp His Gln Ala Asp Gly
65                  70                  75                  80

Tyr Ile Ala Asn Asn Phe Gly Thr Glu Asn Ser Ile Val Asn Thr Gln
                85                  90                  95

Arg Ile Asn


<210> SEQ ID NO 89
<211> LENGTH: 101
<212> TYPE: PRT
<213> ORGANISM: Reinekea forsetii

<400> SEQUENCE: 89

Ala Val Lys Lys Lys Tyr Leu Lys Ser Lys Pro Ile Cys Lys Cys Thr
1               5                   10                  15
```

```
Phe Ser Leu Pro Lys Ala Ala Ala Pro Asn Ala Asp Arg Val Thr Leu
            20                  25                  30

Val Gly Asp Phe Asn Asn Trp Ala Glu Thr Thr Leu Glu Leu Lys Gln
        35                  40                  45

Leu Lys Ser Gly Glu Phe Arg Val Asp Leu Asp Leu Pro Ile Gly Gln
    50                  55                  60

Gln Tyr Gln Tyr Arg Tyr Leu Ile Asp Gly Thr Cys Trp Ala Asn Asp
65                  70                  75                  80

Trp Ala Ala Asp Asp Tyr Val Arg Val Pro Glu Tyr Gly Thr Asp Asn
                85                  90                  95

Ser Val Leu Ser Leu
            100


<210> SEQ ID NO 90
<211> LENGTH: 98
<212> TYPE: PRT
<213> ORGANISM: Zobellia galactanivorans

<400> SEQUENCE: 90

Ala Ile Ser Lys Gln Tyr Leu Lys Thr Lys Pro Val Cys Lys Val Thr
1               5                   10                  15

Phe Thr Val Pro Ala Glu Asp Ala Lys Lys Val Ala Val Val Gly Asp
            20                  25                  30

Phe Asn Asn Trp Lys Ala Asp Lys Ala Ser Ser Leu Lys Lys Leu Lys
        35                  40                  45

Asn Gly Asn Phe Lys Gly Thr Ile Glu Leu Pro Lys Glu Gly Ser Phe
    50                  55                  60

Glu Phe Lys Tyr Ile Val Asp Gly Asn Tyr Val Asn Glu Thr Glu Ala
65                  70                  75                  80

Asp Arg Tyr Gln Trp Asn Asp Tyr Ala Gly Gly Glu Asn Ala Val Leu
                85                  90                  95

Asp Leu


<210> SEQ ID NO 91
<211> LENGTH: 120
<212> TYPE: PRT
<213> ORGANISM: Actinophytocola oryzae

<400> SEQUENCE: 91

Glu Ala Glu Ala Pro Gln Leu Ala Gly Gly Ala Arg Val Glu Ser Glu
1               5                   10                  15

His Pro Gly Tyr Thr Gly Ser Gly Tyr Val Gly Gly Phe Val Asp Ala
            20                  25                  30

Asn Arg Gly Asn Ala Thr Ala Val Phe Thr Leu Thr Gly Val Thr Ser
        35                  40                  45

Gly Gly Asn Asp Leu Thr Ile Arg Tyr Ala Asn Gly Thr Gly Ala Ala
    50                  55                  60

Arg Thr Met Ser Leu Val Val Asn Gly Thr Ser Arg Gln Ile Ser Leu
65                  70                  75                  80

Pro Ala Thr Ser Asn Trp Asp Thr Trp Gly Thr Thr His Gln Thr Val
                85                  90                  95

Thr Leu Thr Ala Gly Thr Asn Thr Val Val Leu Arg Tyr Gly Met Ala
            100                 105                 110

Asp Asn Gly Asn Val Asn Leu Asp
        115                 120
```

```
<210> SEQ ID NO 92
<211> LENGTH: 123
<212> TYPE: PRT
<213> ORGANISM: Actinophytocola oryzae

<400> SEQUENCE: 92

Glu Ala Glu Ser Ser Thr Leu Ser Gly Gly Ala Val Val Glu Ser Glu
1               5                   10                  15

His Pro Gly Tyr Ser Gly Thr Gly Tyr Val Gly Gly Phe Val Asp Ala
            20                  25                  30

Asn Arg Gly Asn Ala Thr Ala Thr Phe Thr Val Ala Gly Ala Thr Ser
        35                  40                  45

Gly Asn His Asn Leu Thr Val Arg Tyr Ala Asn Gly Thr Gly Ala Thr
    50                  55                  60

Arg Thr Met Ser Leu Leu Val Asn Gly Ser Thr Arg Gln Ile Ala Leu
65                  70                  75                  80

Pro Ala Thr Ala Asn Trp Asp Thr Trp Thr Ser Thr Thr Glu Gln Val
                85                  90                  95

Thr Leu Asn Ala Gly Thr Asn Thr Ile Ala Leu Arg Tyr Gly Thr Ala
            100                 105                 110

Asp Asn Gly Asn Val Asn Val Asp Asn Leu Val
        115                 120


<210> SEQ ID NO 93
<211> LENGTH: 125
<212> TYPE: PRT
<213> ORGANISM: Catellatospora citrea

<400> SEQUENCE: 93

Tyr Gln Ala Glu Ser Ala Ala Arg Ser Gly Gly Ala Thr Val Ala Thr
1               5                   10                  15

Asp His Thr Gly Tyr Thr Gly Thr Gly Phe Val Ala Gly Tyr Gly Thr
            20                  25                  30

Leu Gly Ala Ala Thr Thr Phe Thr Val Thr Ala Gly Thr Ala Gly Thr
        35                  40                  45

Tyr Gln Ala Ala Leu Arg Phe Ser Asn Gly Pro Asn Pro Phe Val Gly
    50                  55                  60

Pro Lys Thr Val Ser Leu Tyr Val Asn Gly Val Lys Gln Arg Gln Val
65                  70                  75                  80

Thr Leu Gly Asn Thr Gly Asn Trp Asp Thr Trp Ser Thr Ile Thr Glu
                85                  90                  95

Ser Val Ala Leu Asn Ala Gly Ala Asn Thr Val Ala Phe Lys Tyr Asp
            100                 105                 110

Ser Gly Asp Thr Gly His Val Asn Leu Asp Ala Leu Thr
        115                 120                 125


<210> SEQ ID NO 94
<211> LENGTH: 119
<212> TYPE: PRT
<213> ORGANISM: Klebsiella pneumoniae

<400> SEQUENCE: 94

Asp Val Ser Lys Gly Thr Leu Asn Ser Ile Lys Ser Lys Lys Asp Thr
1               5                   10                  15

Leu Ala Ile Gly Glu Asp Gly Phe Leu Gly Pro Phe Ala His Asp Gly
            20                  25                  30

Asp Ser Val Ser Trp Gln Val Ser Ala Pro Trp Asp Gly Lys Phe Ala
        35                  40                  45
```

```
Leu His Val Lys Phe Asn Gly Lys Trp Gly Ser Lys Lys Asn Ser Phe
    50                  55                  60

Ile Val Asn Asp Gly Thr Pro Ile Ser Ile Glu Phe Pro Gln Thr Asp
65                  70                  75                  80

Glu Lys Gly Gln Thr Ile Val Val Pro Val Thr Leu Arg Glu Gly Ala
                85                  90                  95

Asn Thr Ile Ser Phe Gly Lys Phe Ala Gly Asp Trp Gly Tyr Met Phe
            100                 105                 110

Ile Lys Ser Val Asp Val Thr
        115


<210> SEQ ID NO 95
<211> LENGTH: 124
<212> TYPE: PRT
<213> ORGANISM: Paenibacillus sp. OV191

<400> SEQUENCE: 95

Arg Tyr Glu Ala Glu Lys Ala Ala Phe Gly Trp Lys Pro Ala Thr Ser
1               5                   10                  15

Pro Gln Ile Glu Val His Asp Gly Thr Ala Ala Gly Ala Tyr Val Thr
            20                  25                  30

Asn Ile Lys Asn Ala Gln Asp Ser Val Glu Phe Asp Val Ile Ala Gly
        35                  40                  45

Thr Ala Gly Thr Glu Thr Val Val Phe Gln Tyr Ala Thr Asp Asn Ser
    50                  55                  60

Pro Glu Ala Glu Leu Tyr Val Asn Ala Val Lys Gln Gln Asp Leu Thr
65                  70                  75                  80

Phe Pro Asn Thr Asn Gly Trp Gly Gly Asp Gly Lys Trp Ala Trp Arg
                85                  90                  95

Ser Ala Ser Ile Pro Val Asn Ala Gly Thr Asn Thr Val Arg Leu Ala
            100                 105                 110

Leu Ser Thr Asn Gly Gln Tyr Met Asn Leu Asp Gly
        115                 120


<210> SEQ ID NO 96
<211> LENGTH: 116
<212> TYPE: PRT
<213> ORGANISM: Promicrospora sp. YR516

<400> SEQUENCE: 96

Glu Ala Glu Asn Ala Tyr Arg Ser Gly Asn Ala Ala Val Ala Ser Ala
1               5                   10                  15

Thr Gly Gly Tyr Thr Gly Ser Gly Tyr Val Gly Gly Phe Thr Thr Ala
            20                  25                  30

Gly Ala Arg Val Leu Arg Thr Val Leu Ala Gly Ser Ala Gly Thr Ala
        35                  40                  45

Thr Ala Thr Phe Arg Phe Ala Thr Pro Ala Gly Gly Arg Thr Leu Asp
    50                  55                  60

Val Leu Val Asn Gly Arg Val Thr Gly Gln Val Ser Phe Gly Ala Gly
65                  70                  75                  80

Ser Gly Trp Arg Thr Val Thr Ala Ser Val Pro Val Arg Ala Gly Val
                85                  90                  95

Asn Thr Val Gly Leu Arg Ala Ala Gly Ser Gly Ala Asp Val Leu Val
            100                 105                 110

Asp Ser Ile Ala
        115
```

<210> SEQ ID NO 97
<211> LENGTH: 121
<212> TYPE: PRT
<213> ORGANISM: Raoultella ornithinolytica

<400> SEQUENCE: 97

```
Ile Phe Asp Val Ser Arg Gly Lys Ile Ala Ala Ala Lys Ser Glu Lys
1               5                   10                  15

Asp Ala Leu Thr Thr Ser Ala Asp Gly Phe Leu Gly Pro Phe Ala Asn
            20                  25                  30

Asp Gly Asp Arg Val Ser Trp Gln Val Pro Val Pro Trp Ser Gly Lys
        35                  40                  45

Tyr Gln Leu Arg Val Thr Phe Asn Gly Lys Trp Gly Gly Lys Lys Asn
    50                  55                  60

Ser Phe Ile Val Asn Gly Gly Ala Pro Ile Ala Val Glu Phe Pro Ala
65                  70                  75                  80

Thr Asp Glu Gln Gly Gln Gln Leu Gln Val Pro Val Glu Leu Lys Ala
                85                  90                  95

Gly Asp Asn Arg Ile Asp Phe Gly Lys Phe Ala Gly Asp Trp Gly Tyr
            100                 105                 110

Met Phe Ile Lys Ser Ile Glu Val Ile
        115                 120
```

<210> SEQ ID NO 98
<211> LENGTH: 125
<212> TYPE: PRT
<213> ORGANISM: Saccharotrix texasensis

<400> SEQUENCE: 98

```
Phe Glu Ala Glu Ser Ala Ala Leu Ser Gly Gly Ala Gly Leu Ala Thr
1               5                   10                  15

Asp His Thr Gly Tyr Ser Gly Ser Gly Phe Val Ala Gly Tyr Gly Thr
            20                  25                  30

Gln Gly Ala Thr Thr Arg Phe Ala Val Asn Ala Ala Ala Gly Gly Ser
        35                  40                  45

His Asn Val Gly Leu Arg Tyr Ser Asn Gly Pro Asn Pro Ser Ser Gly
    50                  55                  60

Thr Lys Thr Val Ser Val Tyr Val Asn Gly Thr Lys Val Arg Gln Val
65                  70                  75                  80

Ala Leu Ala Asp Thr Gly Thr Trp Asp Thr Trp Ala Thr His Thr Glu
                85                  90                  95

Ala Leu Ala Leu Arg Ala Gly Ala Asn Thr Ile Ala Tyr Lys Val Asp
            100                 105                 110

Ser Gly Asp Val Gly His Val Asn Leu Asp Tyr Leu Thr
        115                 120                 125
```

<210> SEQ ID NO 99
<211> LENGTH: 121
<212> TYPE: PRT
<213> ORGANISM: Streptomyces sp. 844.5

<400> SEQUENCE: 99

```
Arg Thr Tyr Glu Ala Glu Thr Ala Phe Phe Ala Gly Gly Pro Ala Thr
1               5                   10                  15

Ala Thr Ser Thr Ser Gly Tyr Ser Gly Ser Gly Tyr Leu Thr Gly Phe
            20                  25                  30
```

```
Thr Ala Gln Gly Ser Gln Val Val Ile Asp Val Asp Ala Pro Ser Ala
        35                  40                  45

Gly Ser Tyr Pro Val Gly Leu Arg Tyr Thr Asn Ser Thr Gly Ser Ala
    50                  55                  60

Gln Thr Ile Ser Leu Asn Ile Asn Gly Ile Arg Ser Gly Gln Leu Ser
65                  70                  75                  80

Leu Gln Ala Gly Ser Asn Trp Leu Thr Thr Thr Gln Asn Met Ser Leu
                85                  90                  95

Arg Ser Gly Leu Asn Leu Ile Gly Tyr Gln Thr Gly Pro Gly Asp Ser
            100                 105                 110

Gly Asn Ile Ala Ile Asp Asp Ile Thr
        115                 120
```

<210> SEQ ID NO 100
<211> LENGTH: 110
<212> TYPE: PRT
<213> ORGANISM: Alistipes oderdonkii

<400> SEQUENCE: 100

```
Phe Lys Phe Val Leu Asp Trp Thr Asn Ala Asp Ser Pro Thr Val Thr
1               5                   10                  15

Val Thr Glu Thr Thr Asp Ala Ala Asp Ala Asp Asn Thr Gln Gly Gly
            20                  25                  30

Pro Asp Asp Lys Tyr Leu Tyr Phe Gly Asn Gly Thr Ser Lys Arg Phe
        35                  40                  45

Tyr Ala Arg Gly Gly Asn Ser Tyr Glu Leu Thr Leu Asp Phe Asp Ser
    50                  55                  60

Asp Trp Gly Phe Leu Val Arg Thr Ser Thr Arg Ser Trp Ala Ala Gly
65                  70                  75                  80

Thr Lys Tyr Gly Ala Pro Asp Asn Arg Thr Ile Ile Arg Phe Gly Glu
                85                  90                  95

Pro Phe Thr Leu Met Ser Asn Arg Ser Ala Asp Pro Ala Asn
            100                 105                 110
```

<210> SEQ ID NO 101
<211> LENGTH: 109
<212> TYPE: PRT
<213> ORGANISM: Alistipes sp. AF14-19

<400> SEQUENCE: 101

```
Phe Lys Phe Val Leu Asp Trp Thr Asn Ala Asp Ser Pro Thr Val Thr
1               5                   10                  15

Val Thr Glu Thr Thr Asp Ala Ala Asp Asp Asn Thr Gln Gly Gly Ala
            20                  25                  30

Asp Asp Lys Tyr Leu Tyr Phe Gly Asn Gly Thr Ser Lys Arg Phe Tyr
        35                  40                  45

Ala Arg Gly Gly Asn Ser Tyr Glu Leu Thr Leu Asp Phe Asp Ser Asp
    50                  55                  60

Trp Gly Phe Leu Val Arg Thr Ser Thr Thr Ser Trp Ala Ala Gly Thr
65                  70                  75                  80

Lys Tyr Gly Ala Pro Asp Asn Arg Thr Ile Ile Arg Phe Gly Glu Pro
                85                  90                  95

Phe Thr Leu Met Ser Asn Arg Ser Ala Asp Pro Ala Asn
            100                 105
```

<210> SEQ ID NO 102
<211> LENGTH: 110

<212> TYPE: PRT
<213> ORGANISM: Alistipes sp. AM16-43

<400> SEQUENCE: 102

Phe Lys Phe Val Leu Asp Trp Thr Asn Ala Asp Ser Pro Thr Val Thr
1 5 10 15

Val Thr Glu Thr Thr Asp Ala Ala Asp Ala Asp Asn Thr Gln Gly Gly
20 25 30

Pro Asp Asp Lys Tyr Leu Tyr Phe Gly Asn Gly Thr Ser Lys Arg Phe
35 40 45

Tyr Thr Arg Gly Gly Asn Ser Tyr Glu Leu Thr Leu Asp Phe Asp Ser
50 55 60

Asp Trp Gly Phe Leu Val Arg Thr Ser Thr Thr Ser Trp Ala Ala Gly
65 70 75 80

Thr Lys Tyr Gly Ala Pro Asp Asn Arg Thr Ile Ile Arg Phe Gly Glu
85 90 95

Pro Phe Thr Leu Thr Ser Asn Arg Ser Ala Asp Pro Ala Asn
100 105 110

<210> SEQ ID NO 103
<211> LENGTH: 107
<212> TYPE: PRT
<213> ORGANISM: Bacteroides cutis

<400> SEQUENCE: 103

Tyr Lys Phe Val Leu Asp Trp Ser Asp Ser Ser Lys Pro Thr Val Thr
1 5 10 15

Val Thr Glu Ala Ser Val Val Asp Asn Asp Asn Pro Asp Thr Ser Thr
20 25 30

Lys Glu Ala Lys Tyr Leu Tyr Tyr Gly Asn Gly Val Cys Lys Lys Phe
35 40 45

Tyr Asp Lys Gly Asn Asn Lys Tyr Glu Leu Thr Val Asn Leu Asp Thr
50 55 60

Asp Trp Gly Phe Leu Ile Arg Thr Ser Asn Thr Thr Trp Asp Gly Gly
65 70 75 80

Thr Lys Tyr Gly Ala Ser Ser Leu Ser Ser Lys Val Lys Leu Gly Glu
85 90 95

Ala Phe Ala Ile Thr Asn Ser Ser Pro Glu Asn
100 105

<210> SEQ ID NO 104
<211> LENGTH: 107
<212> TYPE: PRT
<213> ORGANISM: Bacteroides eggerthii

<400> SEQUENCE: 104

Tyr Lys Phe Val Leu Asp Trp Ser Asn Ala Ala Ser Pro Thr Ile Thr
1 5 10 15

Val Thr Glu Gly Asp Thr Pro Asp Val Asp Asn Ala Asp Val Ala Thr
20 25 30

Gln Gly Ala Lys Tyr Leu Tyr Tyr Gly Glu Gly Ile Cys Lys Lys Phe
35 40 45

Tyr Ala Lys Asp Asn Asn Lys Tyr Glu Leu Thr Val Asp Leu Asp Thr
50 55 60

Asp Trp Gly Phe Leu Ile Arg Thr Ser Asn Thr Ser Trp Asp Asn Gly
65 70 75 80

Thr Lys Tyr Gly Ala Pro Ser Lys Ala Ser Lys Ile Gln Leu Gly Lys

```
                85                  90                  95

Ala Phe Thr Leu Ser Asn Thr Thr Pro Glu Asp
            100                 105


<210> SEQ ID NO 105
<211> LENGTH: 109
<212> TYPE: PRT
<213> ORGANISM: Bacteroides faecis

<400> SEQUENCE: 105

Leu Lys Phe Thr Leu Asp Trp Ser Asn Ala Ser Ser Pro Thr Leu Ile
1               5                   10                  15

Val Thr Thr Gly Ala Lys Ala Asp Glu Asp Asn Pro Asp Thr Gly Thr
            20                  25                  30

Thr Asn Ala Lys Tyr Leu Tyr Tyr Gly Asp Gly Ile Cys Lys Lys Phe
        35                  40                  45

Tyr Asp Lys Gly Asn Asn Leu Tyr Glu Leu Thr Val Asp Phe Glu Ser
    50                  55                  60

Thr Trp Gly Leu Leu Ile Arg Thr Ser Asn Asp Ser Ser Trp Pro Ala
65                  70                  75                  80

Gly Thr Lys Tyr Gly Ala Ser Ser Ser Ser Glu Lys Val Thr Leu Asn
                85                  90                  95

Lys Glu Phe Lys Leu Thr Asn Ala Gly Thr Pro Ala Asn
            100                 105


<210> SEQ ID NO 106
<211> LENGTH: 107
<212> TYPE: PRT
<213> ORGANISM: Bacteroides heparinolyticus

<400> SEQUENCE: 106

Tyr Lys Phe Arg Leu Asp Trp Ser Asn Ala Ser Lys Pro Thr Val Thr
1               5                   10                  15

Val Thr Lys Ala Glu Thr Ala Asp Lys Asp Asn Pro Asp Gln Ser Thr
            20                  25                  30

Thr Gly Ala Lys Tyr Leu Tyr Phe Gly Glu Arg Val Thr Lys Lys Phe
        35                  40                  45

Tyr Asp Lys Gly Asn Gly Ile Tyr Glu Leu Thr Val Asp Phe Ala Ser
    50                  55                  60

Ala Trp Gly Phe Leu Ile Arg Thr Ser Thr Thr Glu Trp Gly Asn His
65                  70                  75                  80

Lys Tyr Gly Ala Ser Ser Ala Gly Thr Lys Val Lys Phe Gly Glu Ala
                85                  90                  95

Leu Ala Leu Lys Gln Gly Asn Asp Ala Lys Asp
            100                 105


<210> SEQ ID NO 107
<211> LENGTH: 108
<212> TYPE: PRT
<213> ORGANISM: Bacteroides sp. AF25-17LB

<400> SEQUENCE: 107

Tyr Lys Phe Val Leu Asp Trp Ser Asn Ala Ser Lys Pro Thr Val Thr
1               5                   10                  15

Val Ser Val Ala Glu Lys Ala Asp Thr Asp Asn Thr Asp Gln Thr Thr
            20                  25                  30

Thr Gly Ala Lys Tyr Leu Tyr Tyr Gly Asp Pro Ala Val Cys Lys Lys
        35                  40                  45
```

```
Phe Tyr Asp Lys Gly Asn Gly Ile Tyr Glu Leu Thr Val Asp Phe Ser
    50                  55                  60

Ser Pro Trp Gly Phe Leu Ile Arg Thr Ser Asn Thr Asp Trp Gly Asn
65                  70                  75                  80

His Lys Tyr Gly Ala Ala Ser Thr Ser Thr Arg Leu Lys Tyr Gly Glu
                85                  90                  95

Pro Phe Ala Leu Lys Gln Gly Glu Asp Ala Glu Asp
            100                 105


<210> SEQ ID NO 108
<211> LENGTH: 109
<212> TYPE: PRT
<213> ORGANISM: Bacteroides sp. AM10-21B

<400> SEQUENCE: 108

Tyr Lys Phe Leu Leu Asp Trp Ser Asn Pro Ser Lys Pro Thr Val Thr
1               5                   10                  15

Val Ile Gln Gly Asn Thr Ala Asp Ile Ser Glu Asn Thr Ala Ala Asp
            20                  25                  30

Thr Glu Asn Asp Lys Phe Ile Trp Phe Gly Lys Asp Ile Cys Lys Lys
        35                  40                  45

Phe Phe Asp Lys Gly Asn Gly Ile Tyr Glu Leu Thr Val Asp Phe Thr
    50                  55                  60

Ser Asn Trp Gly Phe Leu Ile Arg Thr Ser Asn Asn Pro Asn Trp Pro
65                  70                  75                  80

Ala Gly Thr Lys Tyr Gly Ala Val Ser Glu Asp Val Arg Leu Thr Leu
                85                  90                  95

Gly Lys Thr Phe Ile Leu Asn Ser Ser Ile Ala Ala Asn
            100                 105


<210> SEQ ID NO 109
<211> LENGTH: 108
<212> TYPE: PRT
<213> ORGANISM: Bacteroides sp. D20

<400> SEQUENCE: 109

Tyr Lys Phe Val Leu Asp Trp Ser Asn Ala Ser Lys Pro Thr Val Thr
1               5                   10                  15

Val Ser Val Ala Glu Lys Ala Asp Thr Asp Asn Thr Asp Gln Thr Thr
            20                  25                  30

Thr Gly Ala Lys Tyr Leu Tyr Tyr Gly Asp Pro Ala Val Cys Lys Lys
        35                  40                  45

Phe Tyr Asp Lys Gly Asn Gly Ile Tyr Glu Leu Thr Val Asp Phe Ser
    50                  55                  60

Ser Pro Trp Gly Phe Leu Ile Arg Thr Ser Asn Thr Asp Trp Gly Asn
65                  70                  75                  80

His Lys Tyr Gly Ala Ala Ser Thr Ser Thr Arg Leu Lys Tyr Gly Glu
                85                  90                  95

Pro Phe Ala Leu Lys Gln Gly Glu Asp Ala Glu Asp
            100                 105


<210> SEQ ID NO 110
<211> LENGTH: 108
<212> TYPE: PRT
<213> ORGANISM: Bacteroides sp NM69

<400> SEQUENCE: 110
```

```
Tyr Lys Phe Val Leu Asp Trp Ser Asn Ala Ser Lys Pro Thr Val Thr
1               5                   10                  15

Val Ser Val Ala Glu Lys Ala Asp Thr Asp Asn Thr Asp Gln Thr Thr
            20                  25                  30

Ala Asp Ala Lys Tyr Leu Tyr Tyr Gly Asp Pro Ala Val Cys Lys Lys
        35                  40                  45

Phe Tyr Asp Lys Gly Asn Gly Ile Phe Glu Leu Thr Val Asp Phe Ser
    50                  55                  60

Ser Pro Trp Gly Phe Leu Ile Arg Thr Ser Asn Thr Asp Trp Gly Asn
65                  70                  75                  80

His Lys Tyr Gly Ala Thr Ser Ala Gly Thr Arg Leu Lys Tyr Asp Glu
                85                  90                  95

Pro Phe Ala Leu Lys Gln Gly Glu Gly Ala Ala Asp
            100                 105


<210> SEQ ID NO 111
<211> LENGTH: 109
<212> TYPE: PRT
<213> ORGANISM: Bacteroides sp. OM08-17BH

<400> SEQUENCE: 111

Tyr Lys Phe Leu Leu Asp Trp Ser Asn Pro Ser Lys Pro Thr Val Thr
1               5                   10                  15

Val Ile Gln Gly Asn Thr Ala Asp Ile Ser Glu Asn Thr Ala Ala Asp
            20                  25                  30

Thr Glu Asn Asp Lys Phe Ile Trp Phe Gly Lys Asp Ile Cys Lys Lys
        35                  40                  45

Phe Phe Asp Lys Gly Asn Gly Ile Tyr Glu Leu Thr Val Asp Phe Thr
    50                  55                  60

Ser Asn Trp Gly Phe Leu Ile Arg Thr Ser Asn Asn Pro Asn Trp Pro
65                  70                  75                  80

Ala Gly Thr Lys Tyr Gly Ala Val Ser Glu Asp Val Arg Leu Thr Leu
                85                  90                  95

Gly Lys Thr Phe Ile Leu Asn Ser Ser Ile Ala Ala Asn
            100                 105


<210> SEQ ID NO 112
<211> LENGTH: 107
<212> TYPE: PRT
<213> ORGANISM: Bacteroides stercoris

<400> SEQUENCE: 112

Tyr Lys Phe Val Leu Asp Trp Ser Asn Ala Ala Arg Pro Thr Ile Thr
1               5                   10                  15

Val Thr Lys Ala Asp Thr Pro Asn Ala Asp Thr Pro Asp Val Thr Thr
            20                  25                  30

Gln Asp Ala Lys Tyr Leu Tyr Tyr Gly Glu Gly Ile Cys Lys Lys Phe
        35                  40                  45

Tyr Ala Arg Gly Asn Asn Lys Tyr Glu Leu Thr Val Asp Leu Asp Thr
    50                  55                  60

Asp Trp Gly Phe Leu Ile Arg Thr Ser Asn Thr Ser Trp Asp Asn Gly
65                  70                  75                  80

Thr Lys Tyr Gly Ala Pro Ser Lys Ala Ser Lys Val Gln Leu Gly Lys
                85                  90                  95

Pro Phe Thr Leu Ser Asn Ala Asn Pro Glu Asp
            100                 105
```

<210> SEQ ID NO 113
<211> LENGTH: 109
<212> TYPE: PRT
<213> ORGANISM: Bacteroides thetaiotaomicron VPI5482

<400> SEQUENCE: 113

```
Leu Lys Phe Thr Leu Asp Trp Ser Asn Ala Pro Ser Pro Ile Leu Val
1               5                   10                  15

Val Ser Thr Gly Thr Lys Ala Asp Glu Asp Asn Pro Asp Thr Gly Thr
            20                  25                  30

Asp Asn Ala Lys Tyr Leu Tyr Tyr Gly Glu Asp Ile Cys Lys Lys Phe
        35                  40                  45

Tyr Asp Lys Gly Asn Asn Ile Tyr Glu Leu Thr Val Asp Phe Glu Ser
    50                  55                  60

Thr Trp Gly Leu Leu Ile Arg Thr Ser Asn Ala Ser Phe Trp Pro Ser
65                  70                  75                  80

Gly Thr Lys Tyr Gly Ala Ser Ser Ser Ser Glu Lys Leu Ala Leu Asn
                85                  90                  95

Lys Asp Phe Lys Leu Thr Asn Ala Gly Asn Pro Ala Asn
            100                 105
```

<210> SEQ ID NO 114
<211> LENGTH: 109
<212> TYPE: PRT
<213> ORGANISM: Bacteroides thetaiotaomicron

<400> SEQUENCE: 114

```
Leu Lys Phe Thr Leu Asp Trp Ser Asn Ala Ser Ser Pro Ile Leu Val
1               5                   10                  15

Val Ser Thr Gly Thr Lys Ala Asp Glu Asp Asn Pro Asp Thr Gly Thr
            20                  25                  30

Asp Asn Ala Lys Tyr Leu Tyr Tyr Gly Asp Gly Ile Cys Lys Lys Phe
        35                  40                  45

Tyr Asp Lys Gly Asn Asn Ile Tyr Glu Leu Thr Val Asp Phe Glu Ser
    50                  55                  60

Thr Trp Gly Leu Leu Ile Arg Thr Ser Asn Asp Ser Ser Trp Pro Ser
65                  70                  75                  80

Gly Thr Lys Tyr Gly Ala Ser Ser Ser Ser Glu Lys Leu Ala Leu Asn
                85                  90                  95

Lys Asp Phe Lys Leu Thr Asn Ala Gly Ser Pro Ala Asn
            100                 105
```

<210> SEQ ID NO 115
<211> LENGTH: 108
<212> TYPE: PRT
<213> ORGANISM: Bacteroides uniformis

<400> SEQUENCE: 115

```
Tyr Lys Phe Val Leu Asp Trp Ser Asn Ala Ser Lys Pro Thr Val Thr
1               5                   10                  15

Val Ser Val Ala Glu Lys Ala Asp Thr Asp Asn Thr Asp Gln Thr Thr
            20                  25                  30

Thr Gly Ala Lys Tyr Leu Tyr Tyr Gly Asp Pro Ala Val Cys Lys Lys
        35                  40                  45

Phe Tyr Asp Lys Gly Asn Gly Ile Tyr Glu Leu Thr Val Asp Phe Ser
    50                  55                  60

Ser Pro Trp Gly Phe Leu Ile Arg Thr Ser Asn Thr Asp Trp Gly Asn
```

```
65                  70                  75                  80

His Lys Tyr Gly Ala Ala Ser Thr Ser Thr Arg Leu Lys Tyr Gly Glu
                85                  90                  95

Pro Phe Ala Leu Lys Gln Gly Glu Asp Ala Glu Asp
            100                 105


<210> SEQ ID NO 116
<211> LENGTH: 109
<212> TYPE: PRT
<213> ORGANISM: Barnesiella sp. AN 55

<400> SEQUENCE: 116

Tyr Thr Phe Thr Leu Asp Trp Ser Ser Pro Ser Gln Pro Thr Val Thr
1               5                   10                  15

Val Thr Gln Ala Ser Arg Ala Asp Val Asp Ala Asp Asn Thr Ser Pro
            20                  25                  30

Ser Thr Ser Ser Asp Lys Tyr Leu Tyr Tyr Gly Asp Ala Val Cys Lys
        35                  40                  45

Lys Phe Tyr Asp Lys Gly Asn Gly Ile Tyr Glu Leu Thr Val Asp Phe
    50                  55                  60

Ala Ser Ser Trp Gly Phe Leu Ile Arg Thr Ser Asn Thr Gln Trp Gly
65                  70                  75                  80

Asn Tyr Lys Tyr Gly Ala Ala Arg Gln Gly Asp Gln Ala Arg Leu Gly
                85                  90                  95

Glu Pro Phe Ala Leu Lys Gln Gly Glu Asn Ala Gln Asn
            100                 105


<210> SEQ ID NO 117
<211> LENGTH: 120
<212> TYPE: PRT
<213> ORGANISM: Artificial Sequence
<220> FEATURE:
<223> OTHER INFORMATION: Synthetic Construct
<220> FEATURE:
<221> NAME/KEY: misc_feature
<222> LOCATION: (22)..(22)
<223> OTHER INFORMATION: Xaa can be any naturally occurring amino acid
<220> FEATURE:
<221> NAME/KEY: misc_feature
<222> LOCATION: (24)..(25)
<223> OTHER INFORMATION: Xaa can be any naturally occurring amino acid
<220> FEATURE:
<221> NAME/KEY: misc_feature
<222> LOCATION: (41)..(41)
<223> OTHER INFORMATION: Xaa can be any naturally occurring amino acid
<220> FEATURE:
<221> NAME/KEY: misc_feature
<222> LOCATION: (45)..(46)
<223> OTHER INFORMATION: Xaa can be any naturally occurring amino acid
<220> FEATURE:
<221> NAME/KEY: misc_feature
<222> LOCATION: (51)..(56)
<223> OTHER INFORMATION: Xaa can be any naturally occurring amino acid
<220> FEATURE:
<221> NAME/KEY: misc_feature
<222> LOCATION: (62)..(64)
<223> OTHER INFORMATION: Xaa can be any naturally occurring amino acid
<220> FEATURE:
<221> NAME/KEY: misc_feature
<222> LOCATION: (74)..(76)
<223> OTHER INFORMATION: Xaa can be any naturally occurring amino acid
<220> FEATURE:
<221> NAME/KEY: misc_feature
<222> LOCATION: (84)..(84)
<223> OTHER INFORMATION: Xaa can be any naturally occurring amino acid
<220> FEATURE:
<221> NAME/KEY: misc_feature
<222> LOCATION: (91)..(91)
```

<223> OTHER INFORMATION: Xaa can be any naturally occurring amino acid
<220> FEATURE:
<221> NAME/KEY: misc_feature
<222> LOCATION: (97)..(97)
<223> OTHER INFORMATION: Xaa can be any naturally occurring amino acid
<220> FEATURE:
<221> NAME/KEY: misc_feature
<222> LOCATION: (100)..(100)
<223> OTHER INFORMATION: Xaa can be any naturally occurring amino acid
<220> FEATURE:
<221> NAME/KEY: misc_feature
<222> LOCATION: (104)..(104)
<223> OTHER INFORMATION: Xaa can be any naturally occurring amino acid
<220> FEATURE:
<221> NAME/KEY: misc_feature
<222> LOCATION: (107)..(108)
<223> OTHER INFORMATION: Xaa can be any naturally occurring amino acid
<220> FEATURE:
<221> NAME/KEY: misc_feature
<222> LOCATION: (113)..(113)
<223> OTHER INFORMATION: Xaa can be any naturally occurring amino acid

<400> SEQUENCE: 117

```
Met Tyr Ile Ala Lys Glu Gly Tyr Cys Tyr Ile Asn Ile Phe Leu Ala
1               5                   10                  15

Met Leu Ile Asn Val Xaa Glu Xaa Xaa Ala Lys Asp Phe Thr Lys Val
            20                  25                  30

Arg Asp Cys Val Pro Lys Leu Gly Xaa Trp Pro Thr Xaa Xaa Asp Leu
        35                  40                  45

Ala Thr Xaa Xaa Xaa Xaa Xaa Xaa Ile Phe Tyr Pro Asp Xaa Xaa Xaa
    50                  55                  60

Ala Glu Leu Pro Arg Ile Leu Val Asp Xaa Xaa Xaa Thr Met His Val
65                  70                  75                  80

Val Asp Ser Xaa Gly Ser Leu Thr Thr Gly Xaa His Ile Leu Lys Ala
                85                  90                  95

Xaa Thr Val Xaa Gln Leu Ile Xaa Phe Ala Xaa Xaa Glu Leu Glu Ser
            100                 105                 110

Xaa Ile Lys His Tyr Arg Val Gly
        115                 120
```

<210> SEQ ID NO 118
<211> LENGTH: 156
<212> TYPE: PRT
<213> ORGANISM: Artificial Sequence
<220> FEATURE:
<223> OTHER INFORMATION: Synthetic Construct

<400> SEQUENCE: 118

```
Gly Val Arg Asp Pro Val Tyr Asp Asp His Gly Thr Gln Gly Ile Gly
1               5                   10                  15

Thr Cys Phe His Val Gly Glu Gly Val Leu Leu Lys Leu Pro His Asp
            20                  25                  30

Arg Gly Arg Gly Asn Ile Lys Thr Thr Leu Thr Ala Leu Ser Leu Leu
        35                  40                  45

Glu Asp Pro Lys His Trp Asp Arg Lys Gly Pro Gln Gly Ser Val Thr
    50                  55                  60

Ile Thr Arg Gly Pro Val Phe Tyr Ser Asp Trp Met Gly Tyr Glu Leu
65                  70                  75                  80

Val Leu Tyr His Thr Leu Val Leu Gly Tyr Ser Glu Ala Lys Gln Thr
                85                  90                  95

Lys Lys Thr Leu Leu Ile Gly Arg Val Thr Ala Arg Gly Gly Phe Ser
            100                 105                 110
```

```
Gly Gly Ile Leu Leu Cys Ile His Asp Glu Ala Asn Gly Val Ile Thr
        115                 120                 125

Gln Ala Leu Cys Lys Asn Gly Glu Pro Glu Gln Leu Gly Tyr Met Ala
    130                 135                 140

Val Leu Thr Ile Glu Pro Leu Trp Val Thr Ser Cys
145                 150                 155


<210> SEQ ID NO 119
<211> LENGTH: 152
<212> TYPE: PRT
<213> ORGANISM: Artificial Sequence
<220> FEATURE:
<223> OTHER INFORMATION: Synthetic Construct

<400> SEQUENCE: 119

Gly Pro Ser Asp Met Tyr Val His Val Gly Lys Pro Leu Tyr Gly Asp
1               5                   10                  15

Pro His Leu Phe Ser Glu Val His Pro Ser Ile Leu Val Lys Leu Pro
            20                  25                  30

His Asp Leu Gly Ile Gly Asn Thr Asn Thr Thr Leu Lys Asp Leu Pro
        35                  40                  45

Arg Ser Gly Asp Cys Thr Gln Ala Thr Arg Leu Gly Pro Val Ser Gly
    50                  55                  60

Ile Tyr Val Lys Pro Gly Pro Val Phe Tyr Thr Val Thr Ser Gly Pro
65                  70                  75                  80

Leu Tyr His Arg Ala Pro Leu Glu Tyr Tyr Ser Glu Ala Lys His Ile
                85                  90                  95

Gln Tyr Asn Leu Leu Ile Gly Arg Val Thr Ser Glu Asp Gly Asp Ala
            100                 105                 110

Gly Gly Lys Leu Leu Cys Ile His Gly Val Ile Gly Ile Val Thr Ala
        115                 120                 125

Gly Gly Gly Asn Pro Val Thr Phe Lys Asp Leu Arg Asn Phe Thr Asp
    130                 135                 140

Cys Pro Glu Gln Val Thr Ser Cys
145                 150


<210> SEQ ID NO 120
<211> LENGTH: 142
<212> TYPE: PRT
<213> ORGANISM: Artificial Sequence
<220> FEATURE:
<223> OTHER INFORMATION: Synthetic Construct

<400> SEQUENCE: 120

Gly Val Glu Glu Tyr Cys Tyr Asn Ile Ser Gly Arg Pro Val Ile Gly
1               5                   10                  15

Asp Pro Thr Glu Val Tyr Pro Asp Asn Ile Ser Lys Val Pro His Asp
            20                  25                  30

Lys Gly Arg Gly Asn Ile Gly Thr Ser Ile Arg Asn Leu Pro Arg Arg
        35                  40                  45

Gly Asn Cys Arg Val Cys Tyr Ser Gly Gln Tyr Ile Gly Ile Tyr Gly
    50                  55                  60

Pro Val Phe Tyr Gln Asp Val Ala Asn Ala Glu Leu Pro Arg Met Leu
65                  70                  75                  80

Val Glu His Lys Thr Lys Ile Cys His Val Val Lys Arg Ile Gly Arg
                85                  90                  95

Val Thr Gly Ser Leu Tyr His Val Leu Lys Cys Ile Asn Gly Cys Asn
            100                 105                 110
```

Val Ile Lys Tyr Ser Arg Cys Gly Leu Glu Pro Ser Ser Leu Lys Trp
115 120 125

Ile Arg Asn Phe Thr Asp Cys Pro Leu Trp Val Thr Ser Cys
130 135 140

<210> SEQ ID NO 121
<211> LENGTH: 25
<212> TYPE: PRT
<213> ORGANISM: Artificial Sequence
<220> FEATURE:
<223> OTHER INFORMATION: Synthetic Construct

<400> SEQUENCE: 121

Gly Ser Lys Glu Ser Gly Ser Val Ser Ser Glu Gln Leu Ala Gln Phe
1 5 10 15

Arg Ser Leu Asp Ala Gly Ser Ala Ser
20 25

<210> SEQ ID NO 122
<211> LENGTH: 17
<212> TYPE: PRT
<213> ORGANISM: Artificial Sequence
<220> FEATURE:
<223> OTHER INFORMATION: Synthetic Construct

<400> SEQUENCE: 122

Glu Leu Asn His Phe Glu Leu Leu Tyr Lys Thr Asn Lys Gln Lys Pro
1 5 10 15

Val

<210> SEQ ID NO 123
<211> LENGTH: 39
<212> TYPE: PRT
<213> ORGANISM: Artificial Sequence
<220> FEATURE:
<223> OTHER INFORMATION: Synthetic Construct

<400> SEQUENCE: 123

Met Asn Asn Asn Asp Leu Phe Gln Ala Ser Arg Arg Arg Phe Leu Ala
1 5 10 15

Gln Leu Gly Gly Leu Thr Val Ala Gly Met Leu Gly Pro Ser Leu Leu
20 25 30

Thr Pro Arg Arg Ala Ser Ala
35

<210> SEQ ID NO 124
<211> LENGTH: 21
<212> TYPE: PRT
<213> ORGANISM: Artificial Sequence
<220> FEATURE:
<223> OTHER INFORMATION: Synthetic Construct

<400> SEQUENCE: 124

Met Lys Lys Ser Thr Leu Ala Leu Val Val Met Gly Ile Val Ala Ser
1 5 10 15

Ala Ser Ala Ser Ala
20

<210> SEQ ID NO 125
<211> LENGTH: 52
<212> TYPE: PRT
<213> ORGANISM: Artificial Sequence
<220> FEATURE:

<223> OTHER INFORMATION: Synthetic Construct

<400> SEQUENCE: 125

```
Met Asn Arg Ile Tyr Ser Leu Arg Tyr Ser Ala Val Ala Arg Gly Phe
1               5                   10                  15

Ile Ala Val Ser Glu Phe Ala Arg Lys Cys Val His Lys Ser Val Arg
            20                  25                  30

Arg Leu Cys Phe Pro Val Leu Leu Leu Ile Pro Val Leu Phe Ser Ala
        35                  40                  45

Gly Ala Ser Ala
    50
```

<210> SEQ ID NO 126
<211> LENGTH: 19
<212> TYPE: PRT
<213> ORGANISM: Artificial Sequence
<220> FEATURE:
<223> OTHER INFORMATION: Synthetic Construct

<400> SEQUENCE: 126

```
Met Lys Lys Ile Trp Leu Ala Leu Ala Gly Leu Val Leu Ala Phe Ser
1               5                   10                  15

Ala Ser Ala
```

<210> SEQ ID NO 127
<211> LENGTH: 46
<212> TYPE: PRT
<213> ORGANISM: Artificial Sequence
<220> FEATURE:
<223> OTHER INFORMATION: Synthetic Construct

<400> SEQUENCE: 127

```
Met Ala Val Ile Ser Ala Leu Leu Val Val Ala Ala Val Thr Met Ile
1               5                   10                  15

Val Ala Ser Leu Leu Gln Arg Gln Asp Thr Phe Leu Arg Ala Val Gln
            20                  25                  30

Ala Ala Gln Thr Arg Ala Gln Ala Gln Ala Leu Leu Glu Ala
        35                  40                  45
```

<210> SEQ ID NO 128
<211> LENGTH: 24
<212> TYPE: PRT
<213> ORGANISM: Artificial Sequence
<220> FEATURE:
<223> OTHER INFORMATION: Synthetic Construct

<400> SEQUENCE: 128

```
Met Ala Val Leu Lys Thr Arg Arg Ser Thr Arg Arg Ser Thr Arg Arg
1               5                   10                  15

Ala Val Leu Lys Asp Trp Glu Ala
            20
```

<210> SEQ ID NO 129
<211> LENGTH: 28
<212> TYPE: PRT
<213> ORGANISM: Artificial Sequence
<220> FEATURE:
<223> OTHER INFORMATION: Synthetic Construct

<400> SEQUENCE: 129

```
Met His Ser Thr Asp Ala Leu Val Lys Leu Lys Arg Arg Arg Arg Glu
1               5                   10                  15
```

```
Phe His Gly Arg Leu Ala Arg Leu Ala Val His Asn
            20                  25


<210> SEQ ID NO 130
<211> LENGTH: 32
<212> TYPE: PRT
<213> ORGANISM: Artificial Sequence
<220> FEATURE:
<223> OTHER INFORMATION: Synthetic Construct

<400> SEQUENCE: 130

Met Val Glu Asp Pro His Arg Leu Lys Arg Leu Lys Arg Leu Val Ala
1               5                   10                  15

Asn Ala Arg Ala Arg Ala Arg Ala Arg Leu Val Asn Asp Ile Glu Asn
            20                  25                  30


<210> SEQ ID NO 131
<211> LENGTH: 394
<212> TYPE: PRT
<213> ORGANISM: Artificial Sequence
<220> FEATURE:
<223> OTHER INFORMATION: Synthetic Construct

<400> SEQUENCE: 131

Met Ala Val Leu Lys Thr Arg Arg Ser Thr Arg Arg Ser Thr Arg Arg
1               5                   10                  15

Ala Val Leu Lys Asp Trp Glu Ala Met Val Tyr Val Lys Val Pro Asp
            20                  25                  30

Thr Trp Thr Gly Ile Pro Asn Ile His Tyr Trp Asn Thr Thr Gly Gly
        35                  40                  45

Thr Thr Thr Trp Pro Gly Lys Gln Met Lys Glu Glu Gly Asn Glu Ile
    50                  55                  60

Tyr Ser Ile Ile Ile Pro Lys Ser Phe Gly Asp Val Ser Ile Ile Ile
65                  70                  75                  80

Asn Asp Gly Asn Asn Val Tyr Val Lys Val Pro Asp Thr Trp Thr Gly
                85                  90                  95

Ile Pro Asn Ile His Tyr Trp Asn Thr Thr Gly Gly Thr Thr Thr Trp
            100                 105                 110

Pro Gly Lys Gln Met Lys Glu Glu Gly Asn Glu Ile Tyr Ser Ile Ile
        115                 120                 125

Ile Pro Lys Ser Phe Gly Asp Val Ser Ile Ile Ile Asn Asp Gly Asn
    130                 135                 140

Asn Val Tyr Val Lys Val Pro Asp Thr Trp Thr Gly Ile Pro Asn Ile
145                 150                 155                 160

His Tyr Trp Asn Thr Thr Gly Gly Thr Thr Thr Trp Pro Gly Lys Gln
                165                 170                 175

Met Lys Glu Glu Gly Asn Glu Ile Tyr Ser Ile Ile Ile Pro Lys Ser
            180                 185                 190

Phe Gly Asp Val Ser Ile Ile Ile Asn Asp Gly Asn Asn Glu Gly Ser
        195                 200                 205

Lys Glu Ser Gly Ser Val Ser Ser Glu Gln Leu Ala Gln Phe Arg Ser
    210                 215                 220

Leu Asp Ala Gly Ser Ala Ser Glu Leu Asn His Phe Glu Leu Leu Tyr
225                 230                 235                 240

Lys Thr Asn Lys Gln Lys Pro Val Gly Val Glu Glu Tyr Cys Tyr Asn
                245                 250                 255

Ile Ser Gly Arg Pro Val Ile Gly Asp Pro Thr Glu Val Tyr Pro Asp
            260                 265                 270
```

```
Asn Ile Ser Lys Val Pro His Asp Lys Gly Arg Gly Asn Ile Gly Thr
        275                 280                 285

Ser Ile Arg Asn Leu Pro Arg Arg Gly Asn Cys Arg Val Cys Tyr Ser
    290                 295                 300

Gly Gln Tyr Ile Gly Ile Tyr Gly Pro Val Phe Tyr Gln Asp Val Ala
305                 310                 315                 320

Asn Ala Glu Leu Pro Arg Met Leu Val Glu His Lys Thr Lys Ile Cys
                325                 330                 335

His Val Val Lys Arg Ile Gly Arg Val Thr Gly Ser Leu Tyr His Val
            340                 345                 350

Leu Lys Cys Ile Asn Gly Cys Asn Val Ile Lys Tyr Ser Arg Cys Gly
        355                 360                 365

Leu Glu Pro Ser Ser Leu Lys Trp Ile Arg Asn Phe Thr Asp Cys Pro
    370                 375                 380

Leu Trp Val Thr Ser Cys Ala Arg Thr Ile
385                 390
```

<210> SEQ ID NO 132
<211> LENGTH: 1173
<212> TYPE: DNA
<213> ORGANISM: Artificial Sequence
<220> FEATURE:
<223> OTHER INFORMATION: Synthetic Construct

<400> SEQUENCE: 132

```
catatggcgg tgctgaaaac ccgccgcagc acccgccgca gcacccgccg cgcggtgctg      60

aaagattggg aacatatggt gtatgtgaaa gtgccggata cctggaccgg cattccgaac     120

attcattatt ggaacaccac cggcggcacc accacctggc cgggcaaaca gatgaaagaa     180

gaaggcaacg aaatttatag cattattatt ccgaaaagct ttggcgatgt gagcattatt     240

attaacgatg gcaacaacgt gtatgtgaaa gtgccggata cctggaccgg cattccgaac     300

attcattatt ggaacaccac cggcggcacc accacctggc cgggcaaaca gatgaaagaa     360

gaaggcaacg aaatttatag cattattatt ccgaaaagct ttggcgatgt gagcattatt     420

attaacgatg gcaacaacgt gtatgtgaaa gtgccggata cctggaccgg cattccgaac     480

attcattatt ggaacaccac cggcggcacc accacctggc cgggcaaaca gatgaaagaa     540

gaaggcaacg aaatttatag cattattatt ccgaaaagct ttggcgatgt gagcattatt     600

attaacgatg gcaacaacga aggaggcaaa gaaagcggca gcgtgagcag cgaacagctg     660

gcgcagtttc gcagcctgga tgcgggcagc gcgagcgaac tgaaccattt tgaactgctg     720

tataaaacca acaaacagaa accggtgggc gccgaagaat attgctataa cattagcggc     780

cgcccggtga ttggcgatcc gaccgaagtg tatccggata acattagcaa agtgccgcat     840

gataaaggcc gcggcaacat tggcaccagc attcgcaacc tgccgcgccg cggcaactgc     900

cgcgtgtgct atagcggcca gtatattggc atttatggcc cggtgtttta tcaggatgtg     960

gcgaacgcgg aactgccgcg catgctggtg gaacataaaa ccaaaatttg ccatgtggtg    1020

aaacgcattg gccgcgtgac cggcagcctg tatcatgtgc tgaaatgcat taacggctgc    1080

aacgtgatta aatatagccg ctgcggcctg gaaccgagca gcctgaaatg gattcgcaac    1140

tttaccgatt gcccgctgtg ggtgaccagc tgc                                 1173
```

<210> SEQ ID NO 133
<211> LENGTH: 485
<212> TYPE: PRT

<213> ORGANISM: Artificial Sequence
<220> FEATURE:
<223> OTHER INFORMATION: Synthetic Construct

<400> SEQUENCE: 133

```
Met Ala Val Leu Lys Thr Arg Arg Ser Thr Arg Arg Ser Thr Arg Arg
1               5                   10                  15

Ala Val Leu Lys Asp Trp Glu Ala Met Val Tyr Leu Lys Lys Pro Ala
            20                  25                  30

Asp Trp Glu Lys Asp Asp Ile Tyr Ile Tyr Phe Tyr Lys Asn Gly Ala
        35                  40                  45

Ser Gly Pro Ala Trp Pro Gly Ile Pro Met Glu Lys Val Glu Gly Lys
    50                  55                  60

Asp Asp Leu Tyr Thr Tyr Thr Leu Pro Lys Gly Leu Glu Gly Ala Met
65                  70                  75                  80

Val Leu Phe Asn Cys Asp Gly Gly Ser Val Gln Val Pro Arg Tyr Ile
                85                  90                  95

Glu Met Lys Tyr Val Arg Ala Asp Gly Asp Tyr Thr Asp Trp Asn Leu
            100                 105                 110

Trp Thr Trp Ser Thr Gly Lys Lys Asp Gly Gln Val Asp Pro Tyr Arg
        115                 120                 125

Ile Thr Glu Glu Gly Ala Ile Phe Arg Ile Pro Val Gly Gln Asp Ala
    130                 135                 140

Thr Lys Val Gly Phe Val Ile Arg Lys Gly Thr Asp Trp Ala Val Lys
145                 150                 155                 160

Asp Ala Tyr Gly Glu Asp Arg Tyr Val Thr Leu Gly Glu Asp Arg Val
                165                 170                 175

Thr Lys Val Arg Val Glu Ser Gly Lys Gly Thr Phe His Gln Val Phe
            180                 185                 190

Lys Phe Val Leu Asp Trp Thr Asn Ala Asp Ser Pro Thr Val Thr Val
        195                 200                 205

Thr Glu Thr Thr Asp Ala Ala Asp Asp Asn Thr Gln Gly Gly Ala Asp
    210                 215                 220

Asp Lys Tyr Leu Tyr Phe Gly Asn Gly Thr Ser Lys Arg Phe Tyr Ala
225                 230                 235                 240

Arg Gly Gly Asn Ser Tyr Glu Leu Thr Leu Asp Phe Asp Ser Asp Trp
                245                 250                 255

Gly Phe Leu Val Arg Thr Ser Thr Thr Ser Trp Ala Ala Gly Thr Lys
            260                 265                 270

Tyr Gly Ala Pro Asp Asn Arg Thr Ile Ile Arg Phe Gly Glu Pro Phe
        275                 280                 285

Thr Leu Met Ser Asn Arg Ser Ala Asp Pro Ala Asn Glu Gly Ser Lys
    290                 295                 300

Glu Ser Gly Ser Val Ser Ser Glu Gln Leu Ala Gln Phe Arg Ser Leu
305                 310                 315                 320

Asp Ala Gly Ser Ala Ser Glu Leu Asn His Phe Glu Leu Leu Tyr Lys
                325                 330                 335

Thr Asn Lys Gln Lys Pro Val Gly Val Glu Glu Tyr Cys Tyr Asn Ile
            340                 345                 350

Ser Gly Arg Pro Val Ile Gly Asp Pro Thr Glu Val Tyr Pro Asp Asn
        355                 360                 365

Ile Ser Lys Val Pro His Asp Lys Gly Arg Gly Asn Ile Gly Thr Ser
    370                 375                 380

Ile Arg Asn Leu Pro Arg Arg Gly Asn Cys Arg Val Cys Tyr Ser Gly
```

```
385                 390                 395                 400

Gln Tyr Ile Gly Ile Tyr Gly Pro Val Phe Tyr Gln Asp Val Ala Asn
                405                 410                 415

Ala Glu Leu Pro Arg Met Leu Val Glu His Lys Thr Lys Ile Cys His
            420                 425                 430

Val Val Lys Arg Ile Gly Arg Val Thr Gly Ser Leu Tyr His Val Leu
        435                 440                 445

Lys Cys Ile Asn Gly Cys Asn Val Ile Lys Tyr Ser Arg Cys Gly Leu
    450                 455                 460

Glu Pro Ser Ser Leu Lys Trp Ile Arg Asn Phe Thr Asp Cys Pro Leu
465                 470                 475                 480

Trp Val Thr Ser Cys
                485


<210> SEQ ID NO 134
<211> LENGTH: 1455
<212> TYPE: DNA
<213> ORGANISM: Artificial Sequence
<220> FEATURE:
<223> OTHER INFORMATION: Synthetic Construct

<400> SEQUENCE: 134

catatggcgg tgctgaaaac ccgccgcagc acccgccgca gcacccgccg cgcggtgctg      60

aaagattggg aacatatggt gtatctgaaa aaaccggcgg attgggaaaa agatgatatt     120

tatatttatt tttataaaaa cggcgcgagc ggcccggcgt ggccgggcat tccgatggaa     180

aaagtggaag gcaaagatga tctgtatacc tataccctgc cgaaaggcct ggaaggcgcg     240

atggtgctgt ttaactgcga tggcggcagc gtgcaggtgc cgcgctatat tgaaatgaaa     300

tatgtgcgcg cggatggcga ttataccgat tggaacctgt ggacctggag caccggcaaa     360

aaagatggcc aggtggatcc gtatcgcatt accgaagaag gcgcgatttt tcgcattccg     420

gtgggccagg atgcgaccaa agtgggcttt gtgattcgca aaggcaccga ttgggcggtg     480

aaagatgcgt atggcgaaga tcgctatgtg accctgggcg aagatcgcgt gaccaaagtg     540

cgcgaaagcg gcaaaggcac ctttcatcag gtgtttaaat ttgtgctgga ttggaccaac     600

gcggatagcc cgaccgtgac cgtgaccgaa accaccgatg cggcggatga taacacccag     660

ggcggcgcgg atgataaata tctgtatttt ggcaacggca ccagcaaacg cttttatgcg     720

cgcggcggca acagctatga actgaccctg gaatttgata gcgattgggg ctttctggtg     780

cgcaccagca ccaccagctg ggcggcgggc accaaatatg gcgcgccgga taaccgcacc     840

attattcgct ttggcgaacc gtttaccctg atgagcaacc gcagcgcgga tccggcgaac     900

gaaggaggca aagaaagcgg cagcgtgagc agcgaacagc tggcgcagtt tcgcagcctg     960

gatgcgggca gcgcgagcga actgaaccat tttgaactgc tgtataaaac caacaaacag    1020

aaaccggtgg gcgccgaaga atattgctat aacattagcg gccgcccggt gattggcgat    1080

ccgaccgaag tgtatccgga taacattagc aaagtgccgc atgataaagg ccgcggcaac    1140

attggcacca gcattcgcaa cctgccgcgc cgcggcaact gccgcgtgtg ctatagcggc    1200

cagtatattg gcatttatgg cccggtgttt tatcaggatg tggcgaacgc ggaactgccg    1260

cgcatgctgg tggaacataa aaccaaaatt tgccatgtgg tgaaacgcat tggccgcgtg    1320

accggcagcc tgtatcatgt gctgaaatgc attaacggct gcaacgtgat taaatatagc    1380

cgctgcggcc tggaaccgag cagcctgaaa tggattcgca actttaccga ttgcccgctg    1440

tgggtgacca gctgc                                                    1455
```

<210> SEQ ID NO 135
<211> LENGTH: 354
<212> TYPE: PRT
<213> ORGANISM: Artificial Sequence
<220> FEATURE:
<223> OTHER INFORMATION: Synthetic Construct

<400> SEQUENCE: 135

```
Met Ala Val Leu Lys Thr Arg Arg Ser Thr Arg Arg Ser Thr Arg Arg
1               5                   10                  15

Ala Val Leu Lys Asp Trp Glu Ala Met Val Tyr Phe Lys Lys Pro Val
            20                  25                  30

Ala Trp Glu Phe Ile Lys Leu Val Tyr Tyr Trp Thr Ser Gly His Tyr
        35                  40                  45

Asp Asn Gly Val Ser Trp Pro Gly Val Ser Met Thr Gly Asn Ser Thr
    50                  55                  60

His Trp Tyr Ser Tyr Thr Gln Ile Ala Val Asn Asp Glu Phe Leu Val
65                  70                  75                  80

Ala Phe Asn Asp Tyr Lys Phe Val Leu Asp Trp Ser Asn Asp Ser Glu
                85                  90                  95

Pro Thr Val Thr Val Ser Glu Phe Ile Lys Leu Ala Asp Asn Asp Asn
            100                 105                 110

Thr Ser Gly His Thr Asp Asn Gly Lys Tyr Leu Tyr Tyr Gly Asp Val
        115                 120                 125

Ile Cys Lys Lys Phe Tyr Asp Lys Gly Asn Asp Ile Tyr Glu Leu Thr
    130                 135                 140

Val Asp Phe Asn Ser Gln Trp Gly Phe Leu Ile Arg Thr Ser Asn Thr
145                 150                 155                 160

Ala Trp Leu Val Thr Lys Tyr Gly Ala Glu Gly Ser Lys Glu Ser Gly
                165                 170                 175

Ser Val Ser Ser Glu Gln Leu Ala Gln Phe Arg Ser Leu Asp Ala Gly
            180                 185                 190

Ser Ala Ser Glu Leu Asn His Phe Glu Leu Leu Tyr Lys Thr Asn Lys
        195                 200                 205

Gln Lys Pro Val Gly Val Glu Glu Tyr Cys Tyr Asn Ile Ser Gly Arg
    210                 215                 220

Pro Val Ile Gly Asp Pro Thr Glu Val Tyr Pro Asp Asn Ile Ser Lys
225                 230                 235                 240

Val Pro His Asp Lys Gly Arg Gly Asn Ile Gly Thr Ser Ile Arg Asn
                245                 250                 255

Leu Pro Arg Arg Gly Asn Cys Arg Val Cys Tyr Ser Gly Gln Tyr Ile
            260                 265                 270

Gly Ile Tyr Gly Pro Val Phe Tyr Gln Asp Val Ala Asn Ala Glu Leu
        275                 280                 285

Pro Arg Met Leu Val Glu His Lys Thr Lys Ile Cys His Val Val Lys
    290                 295                 300

Arg Ile Gly Arg Val Thr Gly Ser Leu Tyr His Val Leu Lys Cys Ile
305                 310                 315                 320

Asn Gly Cys Asn Val Ile Lys Tyr Ser Arg Cys Gly Leu Glu Pro Ser
                325                 330                 335

Ser Leu Lys Trp Ile Arg Asn Phe Thr Asp Cys Pro Leu Trp Val Thr
            340                 345                 350

Ser Cys
```

<210> SEQ ID NO 136
<211> LENGTH: 1074
<212> TYPE: DNA
<213> ORGANISM: Artificial Sequence
<220> FEATURE:
<223> OTHER INFORMATION: Synthetic Construct

<400> SEQUENCE: 136

```
catatggcgg tgctgaaaac ccgccgcagc acccgccgca gcacccgccg cgcggtgctg     60

aaagattggg aacatatggt gtattttaaa aaaccggtgg cgtgggaatt tattaaactg    120

gtgtattatt ggaccagcgg ccattatgat aacggcgtga gctggccggg cgtgagcatg    180

accggcaaca gcacccattg gtatagctat acccagattg cggtgaacga tgaatttctg    240

gtggcgttta acgattataa atttgtgctg gattggagca acgatagcaa cgatagcgaa    300

ccgaccgtga ccgtgagcga atttattaaa ctggcggata acgataacac cagcggccat    360

accgataacg gcaaatatct gtattatggc gatgtgattt gcaaaaaatt ttatgataaa    420

ggcaacgata tttatgaact gaccgtggaa tttaacagcc agtggggctt tctgattcgc    480

accagcaaca ccgcgtggct ggtgaccaaa tatggcgcgg aaggaggcaa agaaagcggc    540

agcgtgagca gcgaacagct ggcgcagttt cgcagcctgg atgcgggcag cgcgagcgaa    600

ctgaaccatt ttgaactgct gtataaaacc aacaaacaga aaccggtggg cgccgaagaa    660

tattgctata acattagcgg ccgcccggtg attggcgatc cgaccgaagt gtatccggat    720

aacattagca aagtgccgca tgataaaggc cgcggcaaca ttggcaccag cattcgcaac    780

ctgccgcgcc gcggcaactg ccgcgtgtgc tatagcggcc agtatattgg catttatggc    840

ccggtgtttt atcaggatgt ggcgaacgcg gaactgccgc gcatgctggt ggaacataaa    900

accaaaattt gccatgtggt gaaacgcatt ggccgcgtga ccggcagcct gtatcatgtg    960

ctgaaatgca ttaacggctg caacgtgatt aaatatagcc gctgcggcct ggaaccgagc   1020

agcctgaaat ggattcgcaa ctttaccgat tgcccgctgt gggtgaccag ctgc         1074
```

<210> SEQ ID NO 137
<211> LENGTH: 299
<212> TYPE: PRT
<213> ORGANISM: Artificial Sequence
<220> FEATURE:
<223> OTHER INFORMATION: Synthetic Construct

<400> SEQUENCE: 137

```
Met Ala Val Leu Lys Thr Arg Arg Ser Thr Arg Arg Ser Thr Arg Arg
1               5                   10                  15

Ala Val Leu Lys Asp Trp Glu Ala Met Phe Thr Asn Trp Tyr Lys Phe
            20                  25                  30

Val Leu Asp Trp Ser Asn Phe Gly Arg Pro Thr Val Thr Val Ser Trp
        35                  40                  45

Phe Asn Asn Asp Asp Trp Thr Phe Ser Leu Thr Leu Gln Thr Gly Leu
    50                  55                  60

Lys Tyr Leu Tyr Tyr Gly Asp Val Ile Cys Lys Lys Phe Tyr Asn Gly
65                  70                  75                  80

Asn Cys Thr Gly Ile Glu Leu Thr Val Asp Phe Gly Lys Ala His Trp
                85                  90                  95

Gly Phe Leu Ile Arg Thr Ser Asn Pro Phe Ile Ala Ile His Lys Tyr
            100                 105                 110

Gly Ala Glu Gly Ser Lys Glu Ser Gly Ser Val Ser Ser Glu Gln Leu
        115                 120                 125
```

```
Ala Gln Phe Arg Ser Leu Asp Ala Gly Ser Ala Ser Glu Leu Asn His
    130                 135                 140

Phe Glu Leu Leu Tyr Lys Thr Asn Lys Gln Lys Pro Val Gly Val Glu
145                 150                 155                 160

Glu Tyr Cys Tyr Asn Ile Ser Gly Arg Pro Val Ile Gly Asp Pro Thr
                165                 170                 175

Glu Val Tyr Pro Asp Asn Ile Ser Lys Val Pro His Asp Lys Gly Arg
            180                 185                 190

Gly Asn Ile Gly Thr Ser Ile Arg Asn Leu Pro Arg Arg Gly Asn Cys
        195                 200                 205

Arg Val Cys Tyr Ser Gly Gln Tyr Ile Gly Ile Tyr Gly Pro Val Phe
    210                 215                 220

Tyr Gln Asp Val Ala Asn Ala Glu Leu Pro Arg Met Leu Val Glu His
225                 230                 235                 240

Lys Thr Lys Ile Cys His Val Val Lys Arg Ile Gly Arg Val Thr Gly
                245                 250                 255

Ser Leu Tyr His Val Leu Lys Cys Ile Asn Gly Cys Asn Val Ile Lys
            260                 265                 270

Tyr Ser Arg Cys Gly Leu Glu Pro Ser Ser Leu Lys Trp Ile Arg Asn
        275                 280                 285

Phe Thr Asp Cys Pro Leu Trp Val Thr Ser Cys
    290                 295
```

<210> SEQ ID NO 138
<211> LENGTH: 900
<212> TYPE: DNA
<213> ORGANISM: Artificial Sequence
<220> FEATURE:
<223> OTHER INFORMATION: Synthetic Construct

<400> SEQUENCE: 138

```
catatggcgg tgctgaaaac ccgccgcagc acccgccgca gcacccgccg cgcggtgctg     60

aaagattggg aacatatgtt taccaactgg tataaatttg tgctggattg gagcaacttt    120

ggccgcccga ccgtgaccgt gagctggttt aacaacgatg attggacctt tagcctgacc    180

ctgcagaccg gcctgaaata tctgtattat ggcgatgtga tttgcaaaaa attttataac    240

ggcaactgca ccggcattga actgaccgtg gattttggca aagcgcattg ggcctttctg    300

attcgcacca gcaacccgtt tattgcgatt cataaatatg gcgcggaagg aggcaaagaa    360

agcggcagcg tgagcagcga acagctggcg cagtttcgca gcctggatgc gggcagcgcg    420

agcgaactga accattttga actgctgtat aaaaccaaca aacagaaacc ggtgggcgcc    480

gaagaatatt gctataacat tagcggccgc ccggtgattg gcgatccgac cgaagtgtat    540

ccggataaca ttagcaaagt gccgcatgat aaaggccgcg gcaacattgg caccagcatt    600

cgcaacctgc cgcgccgcgg caactgccgc gtgtgctata gcggccagta tattggcatt    660

tatggcccgg tgttttatca ggatgtggcg aacgcggaac tgccgcgcat gctggtggaa    720

cataaaacca aaatttgcca tgtggtgaaa cgcattggcc gcgtgaccgg cagcctgtat    780

catgtgctga aatgcattaa cggctgcaac gtgattaaat atagccgctg cggcctggaa    840

ccgagcagcc tgaaatggat tcgcaacttt accgattgcc cgctgtgggt gaccagctgc    900
```

<210> SEQ ID NO 139
<211> LENGTH: 298
<212> TYPE: PRT
<213> ORGANISM: Artificial Sequence

```
<220> FEATURE:
<223> OTHER INFORMATION: Synthetic Construct

<400> SEQUENCE: 139

Met Ala Val Leu Lys Thr Arg Arg Ser Thr Arg Arg Ser Thr Arg Arg
1               5                   10                  15

Ala Val Leu Lys Asp Trp Glu Ala Met Phe Thr Asn Val Tyr Lys Lys
            20                  25                  30

Pro Asn Gln Trp Ala Phe Gly Arg Gly Asn Arg Val Tyr Tyr Trp Phe
        35                  40                  45

Asn Asn Asp Asp Trp Thr Phe Ser Leu Trp Pro Gly Val Gly Met Thr
    50                  55                  60

Pro Gly Thr Tyr Cys Trp Tyr Ile Tyr Thr Asp Lys Ile Asn Gly Asn
65                  70                  75                  80

Cys Thr Gly Val Lys Ile Tyr Phe Asn Asp Gly Lys Ala His Phe Ser
                85                  90                  95

Ile Ser Asn Ser Ala Glu Asp Pro Phe Ile Ala Ile His Ala Glu Ser
            100                 105                 110

Lys Glu Gly Ser Lys Glu Ser Gly Ser Val Ser Ser Glu Gln Leu Ala
        115                 120                 125

Gln Phe Arg Ser Leu Asp Ala Gly Ser Ala Ser Glu Leu Asn His Phe
    130                 135                 140

Glu Leu Leu Tyr Lys Thr Asn Lys Gln Lys Pro Val Gly Val Glu Glu
145                 150                 155                 160

Tyr Cys Tyr Asn Ile Ser Gly Arg Pro Val Ile Gly Asp Pro Thr Glu
                165                 170                 175

Val Tyr Pro Asp Asn Ile Ser Lys Val Pro His Asp Lys Gly Arg Gly
            180                 185                 190

Asn Ile Gly Thr Ser Ile Arg Asn Leu Pro Arg Arg Gly Asn Cys Arg
        195                 200                 205

Val Cys Tyr Ser Gly Gln Tyr Ile Gly Ile Tyr Gly Pro Val Phe Tyr
    210                 215                 220

Gln Asp Val Ala Asn Ala Glu Leu Pro Arg Met Leu Val Glu His Lys
225                 230                 235                 240

Thr Lys Ile Cys His Val Val Lys Arg Ile Gly Arg Val Thr Gly Ser
                245                 250                 255

Leu Tyr His Val Leu Lys Cys Ile Asn Gly Cys Asn Val Ile Lys Tyr
            260                 265                 270

Ser Arg Cys Gly Leu Glu Pro Ser Ser Leu Lys Trp Ile Arg Asn Phe
        275                 280                 285

Thr Asp Cys Pro Leu Trp Val Thr Ser Cys
    290                 295


<210> SEQ ID NO 140
<211> LENGTH: 906
<212> TYPE: DNA
<213> ORGANISM: Artificial Sequence
<220> FEATURE:
<223> OTHER INFORMATION: Synthetic Construct

<400> SEQUENCE: 140

catatggcgg tgctgaaaac ccgccgcagc acccgccgca gcacccgccg cgcggtgctg      60

aaagattggg aacatatgtt taccaacgtg tataaaaaac cgaaccagtg ggcgtttggc     120

cgcggcaacc gcggcaaccg cgtgtattat tggtttaaca acgatgattg gacctttagc     180

ctgtggccgg gcgtgggcat gaccccgggc acctattgct ggtatattta taccgataaa     240
```

```
attaacggca actgcaccgg cgtgaaaatt tattttaacg atggcaaagc gcattttagc    300

attagcaaca gcgcggaaga tccgtttatt gcgattcatg cggaaagcaa agaaggaggc    360

aaagaaagcg gcagcgtgag cagcgaacag ctggcgcagt ttcgcagcct ggatgcgggc    420

agcgcgagcg aactgaacca ttttgaactg ctgtataaaa ccaacaaaca gaaaccggtg    480

ggcgccgaag aatattgcta taacattagc ggccgcccgg tgattggcga tccgaccgaa    540

gtgtatccgg ataacattag caaagtgccg catgataaag gccgcggcaa cattggcacc    600

agcattcgca acctgccgcg ccgcggcaac tgccgcgtgt gctatagcgg ccagtatatt    660

ggcatttatg gcccggtgtt ttatcaggat gtggcgaacg cggaactgcc gcgcatgctg    720

gtggaacata aaaccaaaat ttgccatgtg gtgaaacgca ttggccgcgt gaccggcagc    780

ctgtatcatg tgctgaaatg cattaacggc tgcaacgtga ttaaatatag ccgctgcggc    840

ctggaaccga gcagcctgaa atggattcgc aactttaccg attgcccgct gtgggtgacc    900

agctgc                                                               906
```

```
<210> SEQ ID NO 141
<211> LENGTH: 312
<212> TYPE: PRT
<213> ORGANISM: Artificial Sequence
<220> FEATURE:
<223> OTHER INFORMATION: Synthetic Construct

<400> SEQUENCE: 141

Met Ala Val Leu Lys Thr Arg Arg Ser Thr Arg Arg Ser Thr Arg Arg
1               5                   10                  15

Ala Val Leu Lys Asp Trp Glu Ala Met Phe Thr Asn Val Tyr Lys Lys
            20                  25                  30

Pro Asn Gln Trp Ala Phe Gly Arg Gly Asn Arg Val Tyr Tyr Trp Phe
        35                  40                  45

Asn Asn Asp Asp Trp Thr Phe Ser Leu Trp Pro Gly Val Gly Met Thr
    50                  55                  60

Pro Gly Thr Tyr Cys Trp Tyr Ile Tyr Thr Asp Lys Ile Asn Gly Asn
65                  70                  75                  80

Cys Thr Gly Val Lys Ile Tyr Phe Asn Asp Gly Lys Ala His Phe Ser
                85                  90                  95

Ile Ser Asn Ser Ala Glu Asp Pro Phe Ile Ala Ile His Ala Glu Ser
            100                 105                 110

Lys Glu Gly Ser Lys Glu Ser Gly Ser Val Ser Ser Glu Gln Leu Ala
        115                 120                 125

Gln Phe Arg Ser Leu Asp Ala Gly Ser Ala Ser Glu Leu Asn His Phe
    130                 135                 140

Glu Leu Leu Tyr Lys Thr Asn Lys Gln Lys Pro Val Gly Val Arg Asp
145                 150                 155                 160

Pro Val Tyr Asp Asp His Gly Thr Gln Gly Ile Gly Thr Cys Phe His
                165                 170                 175

Val Gly Glu Gly Val Leu Leu Lys Leu Pro His Asp Arg Gly Arg Gly
            180                 185                 190

Asn Ile Lys Thr Thr Leu Thr Ala Leu Ser Leu Leu Glu Asp Pro Lys
        195                 200                 205

His Trp Asp Arg Lys Gly Pro Gln Gly Ser Val Thr Ile Thr Arg Gly
    210                 215                 220

Pro Val Phe Tyr Ser Asp Trp Met Gly Tyr Glu Leu Val Leu Tyr His
225                 230                 235                 240
```

```
Thr Leu Val Leu Gly Tyr Ser Glu Ala Lys Gln Thr Lys Lys Thr Leu
                245                 250                 255

Leu Ile Gly Arg Val Thr Ala Arg Gly Gly Phe Ser Gly Gly Ile Leu
            260                 265                 270

Leu Cys Ile His Asp Glu Ala Asn Gly Val Ile Thr Gln Ala Leu Cys
        275                 280                 285

Lys Asn Gly Glu Pro Glu Gln Leu Gly Tyr Met Ala Val Leu Thr Ile
    290                 295                 300

Glu Pro Leu Trp Val Thr Ser Cys
305                 310
```

<210> SEQ ID NO 142
<211> LENGTH: 954
<212> TYPE: DNA
<213> ORGANISM: Artificial Sequence
<220> FEATURE:
<223> OTHER INFORMATION: Synthetic Construct

<400> SEQUENCE: 142

```
catatggcgg tgctgaaaac ccgccgcagc acccgccgca gcacccgccg cgcggtgctg     60

aaagattggg aacatatgtt taccaacgtg tataaaaaac cgaaccagtg ggcgtttggc    120

cgcggcaacc gcggcaaccg cgtgtattat tggtttaaca acgatgattg gacctttagc    180

ctgtggccgg gcgtgggcat gaccccgggc acctattgct ggtatattta taccgataaa    240

attaacggca actgcaccgg cgtgaaaatt tattttaacg atggcaaagc gcattttagc    300

attagcaaca gcgcggaaga tccgtttatt gcgattcatg cggaaagcaa agaaggaggc    360

aaagaaagcg gcagcgtgag cagcgaacag ctggcgcagt ttcgcagcct ggatgcgggc    420

agcgcgagcg aactgaacca ttttgaactg ctgtataaaa ccaacaaaca gaaaccggtg    480

ggcgcccgcg atccggtgta tgatgatcat ggcacccagg gcattggcac ctgctttcat    540

gtgggcgaag gcgtgctgct gaaactgccg catgatcgcg gccgcggcaa cattaaaacc    600

accctgaccg cgctgagcct gctggaagat ccgaaacatt gggatcgcaa aggcccgcag    660

ggcagcgtga ccattacccg cggcccggtg ttttatagcg attggatggg ctatgaactg    720

gtgctgtatc ataccctggt gctgggctat agcgaagcga aacagaccaa aaaaaccctg    780

ctgattggcc gcgtgaccgc gcgcggcggc tttagcggcg gcattctgct gtgcattcat    840

gatgaagcga acggcgtgat tacccaggcg ctgtgcaaaa acggcgaacc ggaaccggaa    900

cagctgggct atatggcggt gctgaccatt gaaccgctgt gggtgaccag ctgc          954
```

<210> SEQ ID NO 143
<211> LENGTH: 333
<212> TYPE: PRT
<213> ORGANISM: Artificial Sequence
<220> FEATURE:
<223> OTHER INFORMATION: Synthetic Construct

<400> SEQUENCE: 143

```
Met Ala Val Ile Ser Ala Leu Leu Val Val Ala Ala Val Thr Met Ile
1               5                   10                  15

Val Ala Ser Leu Leu Gln Arg Gln Asp Thr Phe Leu Arg Ala Val Gln
            20                  25                  30

Ala Ala Gln Thr Arg Ala Gln Ala Gln Ala Leu Leu Glu Ala Phe Thr
        35                  40                  45

Asn Val Tyr Lys Lys Pro Asn Gln Trp Ala Phe Gly Arg Gly Asn Arg
    50                  55                  60
```

```
Val Tyr Tyr Trp Phe Asn Asn Asp Asp Trp Thr Phe Ser Leu Trp Pro
65                  70                  75                  80

Gly Val Gly Met Thr Pro Gly Thr Tyr Cys Trp Tyr Ile Tyr Thr Asp
                85                  90                  95

Lys Ile Asn Gly Asn Cys Thr Gly Val Lys Ile Tyr Phe Asn Asp Gly
            100                 105                 110

Lys Ala His Phe Ser Ile Ser Asn Ser Ala Glu Asp Pro Phe Ile Ala
        115                 120                 125

Ile His Ala Glu Ser Lys Glu Gly Ser Lys Glu Ser Gly Ser Val Ser
    130                 135                 140

Ser Glu Gln Leu Ala Gln Phe Arg Ser Leu Asp Ala Gly Ser Ala Ser
145                 150                 155                 160

Glu Leu Asn His Phe Glu Leu Leu Tyr Lys Thr Asn Lys Gln Lys Pro
                165                 170                 175

Val Gly Val Arg Asp Pro Val Tyr Asp Asp His Gly Thr Gln Gly Ile
            180                 185                 190

Gly Thr Cys Phe His Val Gly Glu Gly Val Leu Leu Lys Leu Pro His
        195                 200                 205

Asp Arg Gly Arg Gly Asn Ile Lys Thr Thr Leu Thr Ala Leu Ser Leu
    210                 215                 220

Leu Glu Asp Pro Lys His Trp Asp Arg Lys Gly Pro Gln Gly Ser Val
225                 230                 235                 240

Thr Ile Thr Arg Gly Pro Val Phe Tyr Ser Asp Trp Met Gly Tyr Glu
                245                 250                 255

Leu Val Leu Tyr His Thr Leu Val Leu Gly Tyr Ser Glu Ala Lys Gln
            260                 265                 270

Thr Lys Lys Thr Leu Leu Ile Gly Arg Val Thr Ala Arg Gly Gly Phe
        275                 280                 285

Ser Gly Gly Ile Leu Leu Cys Ile His Asp Glu Ala Asn Gly Val Ile
    290                 295                 300

Thr Gln Ala Leu Cys Lys Asn Gly Glu Pro Glu Gln Leu Gly Tyr Met
305                 310                 315                 320

Ala Val Leu Thr Ile Glu Pro Leu Trp Val Thr Ser Cys
                325                 330
```

<210> SEQ ID NO 144
<211> LENGTH: 1023
<212> TYPE: DNA
<213> ORGANISM: Artificial Sequence
<220> FEATURE:
<223> OTHER INFORMATION: Synthetic Construct

<400> SEQUENCE: 144

```
catatggcgg tgattagcgc gctgctggtg gtggcggcgg tgaccatgat tgtggcgagc     60

ctgctgcagc gccaggatac ctttctgcgc gcggtgcagg cggcgcagac ccgcgcgcag    120

gcgcaggcgc tgctggaagc gcatatgttt accaacgtgt ataaaaaacc gaaccagtgg    180

gcgtttggcc gcggcaaccg cggcaaccgc gtgtattatt ggtttaacaa cgatgattgg    240

acctttagcc tgtggccggg cgtgggcatg accccgggca cctattgctg gtatatttat    300

accgataaaa ttaacggcaa ctgcaccggc gtgaaaattt attttaacga tggcaaagcg    360

cattttagca ttagcaacag cgcggaagat ccgtttattg cgattcatgc ggaaagcaaa    420

gaaggaggca aagaaagcgg cagcgtgagc agcgaacagc tggcgcagtt tcgcagcctg    480

gatgcgggca gcgcgagcga actgaaccat tttgaactgc tgtataaaac caacaaacag    540
```

-continued

```
aaaccggtgg gcgcccgcga tccggtgtat gatgatcatg gcacccaggg cattggcacc    600

tgctttcatg tgggcgaagg cgtgctgctg aaactgccgc atgatcgcgg ccgcggcaac    660

attaaaacca ccctgaccgc gctgagcctg ctggaagatc cgaaacattg ggatcgcaaa    720

ggcccgcagg gcagcgtgac cattacccgc ggcccggtgt tttatagcga ttggatgggc    780

tatgaactgg tgctgtatca taccctggtg ctgggctata gcgaagcgaa acagaccaaa    840

aaaaccctgc tgattggccg cgtgaccgcg cgcggcggct ttagcggcgg cattctgctg    900

tgcattcatg atgaagcgaa cggcgtgatt acccaggcgc tgtgcaaaaa cggcgaaccg    960

gaaccggaac agctgggcta tatggcggtg ctgaccattg aaccgctgtg ggtgaccagc   1020

tgc                                                                 1023
```